US012529694B2

(12) United States Patent
Coulombe et al.

(10) Patent No.: US 12,529,694 B2
(45) Date of Patent: Jan. 20, 2026

(54) HUMAN IN VITRO CARDIOTOXICITY MODEL

(71) Applicants: Brown University, Providence, RI (US); Rhode Island Hospital, Providence, RI (US)

(72) Inventors: Kareen L. K. Coulombe, Pawtucket, RI (US); Cassady E. Rupert, New Haven, CT (US); Celinda M. Kofron, Hope, RI (US); Bum-Rak Choi, Warwick, RI (US); Taeyun Kim, Coventry, RI (US); Ulrike Mende, Norfolk, MA (US)

(73) Assignees: Brown University, Providence, RI (US); Rhode Island Hospital, Providence, RI (US)

( * ) Notice: Subject to any disclaimer, the term of this patent is extended or adjusted under 35 U.S.C. 154(b) by 209 days.

(21) Appl. No.: 17/611,064

(22) PCT Filed: May 18, 2020

(86) PCT No.: PCT/US2020/033394
§ 371 (c)(1),
(2) Date: Nov. 12, 2021

(87) PCT Pub. No.: WO2020/232436
PCT Pub. Date: Nov. 19, 2020

(65) Prior Publication Data
US 2022/0205981 A1 Jun. 30, 2022

Related U.S. Application Data

(60) Provisional application No. 62/849,079, filed on May 16, 2019, provisional application No. 63/013,406, filed on Apr. 21, 2020.

(51) Int. Cl.
| | |
|---|---|
| *G01N 33/50* | (2006.01) |
| *C12N 5/071* | (2010.01) |
| *G01N 1/30* | (2006.01) |
| *G01N 21/64* | (2006.01) |
| *G06T 7/00* | (2017.01) |

(52) U.S. Cl.
CPC ....... *G01N 33/5088* (2013.01); *C12N 5/0697* (2013.01); *G01N 1/30* (2013.01); *G01N 21/6428* (2013.01); *G01N 21/6456* (2013.01); *G01N 33/5014* (2013.01); *G06T 7/0012* (2013.01); *G01N 2021/6439* (2013.01); *G01N 2800/32* (2013.01); *G06T 2207/10064* (2013.01); *G06T 2207/30024* (2013.01); *G06T 2207/30048* (2013.01)

(58) Field of Classification Search
CPC .. G01N 33/5088; G01N 1/30; G01N 21/6428; G01N 21/5456; G01N 33/5014; G01N 2021/6439; G01N 2800/32; C12N 5/0697; G06T 7/0012; G06T 2207/10064; G06T 2207/30024; G06T 2207/30048

USPC .............................................. 435/373
See application file for complete search history.

(56) References Cited

U.S. PATENT DOCUMENTS

| | | |
|---|---|---|
| 4,377,592 A | 3/1983 | Aurousseau |
| 6,759,386 B2 | 7/2004 | Franco |
| 7,125,856 B1 | 10/2006 | Isner |
| 7,622,299 B2 | 11/2009 | Sanders et al. |
| 8,318,488 B1 | 11/2012 | Bohlen et al. |
| 8,492,339 B2 | 7/2013 | Miller |
| 8,497,252 B2 | 7/2013 | Hosoda et al. |
| 8,703,483 B2 | 4/2014 | Cezar |
| 9,085,756 B2 | 7/2015 | Fisk et al. |
| 9,273,286 B2 | 3/2016 | Ma |
| 9,303,245 B2 | 4/2016 | Rivron et al. |
| 9,675,670 B2 | 6/2017 | Clokie et al. |
| 10,034,738 B2 | 7/2018 | Thavandiran et al. |
| 10,048,275 B2 | 8/2018 | Kralj et al. |
| 10,113,150 B2 | 10/2018 | Wakatsuki |
| 2005/0049287 A1 | 3/2005 | Ehring et al. |
| 2007/0269476 A1 | 11/2007 | Voytik-Harbin et al. |
| 2010/0234304 A1 | 9/2010 | Kirkham et al. |
| 2013/0103079 A1 | 4/2013 | Lau et al. |

(Continued)

FOREIGN PATENT DOCUMENTS

| | | |
|---|---|---|
| AU | 2014323098 A1 | 5/2016 |
| CA | 2886396 A1 | 1/2014 |

(Continued)

OTHER PUBLICATIONS

Zuo , et al., "Heparin-Conjugated Alginate Multilayered Microspheres for Controlled Release of bFGF", Biomedical Materials, vol. 10, No. 3, 2015, 12 pages.
Soepriatna , et al., "Human Atrial Cardiac Microtissues for Chamber-Specific Arrhythmic Risk Assessment", Cell Mol Bioeng, vol. 14, No. 5, 2021, pp. 441-457.
Son , et al., "Construction of Modular Hydrogel Sheets for Micropatterned Macro-scaled 3D Cellular Architecture", Journal of Visualized Experiments, vol. 107, e53475, Jan. 11, 2016, pp. 1-6.
Taimeh , et al., "Vascular Endothelial Growth Factor in Heart Failure", Nature Reviews Cardiology, vol. 10, 2013, pp. 519-530.
Virani , et al., "Heart Disease and Stroke Statistics—2021 Update", Circulation, vol. 143, Issue 8, Feb. 23, 2021, pp. e254-e743.

(Continued)

*Primary Examiner* — Jennifer M. H. Tichy
(74) *Attorney, Agent, or Firm* — Banner & Witcoff, Ltd.

(57) ABSTRACT

The Cardio-Tox Tissue Engineered Model (TEEM) invention provides a robust in vitro model for cardiotoxicity evaluation using three-dimensional (3D) human heart microtissues to quantify dose-dependent changes in electromechanical activity, resulting in a comprehensive cardiotoxicity and arrhythmia risk assessment of test compounds. The invention also provides a predictive in vitro screening platform for pro-arrhythmic toxicity testing using human three-dimensional cardiac microtissues. The invention enables the screening of environmental and pharmaceutical compounds, chemicals, and toxicants to establish safe human exposure levels.

6 Claims, 9 Drawing Sheets

(56) References Cited

U.S. PATENT DOCUMENTS

| | | | |
|---|---|---|---|
| 2014/0094388 A1* | 4/2014 | Wakatsuki | G01N 33/5082 435/6.13 |
| 2015/0252322 A1 | 9/2015 | Nain | |
| 2015/0283305 A1 | 10/2015 | Li et al. | |
| 2017/0002330 A1 | 1/2017 | Vunjak-Novakovic et al. | |
| 2018/0050130 A1 | 2/2018 | Jiang et al. | |
| 2022/0205981 A1 | 6/2022 | Coulombe et al. | |

FOREIGN PATENT DOCUMENTS

| | | |
|---|---|---|
| EP | 2946011 A1 | 11/2015 |
| EP | 3063262 A1 | 9/2016 |
| WO | 2013056019 A1 | 4/2013 |
| WO | 2015158777 A1 | 10/2015 |
| WO | 2017093524 A1 | 6/2017 |
| WO | 2018013851 A1 | 1/2018 |
| WO | 2018195166 A1 | 10/2018 |
| WO | 2019106438 A1 | 6/2019 |
| WO | 2019126315 A1 | 6/2019 |
| WO | 2020113025 A1 | 6/2020 |

OTHER PUBLICATIONS

Vo, et al., "The Biomechanics and Optimization of the Needle-Syringe System for Injecting Triamcinolone Acetonide into Keloids", Journal of Medical Engineering, vol. 2016, Article ID 5162394, 2016, 8 pages.

Voisine, et al., "Inhibition of the Cardiac Angiogenic Response to Exogenous Vascular Endothelial Growth Factor", Surgery, vol. 136, No. 2, Aug. 2004, pp. 407-415.

Vollert, et al., "In Vitro Perfusion of Engineered Heart Tissue Through Endothelialized Channels", Tissue Engineering Part A, vol. 20, No. 3-4, 2014, pp. 854-863.

Weyers, et al., "Retrograde perfusion and filling of mouse coronary vasculature as preparation for micro computed tomography imaging", J Vis Exp, vol. 60, 2021, pp. 3740.

Weyers, et al., "Sonic Hedgehog Upregulation Does Not Enhance The Survival and Engraftment of Stem Cell-Derived Cardiomyocytes In Infarcted Hearts", Plos One, vol. 15, 2019, 20 pages.

White, et al., "Implanted Cell-Dense Prevascularized Tissues Develop Functional Vasculature That Supports Reoxygenation After Thrombosis", Tissue Engineering: Part A, vol. 20, No. 17-18, 2014, pp. 2316-2328.

Williams, et al., "A 3-D Human Model of Complex Cardiac ArrythmeiasA Platform for Generation of Chamber SPecific Cardiac Tissues and Disease Modeling Cardia", Acta Biomater, vol. 132, Sep. 15, 2021, 31 pages.

"MicroTissues® 3D Petri Dish® micro-mold Tech Evaluation kit", Millipore Sigma Catalog No. Z764116, 2019, pp. 1-3.

Hendrikse, et al., "Supramolecular Platform Stabilizing Growth Factors", Biomacromolecules, vol. 19, 2018, pp. 2610-2617.

Nunes, et al., "Biowire: A Platform for Maturation of Human Pluripotent Stem Cell-Derived Cardiomyocytes", Nature Methods, vol. 10, 2013, pp. 781-787.

Saini, et al., "3D Cardiac Microtissues Encapsulated With The Co-Culture of Cardiomyocytes and Cardiac Fibroblasts", Advanced Healthcare Materials, vol. 4, 2015, pp. 1961-1971.

Yang, et al., "Materials Stiffness-Dependent Redox Metabolic Reprogramming of Mesenchymal Stem Cells for Secretome-Based Therapeutic Angiogenesis", Advanced Healthcare Materials, vol. 8, 1900929, 2019, pp. 1-12.

"A Strategic Roadmap for Establishing New Approaches to Evaluate the Safety of Chemicals and Medical Products in the United States", Interagency Coordinating Committee on The Validation of Alternative Methods, Jan. 2018, pp. 441-452.

"Assessment of Pro-Arrhythmic Effects Using Pluricyte® Cardiomyocytes", on the ACEA xCELLigence® RTCA CardioECR, Mar. 2018, 15 pages.

"Preliminary Report: Effect of Encainide and Flecainide on Mortality in a Randomized Trial of Arrhythmia Suppression after Myocardial Infarction", The New England Journal of Medicine (NEJM), vol. 321, No. 6, 1989, pp. 406-412.

"Ranexa: Ranolazine Extended-Release tTblets", CV Therapeutics, NDA 21-526/S-002 Approval Letter, 2006, 13 pages.

Alinejad et al., "A systematic Review of the Cardiotoxicity of Methadone", EXCLI Journal, vol. 14, May 5, 2015, pp. 577-600.

Anversa et al., "Absolute Morphometric Study of Myocardial Hypertrophy in Experimental Hypertension. II. Ultrastructure of Myocytes and Interstitium", Laboratory Investigation, vol. 38, No. 5, May 1, 1978, pp. 597-609. (Abstract Only).

Anversa et al., "Stereological Measurement of Cellular and Subcellular Hypertrophy and Hyperplasia in the Papillary Muscle of Adult Rat", Journal of Molecular and Cellular Cardiology (JMCC), vol. 12, No. 8, 1980, pp. 781-795.

Armoundas et al., "Prognostic Significance of Electrical Alternans Versus Signal Averaged Electrocardiogram Predicting the Outcome of Electrophysiological Testing and Arrhythmia-Free Survival", Heart, vol. 80, 1998, pp. 251-256.

Asazuma-Nakamura et al., "Cx43 Contributes to TGF-β Signaling to Regulate Differentiation of Cardiac Fibroblasts into Myofibroblasts", Experimental Cell Research, vol. 315, No. 7, 2009, pp. 1190-1199.

Bashey et al., "Growth Properties and Biochemical Characterization of Collagens Synthesized by Adult Rat Heart Fibroblasts in Culture", Journal of Molecular and Cellular Cardiology, vol. 24, No. 7, 1992, pp. 691-700.

Beauchamp et al., "3D Co-culture of hiPSC-Derived Cardiomyocytes With Cardiac Fibroblasts Improves Tissue-Like Features of Cardiac Spheroids", Frontiers in Molecular Biosciences, vol. 7, Article 14, Feb. 2020, 17 pages.

Bergmann et al., "Dynamics of Cell Generation and Turnover in the Human Heart", Cell, vol. 161, No. 7, Jun. 18, 2015, pp. 1566-1575.

Bielawski et al., "Real-Time Force and Frequency Analysis of Engineered Human Heart Tissue Derived from Induced Pluripotent Stem Cells Using Magnetic Sensing", Tissue Engineering,, 2016, 31 pages.

Blinova et al., "Comprehensive Translational Assessment of Human-Induced Pluripotent Stem Cell Derived Cardiomyocytes for Evaluating Drug-Induced Arrhythmias", Toxicological Sciences, vol. 155, No. 1, 2017, pp. 234-247.

Zhou et al., "Recounting Cardiac Cellular Composition", Circulation Research, vol. 118, No. 3, Mar. 2, 2016, pp. 368-370.

Burridge et al., "Chemically Defined Generation of Human Cardiomyocytes", Nature Methods, vol. 11, No. 8, Aug. 2014, pp. 855-860.

Chen et al., "Application of the Cell Sheet Technique in Tissue Engineering (Review)", Biomedical Reports, vol. 3, No. 6, 2015, pp. 749-757.

Chong et al., "Human Embryonic-Stem-Cell-Derived Cardiomyocytes Regenerate Non-Human Primate Hearts", Nature, vol. 510, No. 7504, 2014, pp. 273-277.

Clement et al., "Expression and Function of β-Smooth Muscle Actin During Embryonic-Stem-Cell-Derived Ardiomyocyte Differentiation", Journal of Cell Science, vol. 120, No. 2, 2007, pp. 229-238.

Colatsky et al., "The Comprehensive in Vitro Proarrhythmia Assay (CiPA) Initiative—Update on Progress", Journal of Pharmacological and Toxicological Methods, vol. 81, 2016, pp. 15-20.

Desai et al., "Reversible Modulation of Myofibroblast Differentiation in Adipose-Derived Mesenchymal Stem Cells", Plos One, vol. 9, Issue 1, Jan. 2014, 12 pages.

Doble et al., "Basic Fibroblast Growth Factor Stimulates connexin-43 Expression and Intercellular Communication of Cardiac Fibroblasts", Molecular and Cellular Biochemistry, vol. 143, No. 1, 1995, pp. 81-87.

Dolnikov et al., "Functional Properties of Human Embryonic Stem Cell-Derived Cardiomyocytes: Intracellular Ca2? Handling and the Role of Sarcoplasmic Reticulum in the Contraction", Cells, vol. 21, No. 2, 2006, pp. 236-245.

Dutta et al., "Optimization of an In silico Cardiac Cell Model for Proarrhythmia Risk Assessment", Frontiers in Physiology, vol. 8, Article 616, Aug. 23, 2017, pp. 1-15.

(56) References Cited

OTHER PUBLICATIONS

Zhou et al., "Characterization and Standardization of Cultured Cardiac Fibroblasts for ex vivo Models of Heart Fibrosis and Heart Ischemia", Tissue Eng Part C Methods, vol. 12, No. 8, 2017, 43 pages.
Eghbali et al., "Localization of Types I, III and IV Collagen mRNAs in Rat Heart Cells by in situ Hybridization", Journal of Molecular and Cellular Cardiology, vol. 21, No. 1, 1989, pp. 103-113.
Evans et al., "TGF-β1-Mediated Fibroblast-Myofibroblast Terminal Differentiation—The Role of Smad Proteins", Experimental Cell Research, vol. 282, 2003, pp. 90-100.
Fahrenbach et al., "The Relevance of Non-Excitable Cells for Cardiac Pacemaker Function", Journal of Physiology, vol. 585.2, Oct. 4, 2007, pp. 565-578.
Fassbender, Melissa, "The Global Market for in Vitro Toxicity Testing is Predicted to Reach $8.8bn by 2023", Accsses through "https://www.outsourcing-pharma.com/Article/2018/08/02/Global-in-vitro-toxicity-testing-market-to-reach-8.8bn-by-2023", Aug. 2, 2018, 3 pages.
Fenichel et al., "Drug-Induced Torsade de Pointes and Implications for Drug Development", Journal of Cardiovascular Electrophysiology (JCE), vol. 15, No. 4, 2004, pp. 475-495.
Ferdinandy et al., "Definition of Hidden Drug Cardiotoxicity: Paradigmchange in Cardiac Safety Testing and its Clinical Implications", European Heart Journal, 2018, pp. 1-10.
Feric et al., "Engineered Cardiac Tissues Generated in the Biowire II: A Platform for Human-Based Drug Discovery", Toxicological Sciences, vol. 172, No. 1, 2019, pp. 89-97.
Gao et al., "Impact of Bisphenol A on the Cardiovascular System—Epidemiological and Experimental Evidence and Molecular Mechanisms", International Journal of Environmental Research and Public Health, vol. 11, No. 8, 2014, pp. 8399-8413.
Gerbin et al., "Enhanced Electrical Integration of Engineered Human Myocardium via Intramyocardial versus Epicardial Delivery in Infarcted Rat Hearts", PLoS One, vol. 10, No. 7, e0131446, Jul. 10, 2015, pp. 1-20.
Granato et al., "Generation and Analysis of Spheroids from Human Primary Skin Myofibroblasts: An Experimental System to Study Myofibroblasts Deactivation", Cell Death Discovery, vol. 3, No. 17038, Jul. 17, 2017, 10 pages.
Grimm et al., "A Human Population-Based Organotypic in Vitro Model for Cardiotoxicity Screening", ALTEX, vol. 35, No. 4, 2018, pp. 441-452.
Zhao et al., "A Multimaterial Microphysiological Platform Enabled by Rapid Casting of Elastic Microwires", Advanced Healthcare Materials, vol. 8, No. 5, e1801187, 2019, pp. 1-10.
Heranval et al., "Drugs with Potential Cardiac Adverse Effects: Retrospective Study in a Large Cohort of Parkinsonian Patients", Revue Neurologique, vol. 172, No. 4-5, 2016, pp. 318-323.
Herper, Matthew, "The Truly Staggering Cost of Inventing New Drugs", Accessed through "https://www.forbes.com/sites/matthewherper/2012/02/10/the-truly-staggering-cost-of-inventing-new-drugs/?sh=17dbe6bb4a94", Feb. 10, 2012, 5 pages.
Huang et al., "Matrix Stiffness—Induced Myofibroblast Differentiation is Mediated by Intrinsic Mechanotransduction", American Journal of Respiratory Cell and Molecular Biology, vol. 47, Issue 3, Sep. 2012, pp. 340-348.
Zhang et al., "Generation of Quiescent Cardiac Fibroblasts From Human Induced Pluripotent Stem Cells for In Vitro Modeling of Cardiac Fibrosis", Circulation Research, vol. 125, No. 5, 2019, pp. 552-566.
Ivey et al., "Defining the Cardiac Fibroblast", Circulation Journal, vol. 80, No. 11, Nov. 2016, pp. 2269-2276.
Jackman et al., "Engineered Cardiac Tissue Patch Maintains Structural and Electrical Properties After Epicardial Implantation", Biomaterials, vol. 159, 2018, pp. 48-58.
Johannesen et al., "Differentiating Drug-Induced Multichannel Block on the Electrocardiogram: Randomized Study of Dofetilide, Quinidine, Ranolazine, and Verapamil", Clinical pharmacology & Therapeutics, vol. 96, No. 5, Nov. 2014, pp. 549-558.
Johannesen et al., "Late Sodium Current Block for Drug-Induced Long QT Syndrome: Results From a Prospective Clinical Trial", Clinical Pharmacology & Therapeutics, vol. 99, No. 2, 2016, pp. 214-223.
Yan et al., "Bisphenol A and 17b-Estradiol Promote Arrhythmia in the Female Heart via Alteration of Calcium Handling", PLoS One, vol. 6, Issue 9, Sep. 2011, pp. 1-9.
Kofron et al., "Gq-Activated Fibroblasts Induce Cardiomyocyte Action Potential Prolongation and Automaticity in a 3D Microtissue Environment", American Journal of Physiology-Heart and Circulatory Physiology, vol. 313, No. 4, Jul. 14, 2017, 41 pages.
Kollmannsberger et al., "Tensile Forces Drive a Reversible Fibroblast-To-Myofibroblast Transition During Tissue Growth in Engineered Clefts", Science Advances, vol. 4, No. 1, eaao4881, Jan. 17, 2018, pp. 1-10.
Kreutziger et al., "Developing Vasculature and Stroma in Engineered Human Myocardium", Tissue Engineering: Part A, vol. 17, Nos. 9 and 10, 2011, pp. 1219-1228.
Lemoine et al., "Human Induced Pluripotent Stem Cell-Derived Engineered Heart Tissue as a Sensitive Test System for QT Prolongation and Arrhythmic Triggers", Circulation: Arrhythmia and Electrophysiology, vol. 11, e006035., Jul. 2018, 15 pages.
Liu et al., "Human Embryonic Stem Cell-Derived Cardiomyocytes Restore Function in Infarcted Hearts of Non-Human Primates", Nature Biotechnology, vol. 36, Issue 7, 2018, pp. 597-605.
Livak et al., "Analysis of Relative Gene Expression Data Using Real-Time Quantitative PCR and the 2-ΔΔCT Method", Methods, vol. 25, 2001, pp. 402-408.
Makarenko et al., "Passive Stiffness Changes Caused by Upregulation of Compliant Titin Isoforms in Human Dilated Cardiomyopathy Hearts", Circulation Research, vol. 95, No. 7, 2004, pp. 708-716.
Mason et al., "Electrocardiogramce Ranges Derived from 79,743 Ambulatory Subjects", Journal of Electrocardiology, vol. 40, No. 3, 2007, pp. 228-234e8.
Mckim, Jr et al., "Building a Tiered Approach to In Vitro Predictive Toxicity Screening: A Focus on Assays with In Vivo Relevance", Combinatorial Chemistry & High Throughput Screening, vol. 13, No. 2, 2010, pp. 188-206.
Miragoli et al., "Electrotonic Modulation of Cardiac Impulse Conduction by Myofibroblasts", Circulation Research, vol. 98, No. 6, 2006, pp. 801-810.
Wendel et al., "Functional Effects of a Tissue-Engineered Cardiac Patch From Human Induced Pluripotent Stem Cell-Derived Cardiomyocytes in a Rat Infarct Model", Stem Cells Translational Medicine, vol. 4, No. 11, Sep. 14, 2015, pp. 1324-1332.
Walsh et al., "β-adrenergic Modulation of Cardiac Ion Channels: Differential Temperature Sensitivity of Potassium and Calcium Currents", Journal of General Physiology, vol. 93, No. 5, 1989, pp. 841-854.
O'reilly et al., "Bisphenol A Binds to the Local Anesthetic Receptor Site to Block the Human Cardiac Sodium Channel", PLoS One, vol. 7, Issue 1, e41667, Jul. 27, 2012, pp. 1-11.
Okur et al., "Quantitative Evaluation of Ischemic Myocardial Scar Tissue By Unenhanced T1 Mapping Using 3.0 Tesla MR Scanner", Diagn Interv Radiol, vol. 20, 2014, pp. 407-413.
Onakpoya et al., "Post-Marketing Withdrawal of 462 Medicinal Products Because of Adverse Drug Reactions: A Systematic Review of the World Literature", BMC Medicine, vol. 14, No. 10, 2016, pp. 1-11.
Onakpoya et al., "Worldwide Withdrawal of medicinal products because of adverse drug reactions: a systematic Review and Analysis", Critical Reviews in Toxicology, vol. 46, No. 6, 2016, pp. 477-489.
Posnack et al., "The Adverse Cardiac Effects of Di(2-ethylhexyl)phthalate and Bisphenol A", Cardiovascular Toxicology, vol. 14, No. 4, May 9, 2014, pp. 339-357.
Quinn et al., "Electrotonic Coupling of Excitable and Nonexcitable Cells in the Heart Revealed by Optogenetics", Proceedings of the National Academy of Sciences (PNAS), vol. 113, No. 51, 2016, pp. 14852-14857.

(56) References Cited

OTHER PUBLICATIONS

Ramalho et al., "Drug-induced Life-Threatening Arrhythmias and Sudden Cardiac Death: A Clinical Perspective of Long QT, short QT and Brugada Syndromes", Portuguese Journal of Cardiology, vol. 37, No. 5, 2018, pp. 435-446.
Redfern et al., "Impact and Frequency of Different Toxicities Throughout the Pharmaceutical Life Cycle", The Toxicologist, e29, 2010, 1 page. (Abstract Only).
Riegler et al., "Human Engineered Heart Muscles Engraft and Survive Long-Term in a Rodent Myocardial Infarction Model", Circulation Research, vol. 117, Issue 8, Sep. 25, 2015, pp. 720-730.
Rinn et al., "Anatomic Demarcation by Positional Variation in Fibroblast Gene Expression Programs", PLoS Genetics, vol. 2, Issue 7, Jul. 2006, pp. 1084-1096.
Rook et al., "Differences in Gap Junction Channels Between Cardiac Myocytes, Fibroblasts, and Heterologous Pairs", American Journal of Physiology-Cell Physiology, vol. 263, No. 5, 1992, pp. C959-C977.
Rook et al., "Single Channel Currents of Homo- and Heterologous Gap Junctions Between Cardiac Fibroblasts and Myocytes", Pflfigers Arch, vol. 414, No. 1, 1989, pp. 95-98.
Ruan et al., "Mechanical Stress Conditioning and Electrical Stimulation Promote Contractility and Force Maturation of Induced Pluripotent Stem Cell-Derived Human Cardiac Tissue", Circulation, vol. 134, Issue 20, Nov. 15, 2016, pp. 1557-1567.
Rubart et al., "Electrical Coupling Between Ventricular Myocytes and Myofibroblasts in the Infarcted Mouse Heart", Cardiovascular Research, vol. 114, No. 3, 2017, 12 pages.
Waldo et al., "Effect of d-sotalol on Mortality in Patients with left ventricular Dysfunction after Recent and Remote Myocardial Infarction", Lancet, vol. 348, No. 1, 1996, pp. 7-12.
Rupert et al., "Hypertrophy Changes 3D Shape of hiPSC-Cardiomyocytes: Implications for Cellular Maturation in Regenerative Medicine", Cellular and Molecular Bioengineering, vol. 10, No. 1, Aug. 3, 2016, pp. 54-62.
Rupert et al., "IGF1 and NRG1 Enhance Proliferation, Metabolic Maturity, and the Force-Frequency Response in hESC-Derived Engineered Cardiac Tissues", Stem Cells International, vol. 2017, Article ID 7648409, 2017, 13 pages.
Rupert et al., "Practical Adoption of state-of-the-art hiPSC-cardiomyocyte Differentiation Techniques", PLoS One, vol. 15, Issue 3, e0230001, Mar. 10, 2020, pp. 1-13.
Rupert et al., "The Roles of Neuregulin-1 in Cardiac Development, Homeostasis, and Disease", Biomark Insights, vol. 10 (Suppl 1), 2015, pp. 1-9.
Sager et al., "Rechanneling the Cardiac Proarrhythmia Safety Paradigm: A Meeting Report from the Cardiac Safety Research Consortium", Cardiac Safety Research Consortium, American Heart Journal, vol. 167, No. 3, Mar. 2014, pp. 292-300.
Sekine et al., "Endothelial Cell Coculture Within Tissue-Engineered Cardiomyocyte Sheets Enhances Neovascularization and Improves Cardiac Function of Ischemic Hearts", Circulation, vol. 118, (14_suppl_1),, Mar. 7, 2015, pp. S145-S152.
Serrao et al., "Myocyte-Depleted Engineered Cardiac Tissues Support Therapeutic Potential of Mesenchymal Stem Cells", Tissue Engineering: Part A, vol. 18, Nos. 13 and 14, 2012, pp. 1322-1333.
Shah et al., "influence of Inherent Mechanophenotype on Competitive Cellular Adherence", Annals of Biomedical Engineering, vol. 45, No. 8, Aug. 2017, pp. 2036-2047.
Shinde et al., "The Role of a-Smooth Muscle Actin in Fibroblast-Mediated Matrix Contraction and Remodeling", Biochimica et Biophysica Acta, vol. 1863, No. 1, 2017, pp. 298-309.
Sousa et al., "Smooth Muscle a-Actin Expression and Myofibroblast Differentiation by TGFb are Dependent Upon MK2", Journal of Cellular Biochemistry, vol. 100, No. 6, 2007, pp. 1581-1592.
Strauss et al., "Comprehensive In Vitro Proarrhythmia Assay (CiPA) Update from a Cardiac Safety Research Consortium / Health and Environmental Sciences Institute / FDA Meeting", Therapeutic Innovation & Regulatory Science, vol. 53, No. 4, 2019, pp. 519-525.
Sullivan et al., "Extracellular Matrix Remodeling Following Myocardial Infarction Influences the Therapeutic Potential of Mesenchymal Stem Cells", Stem Cell Research & Therapy, vol. 5, No. 14, 2014, pp. 1-15.
Sun et al., "Brugada-Type Pattern on Electrocardiogram Associated with High-Dose Loperamide Abuse", The Journal of Emergency Medicine, vol. 54, No. 4, 2018, pp. 484-486.
Surawicz et al., "Cardiac Alternans: Diverse Mechanisms and Clinical Manifestations", Journals of the American College of Cardiology (JACC), vol. 20, No. 2, Aug. 1992, pp. 483-499.
Vozenin et al., "The Myofibroblast Markers—SM actin and B-actin are Differentially Expressed in 2 and 3-D Culture Models of Fibrotic and Normal Skin", Cytotechnology, vol. 26, No. 1, 1998, pp. 29-38.
Tiburcy et al., "Defined Engineered Human Myocardium With Advanced Maturation for Applications in Heart Failure Modeling and Repair", Circulation, vol. 135, Issue 19, May 9, 2017, pp. 1832-1847.
Tohyama et al., "Distinct Metabolic Flow Enables Large-Scale Purification of Mouse and Human Pluripotent Stem Cell-Derived Cardiomyocytes", Cell Stem Cell, vol. 12, Jan. 3, 2013, pp. 127-137.
Verkerk et al., "Patch-Clamp Recording from Human Induced Pluripotent Stem Cell-Derived Cardiomyocytes: Improving Action Potential Characteristics through Dynamic Clamp", International Journal of Molecular Sciences, vol. 18, No. 9, 2017, pp. 1-23.
Ismaili, et al., "Human Induced Pluripotent Stem Cell-Derived Cardiomyocytes as an Electrophysiological Model: Opportunities and Challenges—The Hamburg Perspective", Frontiers in Physiology, vol. 14, Feb. 16, 2023, pp. 1-10.
Kim, et al., "Directed Fusion of Cardiac Spheroids Into Larger Heterocellular Microtissues Enables Investigation of Cardiac Action Potential Propagation via Cardiac Fibroblasts", Plos One, vol. 13, No. 5, May 1, 2018, pp. 1-30.
Labarge, et al., "Maturation of Three-Dimensional, hiPSC Derived Cardiomyocyte Spheroids Utilizing Cyclic, Uniaxial Stretch and Electrical Stimulation", Plos One, vol. 14, No. 7, Jul. 5, 2019, pp. 1-18.
Pang, et al., "FDA Workshop on Improving Cardiotoxicity Assessment with Human-Relevant Platforms", Circulation Research, vol. 125, Oct. 11, 2019, pp. 855-867.
Efimov , et al., "Optical Mapping of Repolarization and Refractoriness from Intact Hearts", Circulation, vol. 90, No. 3, Sep. 1994, pp. 1469-1480.
Kofron , et al., "A Predictive in vitro Risk Assessment Platform for Pro Arrhythmic Toxicity Using Human 3D Cardiac Microtissues", Scientific Reports, vol. 11, No. 10228, 2021, 16 pages.
O'hara , et al., "Simulation of the Undiseased Human Cardiac Ventricular Action Potential: Model Formulation and Experimental Validation", PLoS Computational Biology, vol. 7, Issue 5, e1002061, May 2011, 29 pages.
International Search Report and Written Opinion received in International Application No. PCT/US2020/033394, mailed on Aug. 18, 2020, 9 pages.
Hayakawa et al., "Noninvasive Evaluation of Contractile Behavior of Cardiomyocyte Monolayers Based on Motion Vector Analysis", Tissue Engineering: Part C, vol. 18, Issue 1, pp. 21-32, Jan. 1, 2012 (English Abstract Submitted).
Munarin et al., "Laser-Etched Designs for Molding Hydrogel-Based Engineered Tissues", Tissue Engineering : Part C, vol. 23, No. 5, pp. 311-321, 2017.
Tandon et al., "Electrical Stimulation Systems for Cardiac Tissue Engineering", Nature Protocols, vol. 4, No. 2, pp. 155-173, Jan. 22, 2009.
Blinova et al., "International Multisite Study of Human-Induced Pluripotent Stem Cell-Derived Cardiomyocytes for Drug Proarrhythmic Potential Assessment", Cell Rep., vol. 24, No. 13, Sep. 25, 2018, pp. 3582-3592.
Rupert et al., "Human Cardiac Fibroblast No. and Activation State Modulate Electromechanical Function of hiPSC-Cardiomyocytes in Engineered Myocardium", Stem Cells International, vol. 2020, Article ID 9363809, 2020, 16 pages.
"High throughput cardiotoxicity assays using stem cell-derived cardiomyocytes", Molecular Devices,, 2015, 3 pages.

(56) References Cited

OTHER PUBLICATIONS

Aday, "Epidemiology of Peripheral Artery Disease and Polyvascular Disease", Circulation Research, vol. 128, No. 12, 2021, pp. 1818-1832.
Andrae, et al., "Role of Platelet-Derived Growth Factors in Physiology and Medicine", Genes & Development, vol. 22, No. 10, 2008, pp. 1276-1312.
Begley, et al., "Spherical Indentation of Freestanding Circular Thin Films in the Membrane Regime", Journal of the Mechanics and Physics of Solids, vol. 52, 2004, pp. 2005-2023.
Brady, et al., "Guided Vascularization in The Rat Heart Leads To Transient Vessel Patterning", APL Bioengineering, vol. 4, 2020, 11 pages.
Buikema, et al., "Wnt Activation and Reduced Cell-Cell Contact Synergistically Induce Massive Expansion of Functional Human iPSC-Derived Cardiomyocytes", Cell Stem Cell, vol. 27, Issue 1, Jul. 2, 2020, pp. 50-63.e1-e5.
Burnett, et al., "Human Induced Pluripotent Stem Cell (iPSC)—Derived Cardiomyocytes as an in Vitro Model in Toxicology: Strengths and Weaknesses for Hazard Identification and Risk Characterization", Expert Opinion on Drug Metabolism & Toxicology, vol. 17, No. 8, 2021, pp. 887-902.
Campia, et al., "Peripheral Artery Disease: Past, Present, and Future", The American Journal of Medicine, vol. 132, No. 10, 2019, pp. 1133-1141.
Caves, et al., "Elastin-Like Protein Matrix Reinforced with Collagen Microfibers for Soft Tissue Repair", Biomaterials, vol. 32, No. 23, Aug. 2011, pp. 5371-5379.
Caves, et al., "Fibrillogenesis in Continuously Spun Synthetic Collagen Fiber", Journal of Biomedical Materials Research Part B: Applied Biomaterials, vol. 93, Issue 1, Apr. 2010, pp. 1-31.
Cyganek, et al., "Deep Phenotyping of Human Induced Pluripotent Stem Cell-Derived Atrial and Ventricular Cardiomyocytes", JCI Insight, vol. 3, No. 12, e99941, Jun. 21, 2018, 17 pages.
Domenech, et al., "Tissue Engineering Strategies for Myocardial Regeneration: Acellular Versus Cellular Scaffolds?", Tissue Engineering. Part B, vol. 22, No. 6, 2016, pp. 438-458.
Elia, et al., "Stimulation of in Vivo Angiogenesis by in Situ Crosslinked, Dual Growth Factor-Loaded, Glycosaminoglycan Hydrogels", Biomaterials, vol. 31, 2010, pp. 4630-4638.
Ferrara, et al., "The Biology of VEGF and its Receptors", Nature Medicine, vol. 9, No. 6, Jun. 2003, pp. 669-676.
Gogiraju, et al., "Angiogenic Endothelial Cell Signaling in Cardiac Hypertrophy and Heart Failure", Frontiers in Cardiovascular Medicine, vol. 6, Article 20, Mar. 2019, 21 pages.
Gonzalez-Pujana, et al., "Multifunctional Biomimetic Hydrogel Systems to Boost the Immunomodulatory Potential of Mesenchymal Stromal Cells", Biomaterials, vol. 257, No. 120266, 2020, 12 pages.
Harada, et al., "Basic Fibroblast Growth Factor Improves Myocardial Function in Chronically Ischemic Porcine Hearts", Journal of Clinical Investigation, vol. 94, No. 2, Aug. 1994, pp. 623-630.
Hirt, et al., "Cardiac Tissue Engineering: State of the Art", Circulation Research, vol. 114, 2014, pp. 354-367.
Jin, et al., "Dynamic Fracture of a Bicontinuously Nanostructured Copolymer: A Deep-Learning Analysis of Big-Data-Generating Experiment", Journal of the Mechanics and Physics of Solids, vol. 164, 2022, pp. 1-22.
Kaiser, et al., "Custom Engineered Tissue Culture Molds from Laser-etched Masters", Journal of Visualized Experiments, vol. 135, e57239, 2018, pp. 1-7.
Kaiser, et al., "Digital Design and Automated Fabrication of Bespoke Collagen Microfiber Scaffolds", Tissue Engineering Part C: Methods, vol. 25, No. 11, 2019, pp. 687-700.
Kant, et al., "Integrated approaches to spatiotemporally directing angiogenesis in host and engineered tissues", Acta Biomater, vol. 69, 2018, pp. 42-62.
Kant, et al., "Patterned Arteriole-Scale Vessels Enhance Engraftment, Perfusion, and Vessel Branching Hierarchy of Engineered Human Myocardium for Heart Regeneration", Cells, vol. 12,, 2023, 26 pages.
Kant, et al., "Tissues with Patterned Vessels or Protein Release Induce Vascular Chemotaxis in an In Vitro Platform", Tissue Engineering: Part A. vol. 27, No. 19-20, 2021, pp. 1290-1304.
Khan, et al., "Fibroblast Growth Factor and Vascular Endothelial Growth Factor Play a Critical Role in Endotheliogenesis from Human Adipose-Derived Stem Cells", Journal of Vascular Surgery, vol. 65, Issue 5, May 2017, pp. 1483-1492.
Lemoine, et al., "Human iPSC-Derived Cardiomyocytes Cultured in 3D Engineered Heart Tissue Show Physiological Upstroke Velocity and Sodium Current Density", Scientific Reports, vol. 7, Article No. 5464, 2017, 13 pages.
Lian, et al., "Directed Cardiomyocyte Differentiation from Human Pluripotent Stem Cells by Modulating Wnt/b-Catenin Signaling Under Fully Defined Conditions", Nature Protocols, vol. 8, No. 1, 2013, pp. 162-175.
Lopez, et al., "Basic Fibroblast Growth Factor in a Porcine Model of Chronic Myocardial Ischemia: A Comparison of Angiographic, Echocardiographic and Coronary Flow Parameters", Journal of Pharmacology and Experimental Therapeutics, vol. 282, No. 1, Jul. 1997, pp. 385-390.
Lu, et al., "Effects of Vascular Endothelial Growth Factor and Insulin Growth Factor 1 on Proliferation, Migration, Osteogenesis and Vascularization of Human Carious Dental Pulp Stem Cells", Molecular Medicine Reports, vol. 20, 2019, pp. 3924-3932.
Menasche, et al., "Transplantation of Human Embryonic Stem Cell-Derived Cardiovascular Progenitors for Severe Ischemic Left Ventricular Dysfunction", Journal of the American College of Cardiology, vol. 71, No. 4, Jan. 30, 2018, pp. 429-438.
Minor, et al., "Abstract P1142: Engineering Vascular Therapies With Angiogenic Factors For Cardiac Regeneration And Tissue Remodeling", Circulation Research, vol. 131, Nov. 14, 2022, 5 pages.
Zhao, et al., "A Platform Generation of Chamber-Specific Cardiac Tissues and Disease Modeling", Cell, vol. 176, No. 4, Feb. 7, 2019, pp. 913-927.
Minor, et al., "Identifying Optimum Combinations of Growth Factors and Cytokines to Maximize Vascular Response in Vivo", Cardiovascular Student Research Symposium, 2021, 15 pages.
Minor, et al., "Identifying Potent Combinations of Angiogenic Factors to Engineer Cardiac Regenerative Therapies", NAVBO, Vasculata Boston,, 2021, 1 page.
Mirabella, et al., "3D-printed Vascular Networks Direct Therapeutic Angiogenesis in Ischaemia", Nature Biomedical Engineering, vol. 1, No. 6, Jun. 13, 2017, 8 pages.
Munarin, et al., "Engineered Human Myocardium with Local Release of Angiogenic Proteins Improves Vascularization and Cardiac Function in Injured Rat Hearts", Biomaterials, vol. 251, No. 120033, Apr. 12, 2020, 15 pages.
Munarin, et al., "Heparin-modified Alginate Microspheres Enhance Neovessel Formation in hiPSC-Derived Endothelial Cells and Heterocellular in Vitro Models by Controlled Release of Vascular Endothelial Growth Factor", Journal of Biomedical Materials Research, vol. 109, Issue 9, Mar. 17, 2021, pp. 1726-1736.
Nishimura, et al., "Formation of Vessel-Like Channel Using Alginate Fiber as a Sacrificial Structure", Proc. IEEE Int. Conf. Micro Electro Mech. Syst. (MEMS), 2017, pp. 596-599.
Niu, et al., "Vascular Endothelial Growth Factor as an Anti-angiogenic Target for Cancer Therapy", Current Drug Targets, vol. 11, No. 8, Aug. 2010, pp. 1000-1017.
Novosel, et al., "Vascularization is the Key Challenge in Tissue Engineering", Advanced Drug Delivery Reviews, vol. 63, 2011, pp. 300-311.
Peterson, et al., "Overview of Drug Development and Statistical Tools for Manufacturing and Testing", Chapter 15, Nonclinical Statistics for Pharmaceutical and Biotechnology Industries, 2016, pp. 383-414.
Pola, et al., "The Morphogen Sonic Hedgehog is an Indirect Angiogenic Agent Upregulating Two Families of Angiogenic Growth Factors", Nature Medicine, vol. 7, No. 6, Jun. 2001, pp. 706-711.
Reboucas, et al., "Cardiac Regeneration using Growth Factors: Advances and Challenges", Arquivos Brasileiros de Cardiologia, vol. 107, Issue 3, 2016, pp. 271-275.

(56) References Cited

OTHER PUBLICATIONS

Redd, et al., "Patterned Human Microvascular Grafts Enable Rapid Vascularization and Increase Perfusion in Infarcted Rat Hearts", Nature Communications, vol. 10, 2019, 14 pages.

Romagnuolo, "Human Embryonic Stem Cell-Derived Cardiomyocytes Regenerate the Infarcted Pig Heart but Induce Ventricular Tachyarrhythmias", Stem Cell Reports, vol. 12, No. 5, May 14, 2019., pp. 967-981.

Roser, et al., "Abstract P1141: Heparinized Alginate And Collagen-based Hydrogels Enhance Localized Vascularization in Ischemic Tissue", Circulation Research, vol. 131, Nov. 14, 2022, 5 pages.

Roser, Stephanie M., "Heparinized-Alginate Based Hydrogels for Revascularization in Ischemic Cardiac Disease", Thesis, Submitted in the Graduate Program of Biomedical Engineering at Brown University, May 2022, 50 pages.

Roser, Stephanie M, "Optimization of Heparinized Alginate-Based Hydrogels to Promote Vascularization in Cardiac Disease", Cardiovascular Student Research Symposium, 2021, 9 pages.

Ruel, et al., "Inhibition of the Cardiac Angiogenic Response to Surgical FGF-2 Therapy in a Swine Endothelial Dysfunction Model", Circulation, vol. 108, Suppl II, Sep. 9, 2003, pp. II-335-II-340.

Sack, et al., "Intra-Myocardial Alginate Hydrogel Injection Acts as a Left Ventricular Mid-Wall Constraint in Swine", Acta Biomaterialia, vol. 111, May 30, 2020, pp. 170-180.

\* cited by examiner

HUMAN IN VITRO CARDIOTOXICITY MODEL

CROSS REFERENCE TO RELATED APPLICATIONS

This application is a national phase filing under 35 U.S.C. § 371 of International Application No. PCT/US2020/033394 filed May 18, 2020, which claims priority from U.S. Provisional Patent Application No. 62/849,079 filed May 16, 2019 and U.S. Provisional Patent Application No. 63/013,406 filed Apr. 21, 2020, the entire contents of which are hereby incorporated by reference herein.

STATEMENT REGARDING FEDERALLY SPONSORED RESEARCH OR DEVELOPMENT

This invention was made with government support under U01 ES028184 and R01 HL135091, both awarded by the National Institutes of Health. The government has certain rights in the invention.

FIELD OF THE INVENTION

This invention relates generally to propagating, preserving, or maintaining cells in culture media, e.g., totipotent, pluripotent, or multipotent progenitor or precursor cells by tissue culture techniques, e.g., human or animal living cells or tissues, e.g., cardiomyocytes or heart cells. This invention also relates to toxicity testing for cardiovascular effects of chemicals and compounds, e.g., industrial chemicals and additives, pharmaceutical drugs and compounds in development, and molecules that are environmental toxicants.

BACKGROUND OF THE INVENTION

The cardiotoxicity of environmental and industrial chemicals and pharmaceutical drugs can be severe, even life threatening. This severity necessitates a thorough evaluation of the human response to chemical compounds to protect the safety of people and the environment. The U.S. Food & Drug Agency requires that pharmaceutical drugs be tested for cardiotoxicity during drug development to reduce the risk of life-threatening cardiac arrhythmias. But pharmaceutical failure due to fatal arrhythmia is the primary reason for post-market withdrawal, which increases the costs of developing new drugs.

The U.S. Environmental Protection Agency's ToxCast and Tox21 efforts synthesize and advance computational approaches to chemical safety evaluation. Nevertheless, the World Health Organization estimates that up to 23% of global cardiovascular disease may arise from chemical exposure. See Prüss-Üstün & Corvalán, World Health Organization (2006).

The high prevalence of drug-induced cardiotoxicity despite screening efforts has raised questions about the effectiveness cardiotoxic effects using methods and standards that include in silico, in vitro, and animal models. Initiatives set forth by the Interagency Coordinating Committee on the Validation of Alternative Methods (ICCVAM) call for the development and implementation of non-animal methods of assessing potential hazards associated with acute and chronic exposures to industrial chemicals and medical products. These initiatives point to a value in testing platforms based on a mechanistic understanding of toxicity.

There remains a need in the cardiotoxicity testing art for a more predictive human testing platform to enhance the risk stratification of cardiotoxicity. There is a need to predict arrhythmia rapidly and effectively, because arrhythmia is the leading manifestation of chemical toxicity and increases the risk for stroke, heart attack, heart failure, and sudden cardiac death.

SUMMARY OF THE INVENTION

The invention provides the Cardio-Tox Tissue Engineered Model (TEEM), a robust in vitro model for cardiotoxicity using three-dimensional (3D) human heart engineered tissues at a micro-scale (μm) and macro-scale (mm to cm) to quantify dose-dependent changes in electromechanical function and metabolic activity, calcium signaling and function, cell viability and cytotoxicity, and cellular and tissue structure for acute and chronic chemical exposure, resulting in a comprehensive risk assessment of test compounds. The invention also provides a predictive in vitro screening platform for pro-arrhythmic toxicity testing using human three-dimensional cardiac microtissues. The invention enables the screening of diverse genetic backgrounds for personalized medicine and population studies based on sex, race/ethnicity, disease status, and genetic background by using lines of human pluripotent stem cells to derive cardiomyocytes (atrial and ventricular) and human cardiac fibroblasts. The invention enables the screening of chemicals, environmental toxicants, and pharmaceutical compounds to establish safe human exposure levels.

In a first embodiment, the invention provides an in vitro model for cardiotoxicity assessment. The in vitro TEEM comprises human pluripotent stem cell-derived cardiomyocytes (hPSC-CMs) and human cardiac fibroblasts (hCF) in three-dimensional self-assembled microtissues. The model uses visual detection with high resolution for signal extraction and automated, unbiased quantification to define cardiovascular responses to chemicals.

In a second embodiment, the in vitro model consists essentially of about 5% human cardiac fibroblasts. In a third embodiment, the in vitro model consists essentially of about 95% hPSC-CM with high cardiac purity and about 5% human cardiac fibroblasts. In a fourth embodiment, the in vitro model consists essentially of 5% human cardiac fibroblasts. In a fifth embodiment, the in vitro model consists essentially of about 10% human cardiac fibroblasts. In a sixth embodiment, the in vitro model consists essentially of about 90% hPSC-CM and about 10% human cardiac fibroblasts. In a seventh embodiment, the in vitro model consists essentially of about 15% human cardiac fibroblasts. In an eighth embodiment, the in vitro model consists essentially of about 85% hPSC-CM and about 15% human cardiac fibroblasts.

In a ninth embodiment, the in vitro model further comprises electronic equipment capable of analyzing cardiotoxicity, e.g., arrhythmogenic or functional cardiotoxicity. In a tenth embodiment, the automated analysis of cardiotoxicity generates measurements of cardiac waveforms, e.g., excitation, calcium, contraction. In an eleventh embodiment, the measurements are selected from the group consisting of (1) excitability, (2) stimulation delay time (ms), (3) rise time (ms), (4) action potential duration (APD) to 30%, 50%, 80%, and 90% relaxation ($APD_{30}/APD_{50}/APD_{80}/APD_{90}$), (5) presence of early afterdepolarizations (EADs), (6) automaticity (Hz), (7) presence of delayed afterdepolarizations (DADs), (8) presence of cardiac alternans, (9) change in APD dispersion (ms), (10) APD triangulation, (11) calcium rise time, (12) calcium amplitude, (13) calcium duration to 30%, 50%, 80%, 90% of calcium transients ($CaD_{30}/CaD_{50}/$ $CaD_{80}/CaD_{90}$), (14) presence of spontaneous calcium release, (15) presence of calcium alternans, (16) contraction amplitude, (17) contraction maximum upstroke velocity ($V_{max}$ or $V_{up}$), (18) contraction relaxation time to 50% and 95% (T50 and T90), (19) contractile alternans, (20) extra contractions, and (21) type of contractile aberrations.

In one advantage of the invention, this tissue-engineered model responds appropriately to human physiological stimuli. In another advantage of the invention, this tissue-engineered model differentiates between high-risk and low-risk compounds by exhibiting HERG blockade with an integrated, multi-ion-channel response. In yet another advantage of the invention, this tissue-engineered model has a proven human-specific response to known physiological interventions such as the beta-adrenergic stimulant isoproterenol and faster pacing rates and to known ion channel inhibitors (e.g., E4031) and ion channel activators (e.g., BayK8644). In still another advantage of the invention, this tissue-engineered model has a proven human-specific arrhythmogenic response to the environmental endocrine-disrupting chemical bisphenol-A (BPA). The response shows an acute and sensitive disruption of action potential initiation in the nanomolar range. Thus, the invention addresses many of the current needs for screening industrial, environmental and pharmaceutical chemicals and compounds to establish safe human exposure levels.

In a twelfth embodiment, the invention provides a method of making the in vitro model for arrhythmogenic cardiotoxicity. Cells are cultured, harvested, and mixed in defined ratios; pipetted into molds for forming microtissues; allowed to settle into microtissue recesses; and cultured overnight to allow tissues to form through adhesion junctions. Consistent electrical pacing is provided as a stimulus during culture of the microtissues.

In a thirteenth embodiment, the invention provides a method of using the in vitro model for arrhythmogenic cardiotoxicity. The invention thus provides a method of screening test compounds. This tissue model is mounted on a temperature regulated chamber and loaded with reactive fluorescence dyes, e.g. voltage- or calcium-sensitive dyes. The tissue model is electrically stimulated with platinum electrodes to evoke action potentials. Action potentials and/or calcium transients and/or contractions are recorded with a high-speed camera. Multiple doses of test compounds are perfused and changes in action potential or calcium transient or contraction metrics are quantified to assess proarrhythmic, contractile, or other forms of cardiotoxicity induced by the test compounds. Tissues are exposed to compounds acutely (short term exposure, typically minutes to hours) or chronically (long term exposure, typically days).

In a fourteenth embodiment, the invention provides a method of screening test compounds for uses as pharmaceuticals. In a fifteenth embodiment, the invention provides a method of screening test compounds for uses in industry and for evaluating safe exposure levels from the environment.

In another advantage of the invention, the invention streamlines drug development, increases return on investment (ROI), and advances safe drugs for clinical testing. In yet another advantage of the invention, the invention streamlines toxicity testing, assesses toxicants, and improves the safety of the environment and people.

BRIEF DESCRIPTION OF THE DRAWINGS

FIG. 1 describes several steps in the differentiation of hiPSC-CM, formation of cardiac microtissues, and platform analysis.

FIG. 3(A) shows representative action potential traces ($V_m$ traces) from different molds (biological replicates) and different batches (technical replicates). FIG. 3(B) is a graph showing action potential duration distribution from 35 microtissues in a single mold. The values were averaged from all the pixels of single microtissues (~60 pixels/microtissue). FIG. 3(C) is a bar graph showing action potential duration variation. The action potential durations were measured at 0.5 Hz cycle length pacing. Beat-to-beat action potential duration variation (standard deviation) from the same microtissue was 8.7±4.8 ms (n>70 microtissues/batch, n=7 batches), between-microtissues-same-mold was 20.9±8.4 (n=2~3 molds/batch, n=7 batches), between-mold-same-batch was 11.7±8.9 ms (n=3 molds/batch, n+7 batches), and batch-to-batch was 33.1 ms (n=7 batches). FIG. 3(D) is a graph showing change in action potential duration with increasing pacing cycle length. FIG. 3(E) shows representative $V_m$ traces from the same microtissue at two time points. FIG. 3(F) is a graph showing the quantification of the stability of APDs over 20 minutes for three batches of microtissues. Values are means±SD. FIG. 3(G) is a chart showing the comparison of excitability from microtissues from the same batch with and without 5% hCF (n=3 experiments). Values are means±SD. FIG. 3(H) is a chart showing the comparison of action potential durations from microtissues from the same batch with and without 5% hCF (n=3 experiments). Values are means±SD. The data presented are without lactate purification of hiPSC-CMs.

FIG. 4(A) shows representative $V_m$ traces from 0 µM E4031 perfusion. FIG. 4(B) shows representative $V_m$ traces from 2 µM E4031 perfusion. FIG. 4(C) shows that APDs were further prolonged under 2 µM and additional beta-adrenergic stimulation using 100 nM isoproterenol (ISO), triggering early afterdepolarizations (EADs, red arrows). ISO alone did not evoke EADs (see FIG. 5(A)). FIG. 4(D) is a scatter plot of APDs (n=59-69 microtissues from two molds per group). Values in FIG. 4(D) are means±SD. FIG. 4(E) is a cumulative distribution of APDs (n=59-69 microtissues from two molds per group). FIG. 4(F) shows the quantification of EAD incidences under control conditions and with 2 µM E4031 and 100 nM isoproterenol (ISO).

FIG. 5(A) shows that under beta-adrenergic stimulation, 100 nM isoproterenol shortens action potential durations (red) in hiPSC-CM microtissues (166.6±17.7 compared with 120.1±10.5 under 100 nM isoproterenol; n=29 microtissues/group) as occurs physiologically in human ventricles. No afterdepolarizations were observed. FIG. 5(B) shows that 300 nM BayK increases action potential duration (red) of hiPSC-CM microtissues (100.0±24.6 compared with 133.8±29.3 ms, n=28 microtissues/group). FIG. 5(C) shows that $Ca^{2+}$ release by channel ryanodine receptor stimulation with 5 mM caffeine did not alter action potential durations of hiPSC-CM microtissues (85.9±12.5 compared with 90.5±22.3 ms; n=30 microtissues). Sea anemone toxin ATX, a voltage-gated sodium channel enhancer, was tested on a small number of microtissues. 4-aminopyridine (4-AP, fampridine, dalfampridine) was combined with other drugs for testing and was not tested alone.

FIG. 6(A) shows representative $V_m$ traces from microtissues formed from hiPSC-CMs with (red) and without lactate purification (black). Note the prolonged plateau phase and APD using hiPSC-$CM_{LP}$, which is more similar to adult human ventricular action potentials. FIG. 6(B) shows excitability of microtissues as the percentage of microtissues that developed action potentials in response to electrical stimulation. FIG. 6(C) shows action potential duration distribution from 35 microtissues in a single agarose micro-well mold. Values were averaged from all the pixels of single microtissues (~60 pixels/microtissue). FIG. 6(D) shows action potential duration variation: APDs were measured at 0.5 Hz cycle length pacing. Beat-to-beat APD variation (standard deviation) from the same microtissue (technical replicates) was assayed. FIG. 6(E) is a graph showing the cumulative distribution of improved APDs with lactate purification of cardiomyocytes (black: without lactate; red: with lactate). FIG. 6(F) is a graphical comparison of APDs from microtissues from the same experimental batch with and without lactate purification (n=4 experiments). Values are means±SD.

FIG. 7(A) shows representative $V_m$ traces from a microtissue before and after perfusion with 2 µM E4031. EADs are marked with red stars. FIG. 7(B) is a scatter plot of APDs with a significant increase in APD with 2 µM E4031, where blue squares show microtissues with no EADs and red stars indicate microtissues with EADs. Note the overlap in EAD-positive and -negative responses with consistent increased APD that shows a robust response even with variation within one hiPSC line. FIG. 7(C) shows the cumulative distribution of APDs (n=33 microtissues per group). FIG. 7(D) shows representative $V_m$ traces from a microtissue before and after exposure to 10 µM ranolazine. FIG. 7(E) is a scatter plot of APDs; there is no change with ranolazine exposure in the clinically therapeutic concentration range (shown). Values in FIG. 7(E) are means±SD. FIG. 7(F) is cumulative distribution of APDs. These results indicate that the microtissue can differentiate a high risk compound (E4031) vs. a low risk compound (ranolazine).

FIG. 8(A) shows representative $V_m$ traces from 0, 10, 100 µM ranolazine, and 100 µM ranolazine plus 50 nM isoproterenol. FIG. 8(B) is an AP parameter summary bar graph. Values are means±SD. FIG. 8(C) shows cumulative plots for rise time. FIG. 8(D) shows cumulative plots for action potential duration. FIG. 8(E) is a cumulative plots for $APD_{TRI}$. The plots show moderate APD changes within a safety criteria of QT prolongation until 100 M ranolazine.

FIG. 9(A) shows representative $V_m$ traces from 0, 1, 10, and 100 nM BPA. FIG. 9(B) is an action potential parameter summary bar graph. Values are means±SD. FIG. 9(C) shows cumulative plots for rise time. FIG. 9(D) shows cumulative plots for $APD_{80}$.

DETAILED DESCRIPTION OF THE INVENTION

Industrial Applicability

Figure 1A:
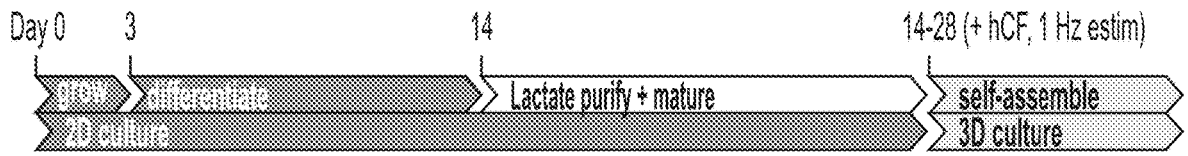
FIG. 1(A) is a timeline of cardiomyocytes differentiation from human-induced pluripotent stem cells (hiPSCs) and lactate purification. Wnt signaling was activated at day 1 and inhibited at day 3. A cardiac phenotype, as indicated by beating cells, was visible between day 8 and day 12. Cardiomyocytes differentiated from hiPSCs were used to produce microtissues between day 14 and day 18 of differentiation or were further purified with a lactate protocol.

It is well recognized in the cardiotoxicity testing art that the HERG assay does not assess all drug-induced cardiac arrhythmia mechanisms and can lead to unnecessary discontinuation of compounds from development. See Ferdinandy et al. (2018); Alinejad et al. (2015); Heranval et al. (2016); Sun et al. (2018); and Ramalho & Freitas (2018). The current standard for cardiotoxicity testing using the HERG assay is widely viewed as insufficient. See Sager et al. (2014).

Existing proarrhythmia assays have limitations. Animal models are complex and have limited predictability of human biological responses due to species-specific differences in ion channel expression that effect depolarization and repolarization kinetics of cardiac action potentials (APs) and differential sensitivity to pharmacological agents. See Tanner & Beeton (2018), and Bracken (2009). In vitro cell-based models are often limited to two-dimensional monolayers and lack non-cardiomyocytes, which affect the arrhythmogenic phenotype. See Kurokawa & George (2016). Human ether-go-go (HERG) channel blockade and QTc prolongation have long been used as effective and selective 'biomarkers' in compound screening to identify pro-arrhythmic risk that cause Torsades de Pointes (TdP). See Haraguchi et al. (2015), and Wacker & Noskov (2018). It is now recognized this approach does not capture all drug-induced cardiac arrhythmia mechanisms. See Ferdinandy et al. (2018); Alinejad et al. (2015); Heranval et al. (2016); Sun et al. (2018); and Ramalho & Freitas (2018). This approach can lead to unnecessary discontinuation of compounds from development by producing false positives for drugs that are known not to be clinically arrhythmogenic. See Singh & Wadhani (2004); Wu et al. (2008); Singh (2006).

Many groups are using approaches with human iPSC-derived cardiomyocytes, such as two-dimensional monolayers of cells. These groups include the FDA's CiPA initiative (Strauss et al. (2019)) as well as commercial companies and academic research groups. These approaches include three-dimensional engineered tissue, including the "Biowire" platform from Tara Biosciences (New York, NY, USA). For a strategic roadmap for developing predictive in vitro models, see the report by the Interagency Coordinating Committee on the Validation of Alternative Methods (ICCVAM).

Culture conditions of human induced pluripotent stem cell-derived cardiomyocytes impact their physiology and electrophysiology. Assays using two-dimensional monolayers of human induced pluripotent stem cell-derived cardiomyocytes are used because of their ease of adoption, but they have less robust excitation and a less mature cardiac phenotype compared to three-dimensional tissues, which reduces output, increases variation, and may decrease predictive power. Two-dimensional micro-electrode arrays (MEAs) are often used to record electrical activity from two-dimensional cultured cells, which is a simple solution. Micro-electrode array signals are often difficult to interpret and have reduced fidelity of the action potential waveform. In a publication of the CiPA initiative using two-dimensional monolayers of spontaneously beating human induced pluripotent stem cell-derived cardiomyocytes, the false negative rate of twenty-five drugs tested in vitro was high. See Strauss et al. (2019). This rate resulted in a calculated sensitivity of only 47-79% using either VSD or micro-electrode array detection with two human induced pluripotent stem cell sources. Thus, 20-50% of the time, drugs were not detected in the assay as cardiotoxic when the label on the drug listed arrhythmogenic cardiotoxicity, e.g., fatal Torsades de pointes arrhythmias. In TABLE 2, the inventors compare the invention to other technologies using human induced pluripotent stem cell-derived cardiomyocytes.

The invention provides an efficient and reliable screening for arrhythmia, which inform guidelines for clinicians about safe dosing. Increased accuracy and throughput of drug screening benefits pharma companies, as drug-induced cardiotoxicity remains the leading cause of drug attrition during pharmaceutical development and withdrawal from the market. More accurate predictive screening reduces costs, reduces liability, saves time, and reduces animal testing. More accurate predictive screening increases return-on-investment.

The invention provides high sensitivity and specificity of cardiotoxicity evaluation that identifies mechanisms of arrhythmia to enable compound re-formulation to reduce toxicity. The FDA launched the Comprehensive In Vitro Proarrhythmia Assay (CiPA) initiative. Strauss et al. (2019). This initiative recognized the need for advanced screening using human pluripotent stem cell-derived cardiomyocytes (hPSC-CMs). This initiative also identified seven human-specific ion currents that control cardiac excitation via the action potential (AP) and impact the development of cardiac arrhythmias.

The FDA published a list of twenty-eight drugs for validating new in vitro arrhythmia assays. These twenty-eight drugs have no/low, moderate, or high risk for arrhythmia in patients, This list of twenty-eight drugs sets new standards for screening technologies.

The advanced arrhythmia screening with the invention reduces pre-clinical animal testing, which is being eliminated by new European policies, partly because of the poor predictive power of animal models for human responses, due to species-specific differences.

The early adopters of this invention may be pharmaceutical companies and contract research organizations (CROs) that perform pro-arrhythmia testing with the HERG assay. Replacing the HERG assay for cardiotoxicity testing is being encouraged by global consortia and the FDA's CiPA initiative. This invention can replace the HERG assay for cardiotoxicity testing.

Figure 9:
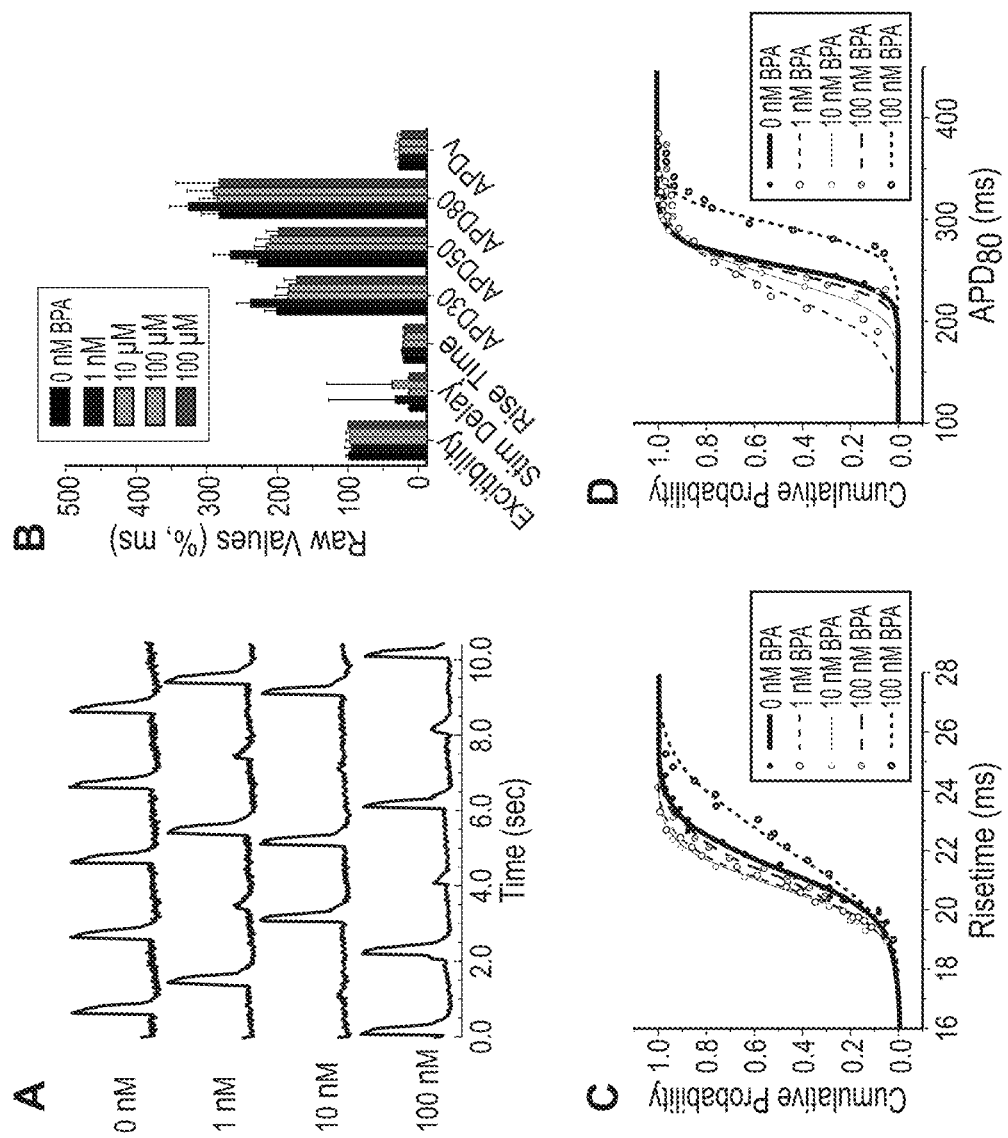
FIG. 9 is a set of figures showing that hiPSC-$CM_{LP}$ microtissues show excitation delays and action potential duration changes in response to environmental chemical bisphenol-A (BPA).

The invention makes important advances beyond what is proposed by the FDA CiPA initiative using hPSC-CMs, particularly for using a three-dimensional model and high resolution quantitative metrics compared to two-dimensional hPSC-CM assays in use by the FDA CiPA initiative, which is a component. See FIG. 9.

The invention provides other ways to curb the loss of time and money with current drug failures due to cardiotoxicity, which cause at 27% preclinical and 45% post market withdrawal.

The reduced return on investment (ROI) for pharma globally suggests that measures to make the drug development pipeline leaner should be favorably received. The invention could do this in several ways through the scientific underpinnings to accurately predict arrhythmia, implementation in early phases of drug development, and potential future reduction in costly animal testing. Further alignment of the invention with the Health and Environmental Sciences Institute can drive broad adoption by pharma and other agencies needing and evaluating toxicity testing data (such as the FDA and EPA) to increase the market value and size.

The Cardio-Tox TEEM platform has advantages as compared to the current in vitro cardiotoxicity testing assays and other models in development. See TABLE 2, EXAMPLE 2, below. The invention is compared to the FDA's CiPA platform and Biowire, which are the leading technologies for cardiotoxicity testing of pharmaceutical compounds. The standards to assess this differentiation includes (1) evaluation of platform specificity and sensitivity, particularly regarding low-risk compounds, and (2) an accurate assessment of compound screening throughput.

To be predictive of actual adverse clinical arrhythmic risk, arrhythmia models for drugs should be expanded to evaluate both trigger and substrate mechanisms for reentry in a human cardiac electrophysiology platform that can represent the diverse human population and comorbidities. The invention provides the basis for evaluating substrate-based mechanisms leading to arrhythmia risk, and also other mechanisms of cardiotoxicity like structural and metabolic cardiotoxicity.

The invention also provides highly predictive preclinical models of human drug-induced proarrhythmic risk using hPSC-CMs and human cardiac fibroblasts in larger three-dimensional engineered tissues for testing arrhythmia substrates such as slow conduction and reentry formation as a secondary screening platform.

The invention provides a screening platform that can be validated to represent the most vulnerable subpopulation in genetically diverse human population and comorbidities such as ischemia, myocardial infarction, and heart failure.

Definitions

For convenience, the meaning of some terms and phrases used in the specification, examples, and appended claims, are listed below. Unless stated otherwise or implicit from context, these terms and phrases have the meanings below. These definitions are to aid in describing particular embodiments and are not intended to limit the claimed invention. Unless otherwise defined, all technical and scientific terms have the same meaning as commonly understood by one of ordinary skill in the art to which this invention belongs. For any apparent discrepancy between the meaning of a term in the art and a definition provided in this specification, the meaning provided in this specification shall prevail.

"Cardiac fibroblasts" has the cell biological-art recognized meaning of a cell from the heart that produces connective tissue. Unlike the connective tissue of bone and tendon, which is organized into regular patterns of collagen, heart ECM is dense, irregular, and composed of collagens, proteoglycans, and glycoproteins. See, Ivey et al., Defining the cardiac fibroblast. Circ. J., 80(11), 2269-2276 (2016).

"hCF" has the cell biological-art recognized meaning of human cardiac fibroblasts.

"HERG" is the human ether-a-go-go-related rapidly activating delayed rectifier potassium channel that produces the rapid repolarizing potassium current $I_{Kr}$.

"HERG assay" is the HERG channel (the alpha subunit of a potassium ion channel) inhibition assay is a sensitive measurement which identifies compounds exhibiting cardiotoxicity related to HERG inhibition in vitro and predicts cardiotoxicity related to HERG inhibition for the compounds in vivo. Not all compounds which inhibit HERG activity in vitro will cause cardiotoxicity in vivo. The FDA maintains regulatory guidelines to screen for the most noxious compounds based on their interaction with a single potassium channel (HERG, $I_{Kr}$) (the "HERG assay"). The HERG assay does not identify drugs as toxic if they impact electrical activity of human cardiomyocytes in other ways that may produce arrhythmias in patients, e.g., by affecting other ion channels.

"hESC" has the cell biological-art recognized meaning of human embryonic stem cells.

"hPSC" has the cell biological-art recognized meaning of human pluripotent stem cells.

"hiPSC" has the cell biological-art recognized meaning of human induced pluripotent stem cells.

"hiPSC-CMs" has the cell biological-art recognized meaning of human induced pluripotent stem cell-derived cardiomyocytes.

"hiPSC-CM$_{LP}$" has the cell biological-art recognized meaning of human induced pluripotent stem cell-derived cardiomyocytes with lactate purification.

Guidance from the Prior Art

A person of ordinary skill in the cardiotoxicity testing art can use these patents, patent applications, and scientific references as guidance to predictable results when making and using the invention.

U.S. Pat. No. 8,318,488 B1 (Bohlen et al.). The patent provides assay systems for determining the therapeutic or toxic effect of a putative drug based on assaying its activity in cells differentiated in vitro from stem cells and induced to display a phenotype that resembles a disease to be treated.

U.S. Pat. No. 8,703,483 B2 (Cezar). The patent provides biomarker profiles of cellular metabolites and methods for screening chemical compounds including pharmaceutical agents lead and candidate drug compounds and other chemicals using human embryonic stem cells (hESC) or lineage-specific cells produced therefrom. The methods are useful for testing toxicity particularly developmental toxicity and detecting teratogenic effects of such chemical compounds.

U.S. Pat. No. 9,085,756 B2 (Fisk). This patent provides a system for producing pancreatic islet cells from embryonic stem cells. Differentiation is initiated towards endoderm cells and focused using reagents that promote emergence of islet precursors and mature insulin-secreting cells. High quality populations of islet cells can be produced in commercial quantities for research drug screening or regenerative medicine.

U.S. Pat. No. 9,273,286 (Ma) discloses compositions and methods for enhancing cardiac differentiation efficiency of stem cells or promoting ventricular and atrial cardiomyocytes formation from stem cells, and the uses of the differentiated cardiomyocytes for repairing cardiac injuries and screening for new medicaments for treating cardiac injuries.

U.S. Pat. No. 10,048,275 B2 (Kralj et al.). The patent identifies compounds by exposing a plurality of cardiomyocytes to a compound wherein the cardiomyocytes express an optogenetic reporter of membrane potential and an optogenetic reporter of calcium level; receiving light from the optogenetic reporter of membrane potential; creating an action potential waveform using the received light; and analyzing the action potential waveform to determine the presence or absence of a risk for arrhythmia associated with the compound.

U.S. Pat. No. 10,113,150 B2 (Invivosciences). The patent describes an engineered cardiac tissue that contains fibroblast cells and an extracellular matrix component.

WO 2018/195166 A1 (Coyne Scientific, LLC). This publication discloses a method for estimating the responses of an individual person of interest to a chemical or biological agent before exposing the person to that agent in vivo. Such estimations or predictions may forecast the likelihood and/or magnitude of response by the person of interest. The method uses induced pluripotent stem cells (iPSCs) derived from tissues from the person of interest and both stem cells and relevant medical or health information drawn from several individuals exposed to the agent in vivo.

AU 2014/323098 A1 (Repairon GmbH). This publication is directed to a method for producing bioengineered heart muscle (BHM) from pluripotent stem cells comprising the steps of inducing mesoderm differentiation cardiac differentiation and cardiac maturation by directed tissue formation. The method is a robust serum-free and reproducible way to produce BHM for multiple applications and applies to multiple pluripotent stem cell lines. The publication is also directed to the BHM produced by the method disclosed and to uses of the BHM in pharmacologic and toxicity screenings and its use in medicine.

CA 2,886,396 A1 (Institute Of Biophysics, Chinese Academy Of Sciences). This publication provides a method for inducing pluripotent stem cells to differentiate into ventricular myocytes in vitro which is achieved by maintaining amplifying and culturing pluripotent stem cells in vitro adding a substance capable of activating the Smad1/5/8 signaling pathway directly or indirectly into the culture medium when pluripotent stem cells are in the middle stage of myocardial differentiation i.e. the period of differentiating into cardiac muscle cells from mesoderm cells or myocardial precursor cells which enables stem cells to differentiate into ventricular myocytes directionally.

Abbott & Roepke, Pharmacogenetics of drug-induced arrhythmias. Expert Rev. Clin. Pharmacol., 1, 93-104 (2008).

Alexandre et al., Anticancer drug-induced cardiac rhythm disorders: Current knowledge and basic underlying mechanisms. Pharmacol. Ther. 189, 89-103, (2018).

Alinejad et al., A systematic review of the cardiotoxicity of methadone. EXCLI J., 14, 577-600 (2015).

Anversa et al., Absolute morphometric study of myocardial hypertrophy in experimental hypertension. II. Ultrastructure of myocytes and interstitium. Lab. Invest., 38(5), 597-609 (1978).

Anversa et al., Stereological measurement of cellular and subcellular hypertrophy and hyperplasia in the papillary muscle of adult rat. J. Mol. Cell Cardiol., 12(8), 781-795 (1980).

Archer et al. Characterization and validation of a human 3D cardiac microtissue for the assessment of changes in cardiac pathology. Sci. Rep., 8, 10160 (2018).

Armoundas et al., Prognostic significance of electrical alternans versus signal averaged electrocardiogram predicting the outcome of electrophysiological testing and arrhythmia-free survival. Heart, 80(3), 251-256 (1998).

Asahi et al., On-chip spatiotemporal electrophysiological analysis of human stem cell derived cardiomyocytes enables quantitative assessment of proarrhythmia in drug development. Sci. Rep. 8(1) (December 2018).

Asazuma-Nakamura et al., Cx43 contributes to TGF-β signaling to regulate differentiation of cardiac fibroblasts into myofibroblasts. Exp Cell Res., 315(7), 1190-1199 (2009).

Barnes & Hollands, Drug-induced arrhythmias. Crit. Care Med., 38, S188-197 (2010).

Bashey et al., Growth properties and biochemical characterization of collagens synthesized by adult rat heart fibroblasts in culture. J. Mol. Cell Cardiol., 24(7), 691-700 (1992).

Beauchamp et al., 3D co-culture of hiPSC-derived cardiomyocytes with cardiac fibroblasts improves tissue-like features of cardiac spheroids. Front. Mol. Biosci., 7, 14 (2020).

Berenfeld & Efimov, Optical Mapping. Card. Electrophysiol. Clin., 11(3), 495-510 (2019).

Bergmann et al., Dynamics of cell generation and turnover in the human heart. Cell, 161(7), 1566-1575 (2015).

Bielawski et al., Real-time force and frequency analysis of engineered human heart tissue derived from induced pluripotent stem cells using magnetic sensing. Tissue Eng. Part C Methods (September 2016).

Blinova et al., Comprehensive translational assessment of human-induced pluripotent stem cell derived cardiomyocytes for evaluating drug-induced arrhythmias. Toxicol. Sci., 155(1), 234-47 (2017).

Blinova et al., International multisite study of human-induced pluripotent stem cell-derived cardiomyocytes for drug proarrhythmic potential assessment. Cell Reports, 24(13), 3582-92 (2018).

Bossu et al., A 2015 focus on preventing drug-induced arrhythmias. Expert Rev. Cardiovasc. Ther. 14, 245-253 (2016).

Bouchard et al., Prenatal exposure to organophosphate pesticides and IQ in 7-year-old children. Environ. Health Perspect. 119(8), 1189-95 (August 2011).

Bracken, Why animal studies are often poor predictors of human reactions to exposure. J R Soc Med. 102(3):120-2 (2009).

Burke et al., Developmental neurotoxicity of the organophosphorus insecticide chlorpyrifos: from clinical findings to preclinical models and potential mechanisms. J. Neurochem. (2017).

Burridge et al., Chemically defined generation of human cardiomyocytes. Nature Methods, 11(8), 855-860 (2014).

Cardiac Arrhythmia Suppression Trial (CAST) Investigators, Preliminary report: effect of encainide and flecainide on mortality in a randomized trial of arrhythmia suppression after myocardial infarction. N. Engl. J. Med., 321, 406-412 (August 1989).

Chen et al., Application of the cell sheet technique in tissue engineering. Biomed. Reports, 3(6), 749-757 (2015).

Chong et al., Human embryonic-stem-cell-derived cardiomyocytes regenerate non-human primate hearts. Nature, 510(7504), 273-277 (2014).

Clement et al., Expression and function of -smooth muscle actin during embryonic-stem-cell-derived cardiomyocyte differentiation. J. Cell Sci., 120(2), 229-238 (2007).

Colatsky et al., The comprehensive in vitro proarrhythmia assay (CiPA) initiative—Update on progress. J. Pharmacol. Toxicol. Methods, 81, 15-20 (2016).

Curigliano et al., Cardiotoxicity of anticancer treatments: Epidemiology, detection, and management. CA Cancer J. Clin., 66, 309-325 (2016).

Cyprotex. Structural 3D cardiotoxicity assay. (Cytoprex (Evotec), Watertown, MA, USA).

Desai et al., Reversible modulation of myofibroblast differentiation in adipose-derived mesenchymal stem cells. PLoS One, 9(1), e86865 (2014).

Desroches et al., Functional scaffold-free 3-D cardiac microtissues: a novel model for the investigation of heart cells. Am. J. Physiol. Heart Circ. Physiol., 302(10):H2031-42 (2012).

Doble & Kardami, Basic fibroblast growth factor stimulates connexin-43 expression and intercellular communication of cardiac fibroblasts. Mol. Cell Biochem., 143(1), 81-87 (1995).

Dolnikov et al., Functional properties of human embryonic stem cell-derived cardiomyocytes: intracellular Ca2+ handling and the role of sarcoplasmic reticulum in the contraction. Stem Cells, 24(2), 236-245 (2006).

Drimal et al., Cardiovascular toxicity of the first line cancer chemotherapeutic agents: doxorubicin, cyclophosphamide, streptozotocin and bevacizumab. Neuro. Endocrinol. Lett., 27 Suppl. 2, 176-179 (2006).

Duan et al., Anticancer drugs-related QTc prolongation, torsade de pointes and sudden death: Current evidence and future research perspectives. Oncotarget, 9, 25738-25749 (2018).

Dutta et al., Optimization of an in silico cardiac cell model for proarrhythmia risk assessment. Front. Physiol., 8, 616 (2017).

Eghbali et al., Localization of types I, Ill and IV collagen mRNAs in rat heart cells by in situ hybridization. J. Mol. Cell. Cardiol., 21(1), 103-113 (1989).

Evans et al., TGF-β1-mediated fibroblast-myofibroblast terminal differentiation—the role of smad proteins. Exp. Cell Res., 282(2), 90-100 (2003).

Evans & Cooke, Cardiac effects of anthracycline treatment and their implications for aeromedical certification. Aviat. Space Environ. Med. 74, 1003-1008 (2003).

Fahrenbach et al., The relevance of non-excitable cells for cardiac pacemaker function. J. Physiol., 585(Pt 2), 565-578 (2007).

Fassbender, Global in vitro toxicity testing market to reach $8.8 bn by 2023, Outsourcing-pharma.com (Aug. 2, 2018).

Fenichel et al., Drug-induced torsades de pointes and implications for drug development. J. Cardiovasc. Electrophysiol., 15, 475-495 (2004).

Ferdinandy et al., Definition of hidden drug cardiotoxicity: paradigm change in cardiac safety testing and its clinical implications. Eur. Heart J. (2018).

Feric et al., Engineered cardiac tissues generated in the Biowire II: A platform for human-based drug discovery. Toxicol. Sci. (2019).

Fleischer et al., Comprehensive human stem cell differentiation in a 2D and 3D mode to cardiomyocytes for long-term cultivation and multiparametric monitoring on a multimodal microelectrode array setup. Biosens. Bioelectron., 126, 624-31 (2019).

Flitter, Court tosses petition to force U.S. to ban pesticide. Reuters, New York, Jul. 18, 2017.

Gao & Wang, Impact of bisphenol A on the cardiovascular system-Epidemiological and experimental evidence and molecular mechanisms. Int. J. Environ. Res. Public Health., 11(8), 8399-413 (2014).

Gerbin et al., Enhanced electrical integration of engineered human myocardium via intramyocardial versus epicardial delivery in infarcted rat hearts. PLoS One., 10(7), e0131446 (2015).

Gintant et al., Evolution of strategies to improve preclinical cardiac safety testing. Nat Rev Drub Discov. 15(7):457-71 (2016).

Granato et al., Generation and analysis of spheroids from human primary skin myofibroblasts: an experimental system to study myofibroblasts deactivation. Cell Death Discov., 3, 17038 (2017).

Grimm et al., A human population-based organotypic in vitro model for cardiotoxicity screening. ALTEX, 35(4), 441-52 (2018).

Guglin et al., Introducing a new entity: chemotherapy-induced arrhythmia. Europace, 11, 1579-1586 (2009).

Haraguchi et al., Electrophysiological analysis of mammalian cells expressing HERG using automated 384-well-patch-clamp. BMC Pharmacol. Toxicol., 16, 39 (2015).

Haverkamp et al., The potential for QT prolongation and pro-arrhythmia by non-anti-arrhythmic drugs: clinical and regulatory implications. Report on a policy conference of the European Society of Cardiology. Cardiovasc. Res., 47, 219-233 (2000).

Henning & Harbison, Cardio-oncology: cardiovascular complications of cancer therapy. Future Cardiol., 13, 379-396 (2017).

Heranval et al., Drugs with potential cardiac adverse effects: Retrospective study in a large cohort of parkinsonian patients. Rev. Neurol. (Paris), 172(4-5), 318-23 (2016).

Huang et al., Matrix stiffness-induced myofibroblast differentiation is mediated by intrinsic mechanotransduction. Am. J. Respir. Cell Mol. Biol., 47(3), 340-348 (2012).

Interagency Coordinating Committee on the Validation of Alternative Methods (ICCVAM). A strategic roadmap for establishing new approaches to evaluate the safety of chemicals and medical products in the United States (January 2018).

Jackman et al., Engineered cardiac tissue patch maintains structural and electrical properties after epicardial implantation. Biomaterials, 159, 48 (2018).

Jahnke et al., A novel 3D label-free monitoring system of hES-derived cardiomyocyte clusters: A step forward to in vitro cardiotoxicity testing. PLoS One, 8(7), e68971 (2013).

Johannesen et al., Differentiating drug-induced multichannel block on the electrocardiogram: randomized study of dofetilide, quinidine, ranolazine, and verapamil. Clin. Pharmacol. Ther., 96(5), 549-58 (2014).

Johannesen et al., Late sodium current block for drug-induced long QT syndrome, Results from a prospective clinical trial. Clin. Pharmacol. Ther., 99(2), 214-23 (2016).

Kaiser et al., Optimizing Blended Collagen-Fibrin Hydrogels for Cardiac Tissue Engineering with Human iPSC-derived Cardiomyocytes. ACS Biomater Sci Eng., 5(2):887-899 (2019).

Kim et al., Directed fusion of cardiac spheroids into larger heterocellular microtissues enables investigation of cardiac action potential propagation via cardiac fibroblasts. PLoS One, 13(5), e0196714 (2018).

Kofron & Mende, In vitro models of the cardiac microenvironment to study myocyte and non-myocyte crosstalk: bioinspired approaches beyond the polystyrene dish. J. Physiol., 595(12), 3891-3905 (2017).

Kofron et al., Gq-activated fibroblasts induce cardiomyocyte action potential prolongation and automaticity in a three-dimensional microtissue environment. Am. J. Physiol. Heart Circ. Physiol., 313(4), H810-H27 (2017).

Kollmannsberger et al., Tensile forces drive a reversible fibroblast-to-myofibroblast transition during tissue growth in engineered clefts. Sci. Adv. 4(1), eaao4881 (2018).

Knisley et al., Ratiometry of transmembrane voltage-sensitive fluorescent dye emission in hearts. Physiology, 279(3), H1421-H1433 (September 2000).

Kreutziger et al., Developing vasculature and stroma in engineered human myocardium. Tissue Eng. Part A., 17(9-10), 1219 (2011).

Kurokawa & George. Tissue engineering the cardiac microenvironment: Multicellular microphysiological systems for drug screening. Adv Drug Deliv Rev, 96:225-33 (2016).

Lee & Pickham, Basic Cardiac Electrophysiology and Common Drug-induced Arrhythmias. Crit. Care Nurs. Clin. North Am., 28, 357-371 (2016).

Lemoine et al., Human induced pluripotent stem cell-derived engineered heart tissue as a sensitive test System for QT prolongation and arrhythmic triggers. Circ. Arrhythm. Electrophysiol., 11(7), e006035 (2018).

Liu et al., Human embryonic stem cell-derived cardiomyocytes restore function in infarcted hearts of non-human primates. Nature Biotechnol., 36(7), 597-605 (2018).

Livak & Schmittgen, Analysis of relative gene expression data using real-time quantitative PCR and the 2 (−Delta Delta C(T)) Method. Methods, 25(4), 402-408 (2001).

Mdaghri et al., Complications cardiaques au cours de l'intoxication aux organophosphorés. Ann. Cardiol. Angeiol. (Paris), 59(2), 114-7 (April 2010).

Magdy et al., Human induced pluripotent stem cell (hiPSC)-derived cells to assess drug cardiotoxicity: opportunities and problems, Ann. Rev. Pharmacol. Toxicol., 58, 83-103 (2018).

Makarenko, Passive stiffness changes caused by upregulation of compliant titin isoforms in human dilated cardiomyopathy hearts. Circ. Res., 95(7), 708-716 (2004).

Mason et al., Electrocardiographic ranges derived from 79,743 ambulatory subjects. J. Electrocardiol., 40(3), 228-234 (2007).

McKim Jr., Building a tiered approach to in vitro predictive toxicity screening: a focus on assays with in vivo relevance. Comb. Chem. High Throughput Screen., 13(2), 188-206 (2010).

Miragoli et al., Electrotonic modulation of cardiac impulse conduction by myofibroblasts. Circ. Res., 98(6), 801-810 (2006).

Munarin et al., Laser-Etched Designs for Molding Hydrogel-Based Engineered Tissues. Tissue Eng. Part C Methods, 23(5), 311-321 (2017). This paper describes the inventors' studies to develop macro-sized engineered cardiac tissues for evaluating electromechanical function including action potentials, calcium transients, contractility, and structural features of tissues that define propagation patterns associated with arrhythmia and contractility deficits.

Ncardia. Ncyte CardioPlate Maestro MEA 96 (2020). The Ncyte CardioPlate is a 96-well plate that arrives pre-plated with differentiated cardiomyocytes and Cardiomyocyte Culture Medium, ready to detect extra-cellular field potentials by multi-electrode array (MEA) technology on the Maestro™ MEA system.

NDA 21-526/S-002 Approval Letter (2006). Ranexa@ ranolazine extended-release tablets.

O'Reilly et al., Bisphenol A binds to the local anesthetic receptor site to block the human cardiac sodium channel. PloS One, 7(7), e41667 (2012).

Okur et al., Quantitative evaluation of ischemic myocardial scar tissue by unenhanced T1 mapping using 3.0 Tesla MR scanner. Diagn. Interv. Radiol., 20(5), 407-413 (2014).

Onakpoya et al., Post-marketing withdrawal of 462 medicinal products because of adverse drug reactions: a systematic review of the world literature. BMC Med., 14, 10 (2016a).

Onakpoya et al., Worldwide withdrawal of medicinal products because of adverse drug reactions: a systematic review and analysis. Crit. Rev. Toxicol., 46, 477-489 (2016b).

Pluromics. Assessment of pro-arrhythmic effects using Pluricyte® Cardiomyocytes on the ACEA xCELLigence® RTCA CardioECR. Version 1.2 (2020).

Polonchuk et al., Cardiac spheroids as promising in vitro models to study the human heart microenvironment. Sci Rep. 7(1), 7005 (2017).

Posnack, The adverse cardiac effects of Di(2-ethylhexyl) phthalate and bisphenol A. Cardiovasc. Toxicol., 14(4), 339-57 (2014).

Prüss-Üstün & Corvalán, Preventing Disease Through Healthy Environments: Towards an Estimate of the Environmental Burden of Disease. World Health Organization, Geneva, Switzerland (2006).

Quinn et al., Electrotonic coupling of excitable and nonexcitable cells in the heart revealed by optogenetics. Proc. Natl. Acad. Sci. U.S.A., 113(51), 14852-14857 (2016).

Ramalho & Freitas, Drug-induced life-threatening arrhythmias and sudden cardiac death: A clinical perspective of long QT, short QT and Brugada syndromes. Rev. Port. Cardiol., 37(5), 435-46 (2018).

Ravenscroft et al., Cardiac non-myocyte cells show enhanced pharmacological function suggestive of contractile maturity in stem cell-derived cardiomyocyte microtissues. Toxicol. Sci., 152.1, 99-112 (2016). The journal article shows the enhanced function of cardiac microtissues that include non-myocyte cells that include human primary cardiovascular endothelial cells and human primary cardiac fibroblasts. The cardiomyocytes are embryonic human stem cell derived.

Recanatini et al., QT prolongation through hERG K(+) channel blockade: current knowledge and strategies for the early prediction during drug development. Med. Res. Rev., 25, 133-166 (2005).

Redfern et al., Impact and frequency of different toxicities throughout the pharmaceutical life cycle. The Toxicologist, 114(S1) (2010).

Riegler et al., Human engineered heart muscles engraft and survive long term in a rodent myocardial infarction model. Circ. Res., 117(8), 720-730 (2015).

Rinn et al., Anatomic demarcation by positional variation in fibroblast gene expression programs. PLoS Genet., 2(7), e119 (2006).

Rook et al., Differences in gap junction channels between cardiac myocytes, fibroblasts, and heterologous pairs. Am. J. Physiol., 263(5 Pt 1), C959-77 (1992).)

Rook et al., Single channel currents of homo- and heterologous gap junctions between cardiac fibroblasts and myocytes. Pflugers Arch., 414(1), 95-98 (1989).

Ruan et al., Mechanical stress conditioning and electrical stimulation promote contractility and force maturation of induced pluripotent stem cell-derived human cardiac t issue—Clinical perspective. Circulation, 134(20), 1557-1567 (2016).

Rubart et al., Electrical coupling between ventricular myocytes and myofibroblasts in the infarcted mouse heart. Cardiovasc. Res., 114(3), 389-400 (2018).

Rudzinski et al., Doxorubicin-induced ventricular arrhythmia treated by implantation of an automatic cardioverter-defibrillator. Europace, 9, 278-280 (2007).

Rupert & Coulombe, IGF1 and NRG1 enhance proliferation, metabolic maturity, and the force-frequency response in hESC-derived engineered cardiac tissues. Stem Cells Int., 2017, U.S. Pat. No. 7,648,409 (2017). This paper describes the inventors' studies to evaluate IGF1 and neuregulin 1 (NRG1) to impact cardiomyocyte differentiation, proliferation, and maturation of metabolism and electromechanical function in engineered human cardiac tissues.

Rupert & Coulombe, The roles of neuregulin-1 in cardiac development, homeostasis, and disease. Biomark. Insights, 10(Suppl 1), 1-9 (2015).

Rupert et al., Hypertrophy changes 3D shape of hiPSC-cardiomyocytes: Implications for cellular maturation in regenerative medicine. Cell Mol. Bioeng., 10(1), 54-62 (2017).

Rupert et al., Practical adoption of state-of-the-art hiPSC-cardiomyocyte differentiation techniques. PloS One, 15(3), e0230001 (2020a). This paper describes the inventors' studies to optimize the cardiac differentiation from multiple hiPSC lines (including male and female lines, Asian and Caucasian race/ethnicities) and customize lactate purification for tissue engineering to assess metabolism and electromechanical function.

Rupert et al., Human cardiac fibroblast number and activation state modulate electromechanical function of hiPSC-cardiomyocytes in engineered myocardium. Stem Cells International (2020b). Epub ahead of print. https://doi.org/10.1155/2020/9363809. This paper describes the inventors' studies to develop hCF composition in tissues for electromechanical and metabolic function, as well as structural changes with hCF disease states (e.g., activation, pre-fibrosis, and structural alterations).

Rupert et al., Genetically engineered cardiac fibroblasts for electrical maturation of hiPSC-cardiomyocytes in engineered tissues, F-1198, ISSCR 2017 Boston (June 2017). This abstract from the inventors began to evaluate genetically engineering cardiac fibroblasts with connexin 43, a gap junctional protein that is essential for electrical propagation in engineered tissues.

Sager et al., Rechanneling the cardiac proarrhythmia safety paradigm: a meeting report from the Cardiac Safety Research Consortium. Am. Heart J., 167(3), 292-300 (2014).

Salama & Choi, Imaging ventricular fibrillation. J. Electrocardiol., 40(6 Suppl), S56-61 (2007).

Sekine et al., Endothelial cell coculture within tissue-engineered cardiomyocyte sheets enhances neovascularization and improves cardiac function of ischemic hearts. Circulation, 118(14 Suppl. 1), S145-S152 (2008).

Serrao et al., Myocyte-depleted engineered cardiac tissues support therapeutic potential of mesenchymal stem cells. Tissue Eng. Part A., 18(13-14), 1322 (2012).

Shah et al., Influence of inherent mechanophenotype on competitive cellular adherence. Ann. Biomed. Eng., 45(8), 2036-2047 (2017).

Shinde et al., The role of α-smooth muscle actin in fibroblast-mediated matrix contraction and remodeling. Biochim. Biophys. Acta Mol. Basis Dis., 1863(1), 298-309 (2017).

Singh, Amiodarone: a multifaceted antiarrhythmic drug. Curr. Cardiol. Rep., 8(5), 349-55 (2006).

Singh & Wadhani, Antiarrhythmic and proarrhythmic properties of QT-1 prolonging antianginal drugs. J. Cardiovasc. Pharmacol. Ther., 9 Suppl. 1: S85-97 (2004).

Sousa et al., Smooth muscle alpha-actin expression and myofibroblast differentiation by TGFbeta are dependent upon MK2. J. Cell Biochem., 100(6), 1581-1592 (2007).

Strauss et al., Comprehensive in vitro proarrhythmia assay (CiPA) update from a cardiac safety research consortium/Health and Environmental Sciences Institute/FDA Meeting. Ther. Innov. Regul. Sci., 53(4), 519-25 (2019).

Strickland et al., Status of Acute Systemic Toxicity Testing Requirements and Data Uses by U.S. Regulatory Agencies. Regul Toxicol Pharmacol. 94: 183-196 (2018).

Sullivan et al., Extracellular matrix remodeling following myocardial infarction influences the therapeutic potential of mesenchymal stem cells. Stem Cell Res. Ther., 5(1), 14 (2014).

Sun et al., Brugada-type pattern on electrocardiogram associated with high-dose loperamide abuse. J. Emerg. Med., 54(4), 484-486 (2018).

Surawicz & Fisch, Cardiac alternans: diverse mechanisms and clinical manifestations. J. Am. Coll. Cardiol., 20(2), 483-499 (1992).

Tadic et al., The influence of chemotherapy on the right ventricle: did we forget something? Clin. Cardiol., 40, 437-443 (2017).

Takasuna et al., Comprehensive in vitro cardiac safety assessment using human stem cell technology: Overview of CSAHi HEART initiative. J. Pharmacol. Toxicol. Methods, 83, 42-54 (2017).

Takeda et al., Cardiac fibroblasts are essential for the adaptive response of the murine heart to pressure overload. J. Clin. Invest., 120(1), 254-65 (2010).

Takeda et al., Development of in vitro drug-induced cardiotoxicity assay by using three-dimensional cardiac tissues derived from human induced pluripotent stem cells. Tissue Eng. Part C Methods, 24(1), 56-67 (2018).

Tanner & Beeton, Differences in ion channel phenotype and function between humans and animal models. Front Biosci (Landmark Ed), 23:43-64 (2018).

Tiburcy et al., Defined engineered human myocardium with advanced maturation for applications in heart failure modelling and repair. Circulation 135(19): 1832-47 (2017).

Tohyama et al., Distinct metabolic flow enables large-scale purification of mouse and human pluripotent stem cell-derived cardiomyocytes. Stem Cell, 12(1), 127-137 (2013).

Verkerk et al., Patch-clamp recording from human induced pluripotent stem cell-derived cardiomyocytes: Improving action potential characteristics through dynamic clamp. Int. J. Mol. Sci., 18(9) (2017).

Vozenin et al., The myofibroblast markers α-SM actin and β-actin are differentially expressed in 2 and 3-D culture models of fibrotic and normal skin. Cytotechnology, 26(1), 29-38 (1998).

Wacker & Noskov, Performance of machine learning algorithms for qualitative and quantitative prediction drug blockade of hERG1 channel. Comput. Toxicol., 6, 55-63 (2018).

Wagner & Dimmeler, Cellular cross-talks in the diseased and aging heart. J Mol Cell Cardiol 138:136-46 (2020).

Waldo et al. Effect of d-sotalol on mortality in patients with left ventricular dysfunction after recent and remote myocardial infarction. The SWORD Investigators. Survival With Oral d-Sotalol. Lancet, 348, 7-12 (1996).

Walsh et al., Beta-adrenergic modulation of cardiac ion channels. Differential temperature sensitivity of potassium and calcium currents. J. Gen. Physiol., 93(5), 841-54 (1989).

Wendel et al., Functional effects of a tissue-engineered cardiac patch from human induced pluripotent stem cell-derived cardiomyocytes in a rat infarct Model. Stem Cells Transl. Med., 4(11), 1324 (2015).

Wu et al., Augmentation of late sodium current unmasks the proarrhythmic effects of amiodarone. Cardiovasc. Res., 77(3), 481-8 (2008).

Yan et al., Bisphenol A and 17beta-estradiol promote arrhythmia in the female heart via alteration of calcium handling. PloS One, 6(9), e25455 (2011).

Yang, Chuang, & Li, The development of congestive heart failure and ventricular tachycardia after first exposure to idarubicin in a patient with acute myeloid leukaemia. Br. J. Clin. Pharmacol., 69, 209-211 (2010).

Zhang et al., Generation of quiescent cardiac fibroblasts from human induced pluripotent stem cells for in vitro modeling of cardiac fibrosis. Circulation Research, 125(5), 552-66 (2019).

Zhao et al., A multimaterial microphysiological platform enabled by rapid casting of elastic microwires. Adv. Healthc. Mater., 8(5), e1801187 (2019).

Zhao et al., A platform for generation of chamber-specific cardiac tissues and disease modeling. Cell, 176(4), 913-27 (2019).

Zhou & Pu, Recounting cardiac cellular composition. Circ. Res., 118(3), 368-370 (2016).

Zhou et al., Characterization and standardization of cultured cardiac fibroblasts for ex vivo models of heart fibrosis and heart ischemia. Tissue Eng. Part C Methods, 23(7), 422-433 (2017).

Zuppinger, 3D Cardiac Cell Culture: A Critical Review of Current Technologies and Applications. Front Cardiovasc Med. 6, 87 (2019).

Guidance from Materials and Methods

A person having ordinary skill in the art of cardia tissue engineering for cardiotoxicity evaluation can use these patents, patent applications, and scientific references as guidance to predictable results when making and using the invention.

Cardiomyocyte differentiation. The inventors differentiated cardiomyocytes (CMs) from human pluripotent stem cells; either human embryonic stem cells (hESCs, e.g. line RUES2) or human induced pluripotent stem cells (hiPSCs; Gibco human female episomal iPSCs from CD34+ cord blood, ThermoFisher Scientific, NCRM-5 human male episomal iPSCs from CD34+ cord blood, NIH Center for Regenerative Medicine, WTC11 GM25256 human male episomal iPSCs from dermal fibroblasts, The Gladstone Institutes, UCSF) in high-density monolayer cultures. See, FIG. 1(A) for the general timeline and Rupert & Coulombe (2017), Rupert et al. (2020a), and Rupert et al. (2020b). Human pluripotent stem cells were cultured on plates coated with truncated human vitronectin (Life Technologies) in Essential 8 medium (ThermoFisher). Human induced pluripotent stem cells were harvested in 0.5 mM EDTA and 1.1 mM D-glucose in 1×PBS (versene), triturated into small colonies or singularized, counted, and seeded on (1:60 dilution) Matrigel (Corning)-coated 6 or 24 well plates in E8™ with 5 µM Y-27632 (ROCK inhibitor, Fisher). Some cultures were treated with low dose 1 µM Chiron 99021 (Tocris) one day prior to initiating differentiation. Medium was changed daily until initiation of differentiation (day 0), when cells were approximately 60-90% confluent. Cells were switched to medium containing 213 µg/mL L-ascorbic acid (Sigma) and 500 µg/mL recombinant human serum albumin (ScienCell) in RPMI 1640 medium (Life Technologies) and treated sequentially with 3-9 µM Chiron, a glycogen synthase kinase 3 (GSK3) inhibitor, at day 1, followed by 5 µM inhibitor of Wnt protein 2 (IWP2; Tocris) or 2 µM WNT. C-59 (Tocris) or 1 µM XAV939 (Tocris), all chemical Wnt inhibitors, at day 3. Differentiating cells were fed with basal medium on days 5 and 7, then switched to RPMI 1640 medium containing B27 supplement (with insulin; Gibco) on day 9. Some differentiating cells received 100 ng/ml neuregulin-1β (NRG1) daily on days 5-18 (until use in engineered tissues) and/or in engineered tissues. Some engineered tissues received 100 nM insulin-like growth factor 1 (IGF1) daily and/or 100 ng/ml NRG1 daily in engineered tissues. Cardiac phenotype, shown by beating cells, presented between days 8 and 14. Cardiomyocytes could be used at this time, but quality control evaluation of engineered tissue formation (as both microtissues and larger macro-tissues) showed reduced success in tissue formation and electromechanical function compared to cardiomyocytes undergoing lactate purification. Some experiments used unpurified cells as controls and were matched for duration of culture for experiments. Cells undergoing metabolic-based lactate purification were assessed for density and beating visually, and left in the wells of the high-density monolayer cultures for lactate purification if density was high and beating was uniform across large areas of the wells. Cells not meeting these requirements for density and beating were replated at high density, 5-6×10^6 cells/cm$^2$ on Matrigel-coated 6 well plates in RPMI+B27 medium after 10-20 days of differentiation. All cells undergoing lactate purification were not fed for 4 days as a starvation period to encourage a switch in metabolism from glycolysis to oxidative phosphorylation in the cardiomyocytes, which are capable of this type of metabolism, while non-cardiomyocytes have a lower ability to switch the metabolic phenotype and therefore die, resulting in more pure populations of cardiomyocytes. Cells undergoing purification were then cultured for four days in lactate purification medium (LPM: DMEM without glucose, L-glutamine, phenol red, sodium pyruvate and sodium bicarbonate (D-5030, Sigma-Aldrich)+2-4 mM L-glutamine, 1× non-essential amino acids, 2 mM (1×) GlutaMAX™, and 4 mM lactate, pH 7.4) with the medium refreshed after 2 days. Lactate purified cells were fed with RPMI+B27 until robust beating returned or appeared. Cardiac purity is assessed by flow cytometry analysis. Cardiomyocytes differentiated from hPSCs are harvested using 0.25% trypsin in versene and used to produce engineered tissues (microtissues and larger macro-tissues) between days 14 and 25 of differentiation (without lactate purification) or are purified with the metabolic-based lactate purification protocol and used between days 18 and 30, designated $CM_{LP}$.

Flow cytometry. Cells for flow cytometry analysis were singularized and fixed in 4% paraformaldehyde (PF) for ten minutes at ambient temperature. Cells were stained with antibodies against the cardiac-specific isoform of troponin T (cTnT, 2 µg/mL; Thermo Fisher Scientific) to assess total cardiomyocyte population and/or the ventricular isoform of myosin light chain 2 (MLC2v) to assess ventricular (positive) and atrial (negative) phenotype and/or alpha-smooth muscle actin (αSMA, 0.5 ug/mL; Abcam). CTnT+ cells are considered cardiomyocytes, MLC2v+ cells are considered ventricular cardiomyocytes, MLC2v− cells are considered atrial cardiomyocytes, αSMA+ cells are considered fibroblast-like or fibroblast-precursor mesodermal stromal cells, and double-positive cTnT+/αSMA+ immature cardiomyocytes. Samples were run on either an Attune NxT or BD FACSAria Flow Cytometer and analyzed with either FlowJo or Flowing software.

Human cardiac fibroblast culture. Human cardiac fibroblasts (hCFs, from PromoCell or Sigma-Aldrich) were maintained and passaged in DMEM/F12 supplemented with 10% FBS, 1% P/S, and 4 ng/ml bFGF. Cells were passaged upon reaching near confluency in versene with 0.05% trypsin (ThermoFisher). For some studies of hCF phenotype, coverslips were coated with polyacrylamide gels at 10% acrylamide and 0.1% bis-acrylamide for a stiffness of approximately 12 kPa. Gels were functionalized with 0.2 mg/mL human Fibronectin (Sigma Aldrich) and seeded with hCFs for at least 72 hours. Human cardiac fibroblasts were incorporated into cardiac microtissues at cell passages P2-P4 or in engineered macro-tissues at cell passages P4 (young, healthy, quiescent) or P9 (aged, activated, disease-like, myofibroblast). Tissues containing hCFs demonstrate higher quality, as assessed by consistent formation, smoother edges, and improved electromechanical function (quantified by excitability, action potential waveform shape, and action potential duration) this are essential for cardiotoxicity evaluation.

Figure 1B:
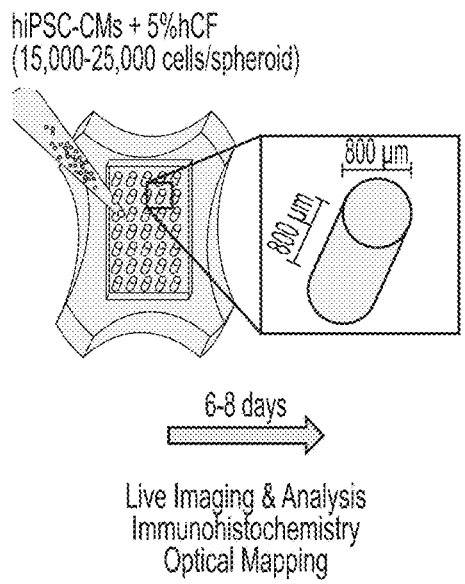
FIG. 1(B) is a schematic showing the generated three-dimensional cardiac microtissues using non-adhesive agarose gels with cylindrical recesses with hemispherical bottoms to guide self-assembly. Cardiac microtissues were cultured for 6-8 days with 1 Hz pacing. The inventors obtained and observed phase contrast images of microtissue assembly. The inventors also obtained and observed confocal images of cardiac troponin I-stained, vimentin-stained, and DAPI-stained cryosections (10 µm thick) of microtissues fixed after seven days in three-dimensional culture. These structural staining images show feasibility of testing cardiotoxicity leading to cardiomyopathy, hypertrophy, and heart failure. The inventors created fluorescence images of microtissues at 3.2× magnification. Typically, the inventors simultaneously recorded action potentials from four to nine microtissues.

Fabrication of microtissue mold hydrogels and 3D microtissue culture. Scaffold-free three-dimensional microtissues (spheroid in shape, also called spheroids and/or organoids) are generated using non-adhesive agarose gels with cylindrical microwells with hemispherical bottoms to guide self-assembly. See FIG. 1(B). Sterilized 2% (wt/vol) agarose is pipetted into molds designed for 24-well plates with 800-µm-diameter rounded pegs (Microtissues, Providence, RI, USA). After being cooled to room temperature (~5 minutes), the agarose gels are separated from the molds and transferred to single wells of 24-well plates. For equilibration, 1 mL medium is added to each well. Hydrogels are equilibrated at least one hour or overnight at 37° C. in a humidified incubator with 5% $CO_2$. Molds are transferred to 6-well plates for electrical stimulation, and hiPSC-CM or hiPSC-$CM_{LP}$ with or without additional human cardiac fibroblasts (5-15%) in suspension are added to the center of the hydrogel seeding chamber (100-900K cells/mold in 35 recesses, depending on output being assessed; typically 600-800K for optical mapping) and allowed to settle into the recesses for 30 minutes. Medium is then added to each well (5 ml), and cells are cultured for 6-8 days with electrical field stimulation with a 1 Hz, 10.0 V, 4.0 ms duration bipolar pulse train for the full three-dimensional culture period (C-Pace EP, IonOptix).

Image acquisition and processing. Phase-contrast images of cells and microtissues were captured with a Nikon TE2000-U and a black and white/color digital camera (MicroVideo Instruments, Avon, MA, USA) and acquired and analyzed with NIS Elements software.

Microtissue size analysis. Stitched 4× phase-contrast images of whole 35-well microtissue hydrogels were acquired and analyzed. Image thresholding and particle size analysis was used in NIS Elements to determine the top view cross-sectional area of individual microtissues across each mold.

3D tissue sections and immunohistochemistry. The inventors fixed microtissues in 35-well hydrogels using 4% (vol/vol) paraformaldehyde (Electron Microscopy Sciences, Hatfield, PA, USA) and 8% (wt/vol) sucrose in phosphate-buffered saline (PBS) overnight at room temperature. Molds were then rinsed twice with phosphate-buffered saline and equilibrated, as indicated by their sinking, usually over twelve hours, with 15% and then 30% (wt/vol) sucrose in phosphate-buffered saline. Whole agarose gels containing microtissues were removed from sucrose, blotted dry, and embedded in Tissue-Tek CRYO-OCT Compound (Ted Pella, Redding, CA, USA). Blocks were stored at −80° C., sectioned on a Leica CM3050 cryostat microtome (Leica Biosystems, Buffalo Grove, IL, USA) into 10 μm-thick sections, and placed on Superfrost Plus slides. After being air dried for fifteen minutes, sections were postfixed in 4% paraformaldehyde in phosphate-buffered saline. For immunofluorescent staining at room temperature, frozen sections were rinsed three times for five minutes with 1× phosphate-buffered saline wash buffer. Non-specific binding was blocked with 1.5% goat serum for one hour, followed by one hour incubations in primary and secondary antibodies diluted in 1.5% goat serum. Primary antibodies were directed against cardiac troponin I (cTnI, 1:100, Abcam ab47003) and vimentin (1:100, Sigma-Aldrich (St. Louis, MO, USA) V6630), and secondary antibodies were conjugated to Alexa Fluor 488 or Alexa Fluor 594 (1:200, Invitrogen). Coverslips were mounted with Vectashield mounting medium with DAPI. Images were taken with an Olympus FV3000 Confocal Microscope and processed using ImageJ.

Optical signals. The optical signals of cardiomyocyte excitation are simple and compatible with rapid analysis. The source of the optical signal varies. Fluorescing dyes can detect voltage and calcium. These two signals have physiological relevance, as voltage is the measure of the action potential, and the action potential triggers intracellular calcium to rise, so the intracellular calcium concentration gives a measure of the calcium transient (CaT). Alternative dyes with longer wavelength are being developed, which could be used in the invention, and some genetically-encoded voltage- and calcium-responsive fluorescent proteins are available if human induced pluripotent stem cell lines are engineered to express these reporters, which itself involves an investment of labor and resources. Following the action potential and calcium transient in cardiomyocytes is a physical muscle contraction, and this signal can be detected optically through movement of the cells, tissue, or posts where the tissue is attached. The "Biowire" platform now being commercially developed by Tara Biosciences, uses fluorescent wires through the ends of three-dimensional tissues so the contraction can be extracted through optical detection of wire deflection. However, a contractile signal for arrhythmia detection is two steps removed from the source of the signal (which is the action potential), and like in the game of "telephone" the smoothing and distortion of the signal can complicate the data interpretation for arrhythmias. For all these signals, the spatial and temporal resolution of these signals varies based on the equipment used, and this resolution impacts the precision of the measurements and their interpretation. Because arrhythmias are triggered primarily by changes in the action potential and less often by changes in the calcium transient or contraction, the precision of the metrics are of paramount importance for assessing arrhythmic cardiotoxicity.

Optical mapping and automated action potential duration analysis. The inventors used an Olympus MVX10 microscope to image 1.2×1.2-mm$^2$ regions. Microtissues were loaded with voltage-sensitive di-4-ANEPPS (5 μM for ten minutes at 35° C.) for measurements of membrane potential ($V_m$). The inventors acquired and analyzed fluorescence images at 979 frames/s using a Photometrics Evolve +128 EMCCD camera (2×2 binning to 64×64 pixels, 18.7×18.7-μm$^2$ resolution, 1.2×1.2-mm$^2$ field of view) and an Olympus MXV10 macroview optical system. Fluorescence images were filtered using nonlinear bilateral filter (spatial filter: 5×5 window, temporal filter: 21 point window) to preserve action potential upstrokes from blurring. Typically, four microtissues were recorded simultaneously/scan at this magnification. A single microtissue is typically covered by ~60 pixels at this magnification. The pixels with action potentials were identified from Fast Fourier transformation (FFT) of fluorescence signals. After appropriate thresholding and image segmentation, the region of each microtissue was grouped and the fluorescence signals from the pixels in the same microtissue were average and used for action potential analysis.

Figure 7:
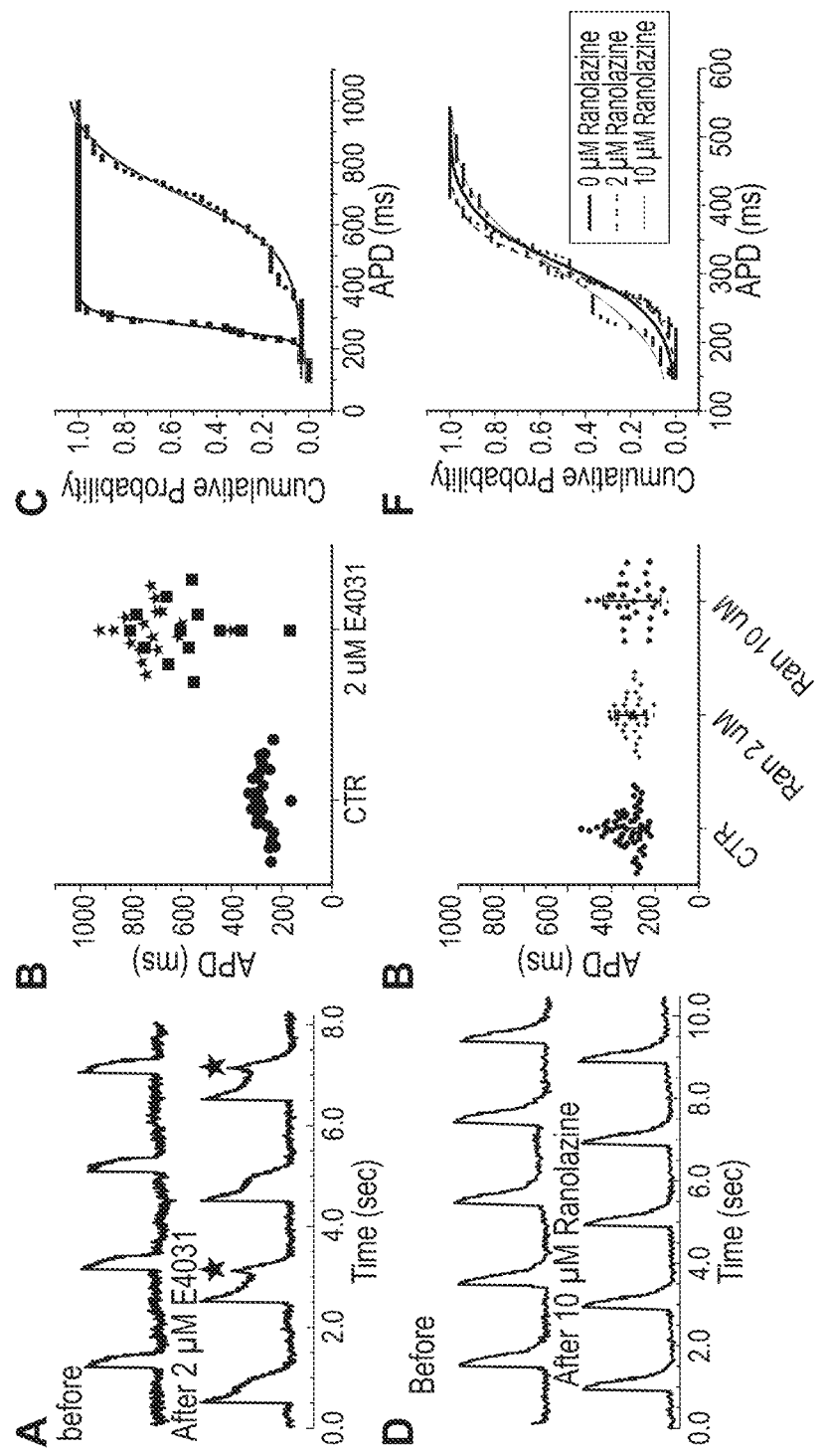
FIG. 7 is a set of figures showing that this human Cardio-Tox TEEM differentiates between compounds that are high-risk for arrhythmia by strong blockade of HERG channel (E4031) and low-risk for arrhythmia (ranolazine) despite known HERG channel interactions.

Validation and screening of toxicants for arrhythmogenic risk. Microtissues were acutely exposed to increasing concentrations of E4031 (a high-risk HERG channel blocker; 0-2 μM), ranolazine (a low-risk sodium channel and HERG blocker, 1-100 μM), and bisphenol-A (at 1-1000 nM) with 20-minute incubation periods followed by approximately 3-minute imaging periods. Concentrations are selected to span human exposure levels or blood serum levels and quantify dose-dependent changes over a wide range (with a goal of more than 10,000× change in concentration and at least 4-6 doses). A single mold of microtissues are imaged for approximately 1 hour to assure quality recordings without signal degradation due to tissue degeneration, enabling measurement under control conditions (zero compound) and 3 doses. Small changes are quantified by AP metrics and discrimination between compounds targeting HERG channel (E4031 and ranolazine) is demonstrated (see FIG. 7 and FIG. 8).

Quantitative RT-PCR. MRNA was extracted from cells (CMs or hCFs) and engineered tissues using the RNeasy Mini Kit and mRNA concentration was measured with a NanoDrop 1000 Spectrophotometer. The cDNA was synthesized from a normalized mass of mRNA for cells and tissues separately using the SuperScript III First-Strand Synthesis System. CDNA samples were combined with custom primers (ACTA2a (α-smooth muscle actin) Forward: CCGACCGAATGCAGAAGGA, Reverse: ACAGAGTATTTGCGCTCCGAA. GJA1 (connexin 43) Forward: CTTTTGGAGTGACCAGCAAC, Reverse: TGAAGCTGAACATGACCGTA.) and SYBR Master Mix, and quantitative real-time PCR was run on an Applied Biosystems® 7900 fast real-time system. HPRT was an internal control for normalization and relative expression was calculated using the $2^{\wedge}(-\Delta\Delta Ct)$ method. Livak & Schmittgen, Methods, 25(4), 402-408 (2001).

Macro-tissue mold and tissue formation. Molds for larger macro-sized engineered tissues with mm to cm dimensions and tissues formed in them are created as previously described (see Munarin et al. 2017 and Kaiser et al. 2019). In brief, custom acrylic molds were fabricated by laser etching/cutting using a 100 W $CO_2$ laser and polydimethylsiloxane (PDMS) was poured into acrylic negatives and cured at 60° C. PDMS molds were sterilized by autoclaving. Tissues are form by combining $1 \times 10^6$ hiPSC-CMs and 0-15% hCFs with 1.6-3.2 mg/mL rat tail collagen-1 at a 50%/50% vol/vol ratio for a final concentration of approximately $16 \times 10^6$ hiPSC-CMs/mL and 0.8, 1.25, or 1.6 mg collagen/mL. Cell-collagen solution was pipetted into PDMS molds, maintained in RPMI/B27, and stimulated with a 4 ms biphasic pulse at 1 Hz and 5 V/cm for the duration of culture.

Mechanical testing. Mechanical measurements were performed after one or two weeks of culture as previously described. Engineered tissues were cut in half and their passive and active mechanical properties were measured with an ASI 1600A system. Aurora Scientific, Ontario, Canada. Strips were mounted on hooks attached to a 5 mN force transducer and high-speed motor arm, bathed in Tyrode's solution with 5 mM glucose and 1.8 mM $CaCl_2$ at 30-34° C., and electrically field stimulated with platinum electrodes. Tissues were stretched from their initial length, $L_0$ (determined as just above slack length), by 5% steps to 130% $L_0$. At the final length, tissues were paced with increasing frequency, and the fastest pacing they followed was recorded as the maximum capture rate (MCR).

Calculations were made from the data recorded during mechanical testing to obtain these values: Active stress, $\sigma_a$, was calculated by averaging the active twitch force of ten contractions and normalizing by the cross-sectional area (CSA). The was calculated under the assumptions that tissue height was half the width and cross-sectional shape was an ellipse. Fold change was calculated from the ratio of the maximum active stress at 130% $L_0$ to active stress at the initial length $L_0$. Passive stress, $\sigma_p$, was calculated by normalizing the passive (baseline) force produced at each step by the cross-sectional area, and tissue stiffness (Young's modulus) was calculated as the slope of the line of best fit of passive stress versus strain at 5-30% strain.

Statistical Analysis. Statistical analyses of the obtained data were performed using paired or two-tailed unequal variance Student's t tests, one-way ANOVA with Tukey's multiple comparisons tests, two-way ANOVA with Tukey's multiple comparisons tests, linear regression and non-linear regression. Paired comparisons within each microtissue with multiple acute chemical exposures reduces variance, which reduces the required number of microtissues to reach statistical significance, thus increasing throughput. Power analysis was used to evaluate sample size.

Significance was P<0.05. Mean and standard deviation or standard error of the mean were plotted using Graphpad Prism.

Potential Risks and Mitigations.

The model qualification is sound with good reproducibility that can be confirmed by implementing standard laboratory Quality Control (QC).

Variation in human cardiac fibroblast source is a risk that a person having ordinary skill in the cardiotoxicity testing art can mitigate by assessment of different batches of human cardiac fibroblasts. Use of hPSC-derived cardiac fibroblasts is possible to replace the commercial sourcing, or use of a new IRB to harvest primary adult cardiac fibroblasts can provide access to new hCF donor cells.

Reproducibility across different labs/sites can be implemented with reduced variability by the increased use of hiPSC-$CM_{LP}$ and inclusion of hCFs for cardiotoxicity assessment, and many research groups have shown in the literature cellular co-culture and 3D engineered tissues, encouraging adoption of the invention.

A person having ordinary skill in the cardiotoxicity testing art can mitigate risks of experimental variation. The invention has also addressed this concern by improving automation to reduce the expertise required for data acquisition, analysis, and interpretation.

A possible technical risk is the quantity and rate of hiPSC-CMs generated, which can oscillate and is rate limiting for experimental throughput. A person having ordinary skill in the cardiotoxicity testing art can mitigate this risk by having multiple cell culture plates. or spinner flasks for cardiomyocyte differentiation going in parallel to have consistent cardiomyocyte production.

Model

The Cardio-Tox Tissue-Engineered Model (TEEM) uses human cardiomyocytes derived from human pluripotent stem cells, which express all of the human proteins, ion channels and currents necessary for assessing a human-specific arrhythmic and cardiotoxic response, including the seven critical ion channels identified by the FDA's CiPA initiative. The inventors use state-of-the-art hiPSC-CM differentiation and purification techniques to have a renewable source of human cardiomyocytes, and the inventors add primary adult human cardiac fibroblasts (5% of total cell number; see Rupert et al. 2020b; cell source is ThermoFisher Scientific, Waltham, MA, USA or PromoCell, Heidelberg, Germany) to form miniaturized human heart tissue in microwells that promote aggregation of cells into 3-dimensional tissues. See FIG. 1(B). After one week of 3D microtissue culture, the inventors perform cardiotoxicity screening on arrays of 35 microtissues/mold with automated signal detection and analysis to have high sample number (35 microtissues/dose) and throughput (4 doses/hour) in this acute drug screening model. A video recording taken during a procedure called optical mapping provides high temporal resolution (1.0 ms/frame=979 fps) of the fluorescence signal elicited by a voltage-sensitive dye (di-4-ANEPPS). The intensity of the signal gives a reading of voltage (in the millivolt range) over time, which is the action potential trace. A similar dye that fluoresces in response to the intracellular calcium (Ca) concentration gives a calcium transient (CaT) for each activation of each cardiac microtissue. From these waveforms, the inventors extract quantitative metrics that accurately reflect the speed and amplitude of the action potentials of the cardiomyocytes, due to the high temporal resolution of the recordings.

These metrics provide integrated data on how the compound impacts electrical activation through changing the action potential or calcium handling. See TABLE 1 for the metrics used to assess the AP and underlying physiological targets (i.e., ion channels and currents).

TABLE 1

Quantitative metrics and physiological targets of the AP.

| Metric (units) | Ion channels involved | Ion currents |
|---|---|---|
| Excitability (%) and stimulation time delay | Na channels ($Na_v$1.5, 1.1, others) | $I_{Na}$ |
| | Inward rectifier $K^+$ channel (Kir2.1) | $I_{K1}$ |
| Rise time (ms) | Na channel ($Na_v$1.5) | $I_{Na}$ |
| APD30 (ms) | Late Na channels ($Na_v$1.1, others) | $I_{Na,late}$ |
| | Ca channels ($Ca_v$1.2) | $I_{CaL}$ |
| | K channels (Kv4.2/4.3, Kv1.4) | $I_{to}$ |
| APD50 (ms) | Late Na channels ($Na_v$1.1, others) | $I_{Na,late}$ |
| | Ca channels ($Ca_v$1.2) | $I_{CaL}$ |
| | K channels (hERG, KvLQT, Kv4.2/4.3, Kv1.4) | $I_{to}$, $I_{Kr}$, $I_{Ks}$ |
| APD80 (ms) | K channels (hERG, KvLQT, Kir2.1) | $I_{Kr}$, $I_{Ks}$, $I_{K1}$ |
| APDtri (ms) = APD80-APD30 | Late Na channels ($Na_v$1.1, others) | $I_{Na,late}$ |
| | Ca channels ($Ca_v$1.2) | $I_{CaL}$ |
| | K channels (hERG, KvLQT, Kv4.2/4.3, Kv1.4, Kir2.1) | $I_{to}$, $I_{Kr}$, $I_{Ks}$, $I_{K1}$ |
| EADs (count/AP) | K channels (hERG, KvLQT) | $I_{Kr}$, $I_{Ks}$ |
| | late Na channel (Nav1.5) | $I_{Na,late}$ |

Figure 4:
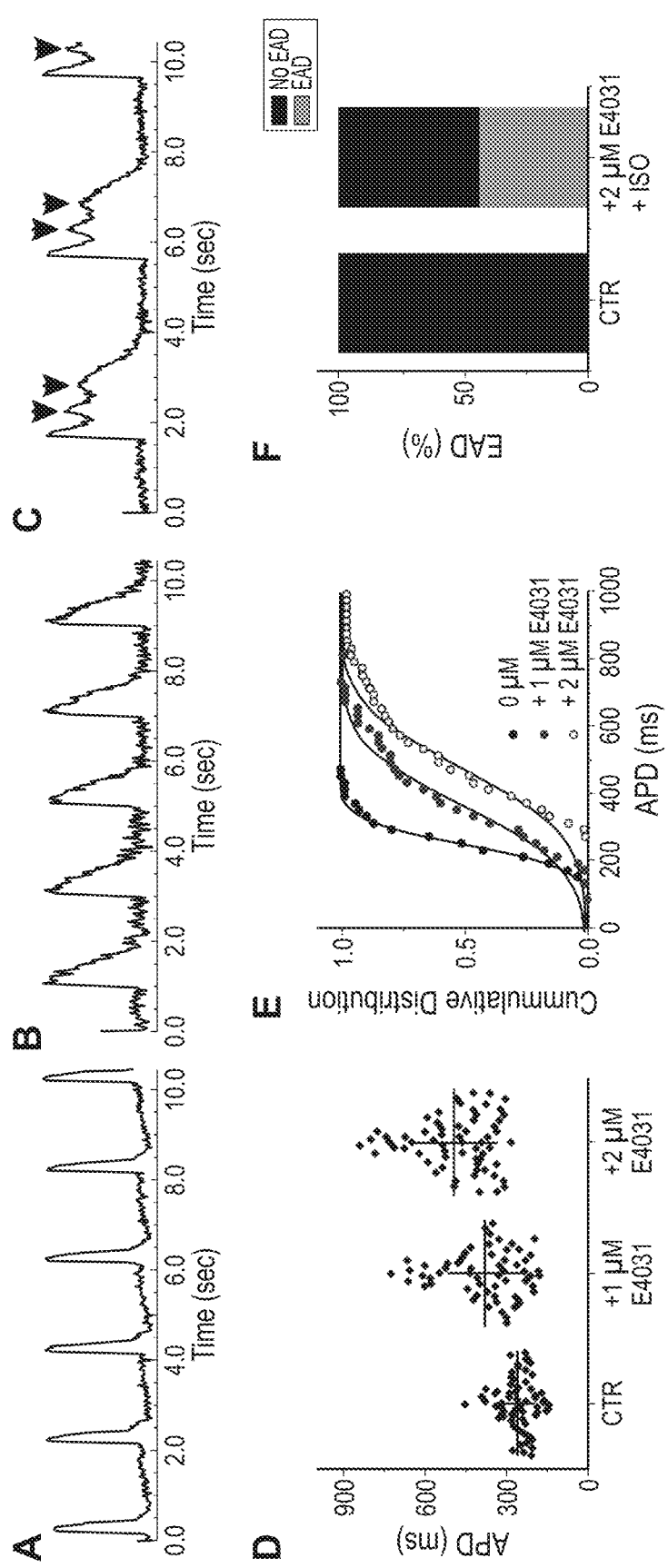
FIG. 4 shows the hiPSC-CM microtissue response to a specific and potent HERG channel blocker, E4031.
Figure 5:
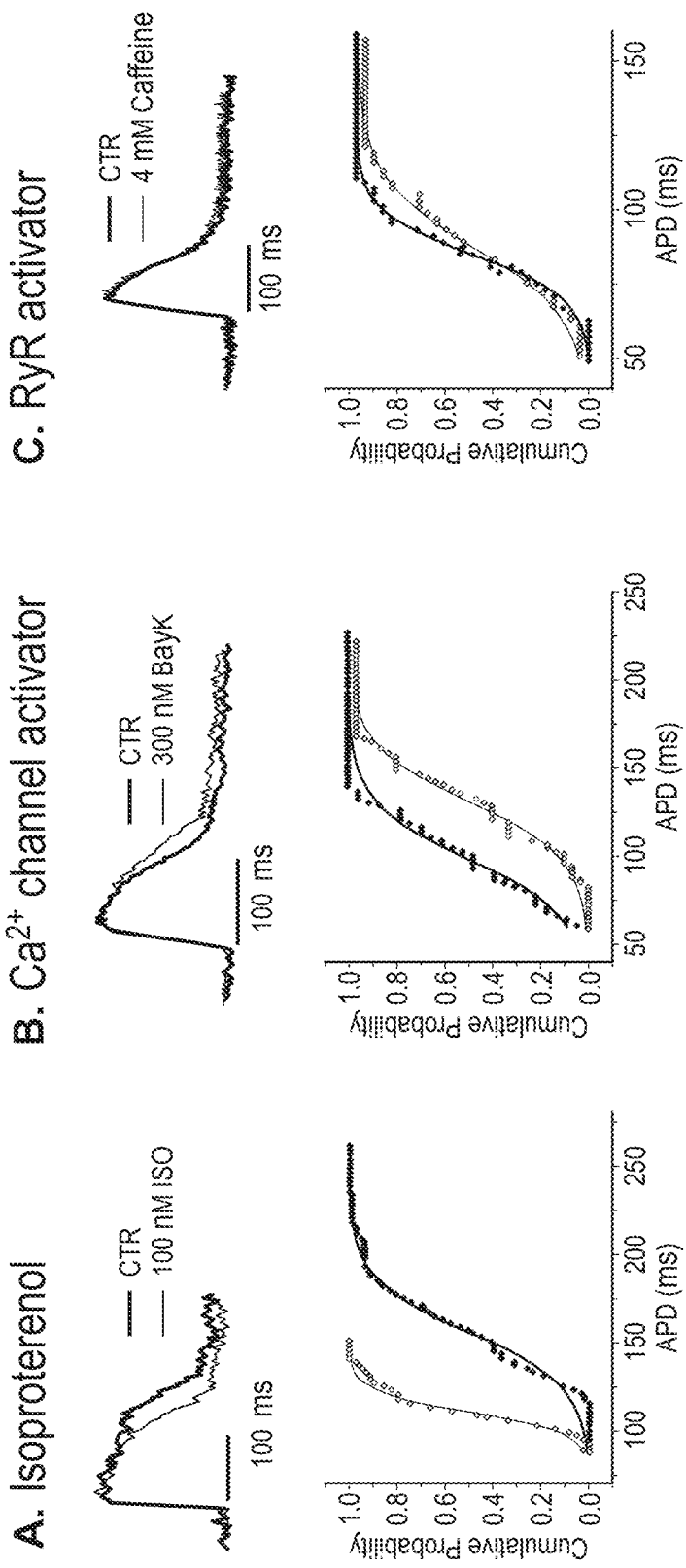
FIG. 5 is a set of graphs showing the physiological responses to isoproterenol (ISO), the L-type $Ca^{2+}$ channel agonist BayK8644 (BayK), and caffeine. The graphs are representative traces (top) and cumulative probability (bottom).

The inventors have validated this model using compounds with known ion channel targets and effects on cardiac electrophysiology that modulate specific ion currents involved in generating the action potential. See FIG. 5. Induction of the fight-or-flight response by beta-adrenergic stimulation with isoproterenol has been shown to increase $I_{CaL}$ and $I_{Ks}$. Isoproterenol (100 nM) reduces $APD_{80}$ by an average 45 ms as expected without evoking early afterdepolarizations (EADs). The calcium channel agonist BayK8644 (300 nM) prolongs $APD_{80}$ by 34 ms. The inventors also tested E4031, which blocks the HERG channel that generates the rapid repolarizing potassium current $I_{Kr}$, as a critical validation step to assess the ability of the invention to predict action potential duration increase and early afterdepolarization formation that would correlate with increased QTc in patients under HERG blockade. The inventors observed a concentration-dependent increase in $APD_{80}$ with E4031 and induction of early afterdepolarizations either when a stress condition is stimulated by isoproterenol addition in hiPSC-CM microtissues (see FIG. 4) or without additional isoproterenol in hiPSC-$CM_{LP}$ microtissues (see FIG. 7). All three compounds produced electrophysiological results that matched the inventors' predicted changes in action potential waveform, strengthening the qualification of the invention for predicting cardiotoxicity.

To test the predictive capacity of the Cardio-Tox TEEM platform, the inventors evaluated a clinical anti-arrhythmic therapeutic, ranolazine, which blocks multiple ion channels with varying sensitivity including HERG channel. Ranolazine is classified by the FDA CiPA program as a low-risk compound that blocks the HERG channel ($I_{Kr}$; $IC_{50}$=11.5 µM). The inventors found that action potential duration prolongation in the invention appears only at the concentration above 10 µM that was tested (100 µM). Ranolazine has promiscuous binding that also blocks late sodium current ($I_{Na,late}$; $IC_{50}$=5.9 µM), late $I_{Ca}$ ($IC_{50}$=50 µM), $I_{NCX}$ ($IC_{50}$=91 µM), and peak $I_{Ca}$ ($IC_{50}$=296 µM). The sum of these changes minimally alters the action potential at low concentrations (2-10 µM). See FIG. 7 and FIG. 8. As a result, drug-induced arrhythmias are minimal with appropriate ranolazine dosing in patients. FDA documentation states that "at a dose of 1000 mg b.i.d., the mean steady-state $C_{max}$ [in blood serum] was 2569 ng/ml [6.0 µM]; 95% of $C_{max}$ values were between 420 and 6080 ng/ml [0.98 and 14.2 µM]".

The inventors' assessment shows nuances in the response to ranolazine at low concentrations (at which stimulation delay, rise time, and action potential duration are altered) versus the response at a high concentration (100 µM) at which the major concern is increased action potential duration (see FIG. 8(B)). This quantitative assessment enables predictive in vitro to in vivo extrapolation (IVIVE) to identify safe exposure levels of industrial chemical and environmental toxicants and to select drugs more accurately for further pharmaceutical development with true clinical benefits and to predict their safe concentrations.

Method for Testing Compounds

The invention is useful for testing compounds with unknown targets and have not been screened against binding individual ion channels. To assess the utility of the invention using a compound with less well-known effects on the AP, the inventors tested bisphenol-A (BPA), an endocrine-disrupting chemical due to its structural similarities to the hormone estrogen. Bisphenol-A is found in plastics, food products, and the environment.

In a Cardio-Tox TEEM platform containing female hiPSC-CMs, bisphenol-A (BPA) shifts action potential duration measurements at one nM concentration and has a quantitative response profile clearly different from ranolazine. At low concentrations, BPA increased stimulation delay and slowed action potential rise time. This result suggests an effect on $I_{Na}$. Further, the inventors observed that the $APD_{30}$ and $APD_{50}$ were shortened more than $APD_{80}$, which suggests that BPA alters the plateau phase. The "$APD_{tri}$" metric, calculated as $APD_{80}$-$APD_{30}$, indicates triangulation of the action potential signal. When $APD_{tri}$ is shorter, as with BPA treatment, it suggests there are reduced currents in the plateau phase, primarily $I_{Ca}$ and $I_{Na,late}$. This metric helps distinguish altered action potential duration due to sodium and calcium currents earlier in the action potential versus later repolarization due to potassium currents $I_{Kr}$, $I_{Ks}$, and $I_{K1}$. BPA is reported to block sodium channel Nav1.5 with an $IC_{50}$ of 25 µM. Studies in rodents suggest BPA alters excitability and $Ca^{2+}$ handling, promoting arrhythmias at 1 nM with greater sensitivity in female rats compared with male rats that increased with isoproterenol stimulation.

Thus, these results follow our data and may provide a predictive human model for assessing BPA cardiotoxicity in people. In summary, these data show that the novel Cardio-Tox TEEM can detect changes in action potential waveform with high resolution and can implicate which ion currents are altered by drug exposure. Evaluation of FDA CiPA list compounds, industrial chemicals, and environmental toxicants validates the specificity (true positive rate), sensitivity (true negative rate), and broader utility of the Cardio-Tox TEEM platform. Further, this type of comprehensive testing generates a database for comparing responses of test compounds with unknown effects to those the inventors understand well in terms of their mechanism of action and human clinical safety.

The major advantage of the Cardio-Tox TEEM platform is the integrated signals arising from multiple ion channels and currents in the human cardiomyocytes that is critically needed for predicting a human-specific arrhythmia response at the tissue level. The integrated ion current response that is present in the measured waveforms, combined with the simplicity of the engineered tissues and automated analysis, fills a need that is not yet addressed by current cardiotoxicity assays (both in vitro and in animal studies) or other proposed approaches that require highly specialized assays (often operated by trained experts), such as patch clamping and in silico modeling being pursued by the FDA CiPA initiative or the carefully engineered Biowire platform being pursued by TARA Biosciences. The inventors propose that novel compounds be evaluated in the Cardio-Tox TEEM platform during the early discovery phase of pharmaceutical development as a mid-stage to late-stage in vitro assessment of compounds on cardiac function. This means that hundreds of compounds would be screened at this stage for arrhythmogenic and other types of cardiotoxicity and the data could stratify compounds for continued development, reformulation of compounds performing well in other screenings (e.g., efficacy), and used to predict human in vivo responses. Further, the inventors propose that industrial chemicals and environmental toxicants be evaluated in the Cardio-Tox TEEM platform routinely, as cardiac effects of chemicals is not routinely used for evaluating safe exposure levels, yet the World Health Organization reports high levels of cardiovascular disease may be due to environmental toxicants such as herbicides/pesticides, plastics/plasticizers, flame retardants, pollution, and other sources.

The advantages of the Cardio-Tox TEEM platform include: (1) use of multiple cell types (hPSC-CM, hPSC-$CM_{LP}$ and human cardiac fibroblasts) in appropriate ratios for stable electrophysiological responses; (2) high temporal resolution to enable multiple accurate quantitative metrics; (3) simple self-assembly of three-dimensional microtissues using few cells in bio-compatible agarose microwells; (4) automation of data acquisition and analysis; and (5) physiologically relevant metrics that aid in identification of the targeted ion channels for feedback in the model system to enable compound re-design to reduce toxicity.

The design of the invention enables broad adoption. Forming the engineered tissues is simple with the 3D Petri Dish (Microtissues, Inc.) because the microwells are made from molding templates in agarose (a polysacchyride) in standard cell culture plates compatible with stimulation electrodes for long-term electrical pacing during tissue culture. The inventors have reduced the number of cells required/microtissue, thus maximizing the number of microtissues for testing. The inventors automated aspects of data acquisition and analysis. Further, the inventors are developing a database of results for comparing novel compounds to known compounds and predicting mechanisms of toxicity.

Methods and standards for assessing cardiotoxicity. The Comprehensive In vitro Proarrhythmia Assay (CiPA) initiative has identified necessary goals for advancing cardiotoxicity testing, including the use of cardiomyocytes derived from human induced pluripotent stem cells (hiPSC-CMs) and evaluation of seven key species-specific ionic currents that control the cardiac action potential (AP) and may affect the development of cardiac arrhythmias. This approach mainly focuses on cellular arrhythmia mechanisms such as early afterdepolarizations (EAD) or delayed afterdepolarizations (DAD) but does not cover a whole spectrum of arrhythmia mechanisms. Arrhythmias develop from two synergistic conditions, trigger (ectopic heartbeat including earlier afterdepolarizations and delayed afterdepolarizations) and substrate for reentry (tissue heterogeneity, dispersion of repolarization). Drug toxicity can be much more severe in certain populations of human due to genetic predisposition or in pathological conditions such as infarcted or failing hearts, termed 'hidden cardiotoxicity'.

The current standards for cardiotoxicity testing have raised significant concerns and the FDA has set forth a set of guidelines for how cardiotoxicity testing could be done through their CIPA Initiative. The Cardio-Tox TEEM platform is more efficient and predictive, which differentiates the Invention from the competition. Thus, the Inventors propose to use the Cardio-Tox TEEM platform with no prior patch clamp evaluation of single ion channel interactions or in silico modeling. TABLE 2 shows comparisons with other in vitro human cardiotoxicity testing technologies.

TABLE 2

Comparison with other technologies for cardiotoxicity testing

| Platform or Company | Culture Format | Readouts | Resolution | Targeted Outcomes |
| --- | --- | --- | --- | --- |
| Cardio-Tox TEEM | 3D microtissues; 95% CM + 5% CF; 1 week culture | Paced (0.5-4 Hz) for fluorescence recording of $V_m$ (VSD) and Ca (CSD) | 965 fps (both VSD & CSD) | AP and CaT for assessing arrhythmia risk and multiple mechanisms of arrhythmia induction |
| Tara Biosciences | 3D "Biowire" tissues; 91% CM + 9% CF; 6 wks culture | Paced (1 Hz) for CSD and optical contraction (signal from deflection) | 100 fps | CaT for assessing Ca handling related to arrhythmia & HF; contraction for HF assessment |

TABLE 2-continued

Comparison with other technologies for cardiotoxicity testing

| Platform or Company | Culture Format | Readouts | Resolution | Targeted Outcomes |
|---|---|---|---|---|
| InSphero | 3D microtissues; 80% CM + 20% CF; 3-4 weeks culture | Spontaneous beating for optical contraction; patch clamp for $V_m$; RNA; imaging | 240 fps contraction | AP ($V_{m,rest}$, APD, max upstroke velocity) for arrhythmia assessment; contraction |
| Cyprotex | 3D microtissues; CM + CF + endothelial celix; culture time not reported | Spontaneous beating for confocal high content screening; 72 h exposure | Single time point data collection | Structural cardiotoxicity (DNA structure, Ca homeostasis, cellular ATP content, mitochondrial mass & $V_m$) |
| FDA CiPA platform (Strauss & Stockbridge) | 2D CMs; time not reported | Spontaneous beating for VSD and MEA | Not reported | AP (beating rate, APD90, EADs) and field potential for arrhythmia |
| ACEA Biosciences, Inc. | 2D CMs; 8-12 d culture | Spontaneous beating for MEA | Not reported | Field potential for arrhythmia (acute & 24 h) |
| Ncardia | 2D CMs; time not reported | Spontaneous beating for MEA | Not reported | Field potential for arrhythmia |

AP, action potential; APD, AP duration; CaT, calcium transient; CF, cardiac fibroblast; CM, cardiomyocyte; HF, heart failure; MEA, microelectrode array; $V_m$, membrane voltage; VSD/CSD, voltage/vcalcium sensitive dye.

Note that all other technologies use a higher % human cardiac fibroblasts.

Future applications, benefits, and expansion of the Cardio-Tox TEEM platform: The microtissues with 5% human cardiac fibroblasts provides a myocardial-like micro-environment for the structural and functional development of hiPSC-CMs, including increased cell-cell junctional contact adhesions and junctions, e.g., gap junctions, for better tissue excitation, conduction, maturation, and contraction. As shown by the deep analysis of the action potential with multiple metrics, a robust quantification of the calcium transient or contractions can be done with this model to assess calcium-mediated arrhythmia, hypertension caused by increased cardiac output, or contractile changes directly on myofilaments or through metabolic changes in response to chemicals and compounds. Mechanisms of abnormal impulse formation that create arrhythmias include early afterdepolarizations under β-adrenergic stimulation, delayed afterdepolarizations, or automaticity from abnormal calcium release through oxidative stress or electrolyte imbalance. Mechanisms for reentry formation are slow conduction through gap junction or sodium channel blockade, heterogeneity of repolarization, and increased fibrosis. These conditions can be replicated in an in vitro microtissue system with structural features replicating conditions in the human heart associated with increased arrhythmic risk. The invention can assess stress-induced responses with adding isoproterenol or increased stimulation frequency (i.e., faster heart rate), drug interactions with dual- and triple-combinations, and toxicity due to chemicals or compounds that have their targeted effects primarily on cardiac fibroblasts. It is possible to conduct this screening using greater genetic variation in the human induced pluripotent stem cell lines to assess responses differing based on sex, race/ethnicity, disease status, or genetic background. Commercially purchased hPSC lines or hPSC-derived cardiomyocytes can be used. In-house development of human induced pluripotent stem cell lines enables flexibility in sourcing human induced pluripotent stem cells, which are grown and differentiated into cardiomyocytes in-house, or careful selection of existing human induced pluripotent stem cell banks enables access to many available cell lines. Commercially sourced normal adult human cardiac fibroblasts can be replaced by hCFs being obtained in-house with IRB protocols, and novel passaging techniques may extend the use of these primary cells, such as on soft substrates (see Rupert et al. 2020b) and with added bFGF. The primary adult human cardiac fibroblasts may be replaced with human induced pluripotent stem cell-derived cardiac fibroblasts and evaluated for reproducibility. The inventors have streamlined the automated analyses and propose to automate compound dosing to increase throughput. The simple approaches employed for engineering self-assembled microtissues, using optical mapping, and automating this screening platform enable broad adoption.

This platform for chemically-induced cardiotoxicity may be used for evaluation of arrhythmia, cytotoxicity, cellular viability, metabolic status, calcium handling, contractility, acute and chronic exposures, and structural changes. These are quantified through imaging approaches including imaging of live and fixed tissues and both static and dynamic (time-dependent) imaging with high resolution.

This platform for compound-induced cardiotoxicity predictions may be used to assess responses in a diverse human population using multiple hPSC lines and data from three-dimensional human cardiac microtissues and automated computational assessment of waveform variation (e.g. electrical, calcium, and contraction waveforms) and structural changes. The inventors quantify electrophysiology of three-dimensional microtissues (spheroids) containing hiPSC-CMs and human cardiac fibroblasts by optical mapping. A systems approach based on these data can select several representative profiles of hiPSC lines for representing a genetically diverse human population. Representative subsets of diverse action potential and $Ca^{2+}$ transient profiles can be validated with training compounds identified by the CiPA initiative.

This platform enables the formation of larger human engineered cardiac tissue to predict drug-induced reentry formation and assess the potential impact of ischemia (see Munarin et al. 2017). The inventors develop novel mesh-patterned large engineered tissues that allow reentry formation under slow conduction and myocyte injuries with iterative evaluation. The inventors validate this engineered tissue as an arrhythmia-substrate platform using optical mapping. As an example of comorbidity tests, cardiac ischemic tolerance may be examined using hypoxia and data integrated into computational models of spatial heterogeneity leading to reentry formation.

An in vitro model with greater predictive power and rigor is adopted if the quality of the platform is matched by ease of implementation.

The following EXAMPLES are provided to illustrate the invention and should not be considered to limit its scope.

Example 1

Development of an In Vitro Screening Platform for Pro-Arrhythmic Toxicity Testing Using Human 3D Cardiac Microtissues In this EXAMPLE, the inventors address a critical need in screening compounds for arrhythmogenic cardiotoxicity with a three-dimensional human cardiac microtissue model using purified human induced pluripotent stem cell-derived cardiomyocytes and human cardiac fibroblasts. Robust quantification of eight unique parameters derived from optical mapping of the action potential (membrane voltage) enables, qualification of the model via confirmed physiological responses and differentiation of high-risk and low-risk compounds. The inventors demonstrate that hERG channel blockade, required by FDA-approved standards for in vitro cardiotoxicity testing, was not enough to elicit arrhythmias with ranolazine, which is an efficacious clinical anti-arrhythmic drug despite known hERG channel blocker. The inventors show that an estrogen-mimicking compound, the environmental toxicant bisphenol-A (BPA) elicits arrhythmic responses in the nanomolar concentration range. The invention enables robust screening of compounds with ease of implementation.

Introduction: Despite intense efforts to screen for potential side effects using in vitro assays or animal models, drug-induced cardiotoxicity remains the leading cause of drug attrition during pharmaceutical development and withdrawal from the market. See Fenichel et al. (2004); Onakpoya et al. (2016a); Onakpoya et al. (2016b); Waldo et al. (1996); Cardiac Arrhythmia Suppression Trial (CAST) Investigators (1989). The World Health Organization estimates that environmental chemicals may evoke up to 23% of cardiovascular diseases globally. See Prüss-Üstün & Corvalán (2006). This high prevalence of cardiotoxicity despite screening efforts raises questions about the effectiveness of predicting cardiotoxic effects using current methods and standards that include in silico, in vitro, and animal models. Further, initiatives set forth by the Interagency Coordinating Committee on the Validation of Alternative Methods (ICCVAM) call for the development and implementation of non-animal approaches to assess potential hazards associated with acute and chronic exposures to industrial chemicals and medical products and point to value in platforms based on a mechanistic understanding of toxicity. See Strickland et al. (2018). Continued development of more predictive platforms to enhance risk stratification of cardiotoxicity is thus warranted.

Cardiotoxicity in response to drugs or environmental chemicals entails both structural and functional changes, and potentially lethal pro-arrhythmic effects are of concern. In the last decade, drug-induced QT prolongation and Torsades de Pointes (TdP), fatal arrhythmias associated with sudden cardiac death, was the most common cause of withdrawal or restriction of the use of drugs that have been marketed. See Magdy et al. (2018); Fenichel et al. (2004); Abbott & Roepke (2008); Barnes & Hollands (2010); Bossu et al. (2016); Lee & Pickham (2016); Recanatini et al. (2005); and Haverkamp et al. (2000). While neurological and respiratory complications are more prevalent complications of exposure to widely used pesticides such as malathion, arrhythmogenic toxicity such as ventricular arrhythmias can also result. See Mdaghri et al. (2010). Although poisoning data from environmental chemicals such as pesticides and industrial chemicals report cardiac complications, cardiotoxicity is not a standard chemical toxicity screening assay and assessment from epidemiological data is often controversial. See, Bouchard et al. (2011); Burke et al. (2017); and Flitter (2017).

The U.S. FDA's Comprehensive In Vitro Proarrhythmia Assay (CiPA) initiative has identified necessary goals for advancing cardiotoxicity testing: starting with defining drug effects on seven human cardiac currents with automated patch clamping, using in silico models to define proarrhythmia risk metrics, verifying effects on cardiomyocytes derived from human induced pluripotent stem cells (hiPSC-CMs), and validating with human clinical data for in vitro-in vivo extrapolation (IVIVE). See Sager et al., Am. Heart J. 167(3), 292-300 (2014), and Strauss et al., Ther. Innov. Regul. Sci., 53(4), 519-25 (2019). However, this approach requires high technical expertise for executing assays via the patch clamp technique and computations simulations, and mainly focuses on cellular arrhythmia mechanisms such as early (EAD) or delayed afterdepolarizations (DADs) but does not cover a wider spectrum of arrhythmia mechanisms.

Human induced pluripotent stem cell (hiPSC)-derived cardiomyocytes (CMs) have appropriate physiology for cardiotoxicity testing, including proper ion channel expression, action potential shape, and rhythmic contractions. See Gintant et al. (2016); Chen et al. (2016). hiPSCs have shown great promise in detection of drug-induced pro-arrhythmic effects based on electrophysiology responses to twenty-eight blinded drugs with minimal influence from cell lines in multi-site and multi-platform trials. See Blinova et al. (2018). However, hiPSC-CM-based models built from traditional two-dimensional culture systems do not recapitulate the cytoarchitecture of native tissue. Microtissues provide three-dimensional environment for mature CM function and easy assessment of action potential and calcium transients. Further, incorporation of human cardiac fibroblasts (hCFs) enables heterotypic cell-cell interactions characteristic of the intact myocardium, which is a main driver of pathological changes of failing myocardium leading to arrhythmogenesis in many cardiac diseases including myocardial infarction and heart failure. See Kofron & Mende (2017); Kofron et al. (2017), reviewed in Zuppinger (2019) and Wagner & Dimmeler (2020). Incorporation of non-myocytes also allows for testing of the noncardiomyocyte cell dysfunction within the heart. See Magdy et al. (2018). Several groups have recognized the utility of three-dimensional cardiac microtissues for toxicant screening. Asahi et al. (2018) uses "lined-up hESC-CMs" on micro-electrode arrays. Takeda et al. (2010) uses strips. Blinova et al. (2017) shows better sensitivity with voltage-sensitive dye than micro-electrode arrays. Many of these platforms focus on cell viability, gene expression, and mechanical outcomes such as force generation and contractility not proarrhythmic metrics. See Polunchuk et al. (2017); Archer et al., Sci. Rep., 8, 10160 (2018); Ravenscroft et al., Toxicol. Sci., 152.1, 99-112 (2016); Zhao et al., Cell (2019), Feric et al., Toxicol. Sci. (2019); Takeda et al., J. Clin. Invest., 120(1), 254-65 (2010); and Takeda et al. (2018). Action potential, conduction velocity, and calcium transients were validation metrics in these studies, but in-depth analyses of arrhythmia mechanisms were not tested. three-dimensional platforms that focus on arrhythmia have limited throughput, e.g., confocal (see Beauchamp et al., Front. Mol. Biosci., 7, 14 (2020)), microelectrode recording (see Zhao et al. (2019), focus on spontaneous beating frequency that has a limited interpretation (see Beauchamp et al., 2020), or multi-electrode 2D arrays that record only the extracellular field potentials and can have inter test-site differences (see Jahnke et al. (2013), Fleischer et al. (2019), and Takasuna et al. (2017)). Intracellular calcium flux has been used in three-dimensional cardiac microtissue screening. See Sirenko et al. (2017). Optical mapping of action potential and calcium with fluorescence probes provides a simpler solution to characterize action potentials and $Ca^{2+}$ transients to assess arrhythmic risks with high spatial and temporal resolution such as non-uniform reduced excitation, action potential duration prolongation, early afterdepolarizations, and delayed afterdepolarizations. See Salama & Choi, Imaging Ventricular Fibrillation. J. Electrocardiol., 40(6 Suppl.), S56-S61 (2007); Berenfeld & Efimov, Optical Mapping. Card/Electrophysiol. Clin. 11(3), 495-510 (September 2019). Specific conditions known to promote arrhythmia have also not been considered.

Figure 3:
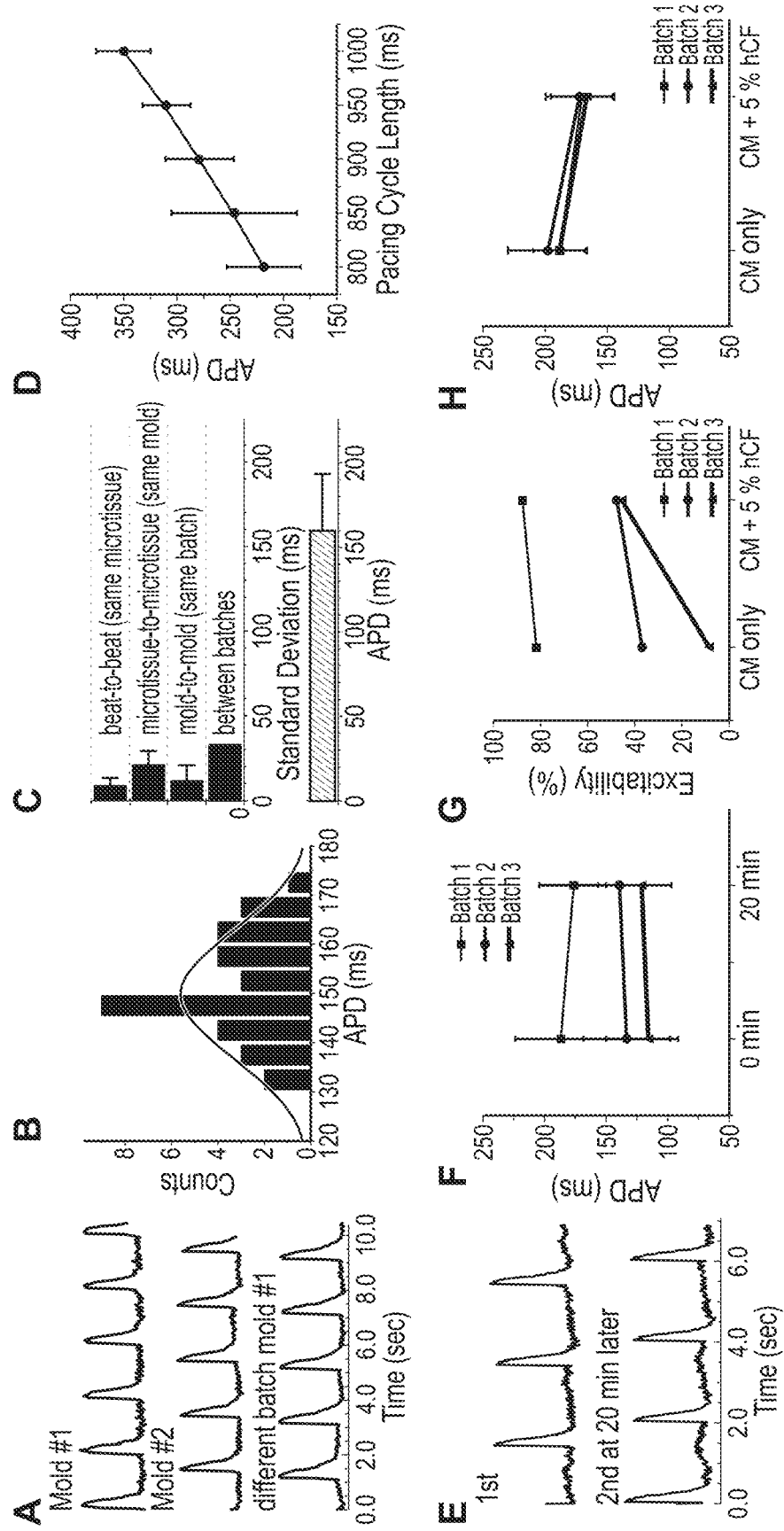
FIG. 3 shows the action potential duration variation and stability from hiPSC-CM microtissues. hiPSC-CMs were seeded with or without 5% human cardiac fibroblasts in hydrogels. After 6-8 days in three-dimensional culture, microtissues were loaded with di-4-ANEPPS for optical mapping of membrane potentials ($V_m$) under paced conditions.

In this EXAMPLE, the objective was to develop a highly predictive preclinical model of human drug-induced proarrhythmic risk using hiPSC-CMs and human cardiac fibroblasts (hCFs) in three-dimensional self-assembled engineered tissues. The inventors used high spatial and temporal resolution optical mapping of voltage-sensitive dyes and developed an automated analysis pipeline to produce evaluation metrics with higher throughput. The response of the cardiac microtissues to physiological stimuli including isoproterenol (see FIG. 5(A)) and increased pacing rate (see FIG. 3(D)) was verified. To establish the fitness of the invention to predict arrhythmogenesis, the inventors validated the invention with known high-risk and low-risk blockers of the human ether-a-go-go-related (HERG) rapidly activating delayed rectifier potassium channel ($I_{Kr}$). Because the causal relationship between specific chemicals and cardiotoxicity is not well characterized, the inventors also sought to assess functional changes with exposure to a prevalent toxicant. The inventors investigated the acute effects of bisphenol-A (BPA), an industrial and environmental chemical, which is a known endocrine disrupting chemical due to its estrogen-like structure, yet has poorly defined proarrhythmic effects.

Development of 3D cardiac microtissues using hiPSC-CMs and hCFs. To develop a predictive human cardiotoxicity model to specifically address risk of cardiac arrhythmias, the inventors adapted a scaffold-free cardiac microtissue model the inventors had previously developed with rat primary cardiac cells. See Desroches et al. (2012); Kofron & Mende (2017); Kofron et al. (2017), reviewed in Zuppinger (2019) and Wagner & Dimmeler (2020). The scaffold now uses cardiomyocytes derived from human induced pluripotent stem cell cardiomyocytes (hiPSC-CMs) and primary normal adult human cardiac fibroblasts (hCFs). See FIG. 1(A). The structural and functional changes in these microtissues were assessed with live cell imaging, immunohistochemistry, confocal imaging, and optical mapping.

Consistent and reliable formation of thirty-five viable microtissues/well was achieved with adding 5% human cardiac fibroblast to the cultures increasing the reliability of microtissue formation. See FIG. 1(B). Microtissue size varied with plating density. A plating density of 13,500 cells/microtissue (95% hiPSC-$CM_{LP}$ and 5% hCF) produced microtissues 359.4±32.4 μm in diameter after one day in three-dimensional culture that compacted to 290.4±29.5 μm in diameter after five days. A plating density of 15,000 cells/microtissue (95% hiPSC-$CM_{LP}$ and 5% hCF) produced microtissues 400.4±24.5 μm in diameter after 1 d and 329.4±17.5 μm after five days. Immunostaining with antibodies against cardiac troponin I (cTnI) and vimentin (vim) confirmed that hiPSC-CMs and human cardiac fibroblasts self-assembled to be highly interspersed. Striations indicated structural development of myofibrils in hiPSC-CM maturation.

Figure 1C:
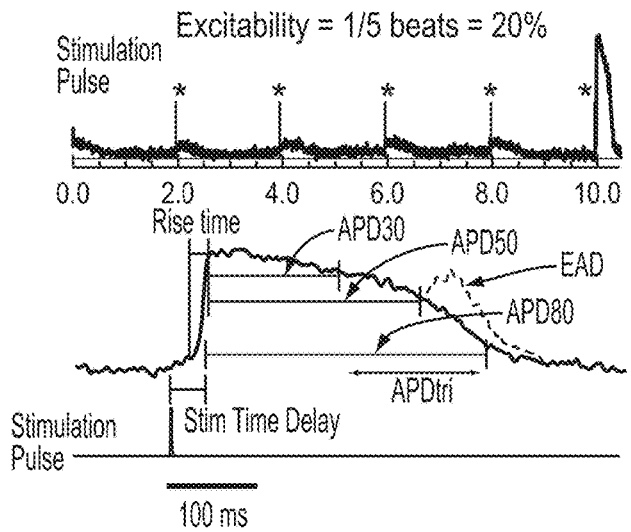
FIG. 1(C) is a graph showing the schematic metrics of action potential characterization performed. The excitability was measured from the percentage of captured action potential during two second pacing cycle length. The time delay was measured between stimulation pulse and evoked action potential upstroke. The rise time of action potential, $APD_{30}$, $APD_{50}$, and $APD_{80}$ was measured.
Figure 2A:
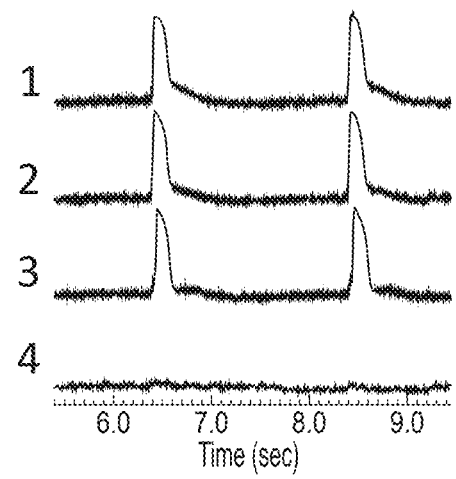
FIG. 2(A) has sample $V_m$ traces recorded from the four microtissues. The electrical stimulation did not evoke action potentials (flat line) in the bottom microtissue (labeled number 4). The inventors used a fast Fourier transformation (FFT) to identify non-excitable microtissues and then selected only the microtissues with action potentials. See FIG. 2(B). The inventors then developed automated analysis algorithms to quantify the fluorescence signal automatically and without bias. For the action potential, the algorithms find the initial takeoff of action potential upstroke, rapid rise phase of action potential upstroke using the maximum peak of the first derivative and 90% recovery, and the peak of the action potential corresponding to the end of the upstroke. The algorithms then automatically compare the timing of the action potential upstrokes to the timing of the stimulation pulse to determine the stimulation time delay between the stimulation pulse and the action potential upstroke, and also determine ectopic activity irrelevant to the stimulation pulse and therefore proarrhythmic, e.g. extra beats or pre-ventricular contractions.
Figure 2B:
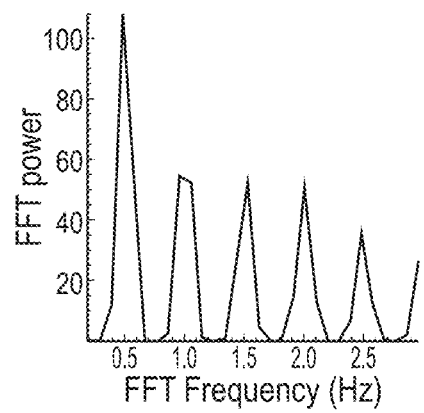
FIG. 2 shows automated analysis pipeline results. The inventors obtained and observed fluorescence images of microtissues. The inventors recorded sample action potential traces ($V_m$ traces) from the corresponding microtissues.
FIG. 2(C) shows an automated analysis to find the action potential upstroke using the maximum peak of the first derivative and 90% recovery. The inventors also developed an automated detection algorithm to count EADs defined by additional slow depolarization before full repolarization.
Figure 2C:
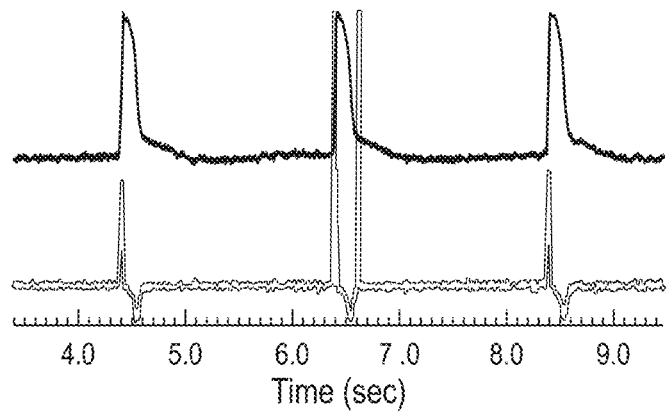

Electrophysiological characterization of 3D cardiac microtissues. To evaluate excitability and sensitivity to proarrhythmic toxicants, action potentials were recorded from the human cardiac three-dimensional microtissues with voltage-sensitive dyes. See FIG. 1(C). The 35-well mold was placed on a temperature regulated chamber (35° C.) on a custom-built motorized stage to automate data acquisition. Typically, cardiac microtissues were paced at two second basic cycle length (0.5 Hz) and action potentials were recorded for ten seconds. The cardiac three-dimensional microtissue showed robust fluorescence changes tracing $V_m$ trajectory of action potentials during spontaneous and paced beats. The data analysis of action potentials was automated to achieve high-throughput. See FIG. 2. Excitability, time delay between stimulation pulse and action potential upstroke (stimulation delay time), rise time of action potential upstroke, action potential duration (APD) to 30%, 50%, and 90% repolarization ($APD_{30}$, $APD_{80}$, $APD_{90}$), and presence of early afterdepolarizations were analyzed as proarrhythmic risk metrics. See FIG. 1(C).

One observation of action potential duration distribution from a single mold is shown in FIG. 3(B). The Shapiro-Wilk normality test indicated that the action potential duration distribution is normal (p=0.77±0.2 for single mold with thirty-five cardiac microtissues, and p=0.92 from three molds with 105 cardiac microtissues).

To determine the statistical power of the invention, the inventors examined the variability in action potential duration. The standard deviation from beat-to-beat in the same microtissue was 8.7±4.8 ms (n>70 microtissues/batch, n=7 batches), from microtissue-to-microtissue in the same mold was 20.9±8.4 (n=2-3 molds/batch, n=7 batches), from mold-to-mold in the same batch was 11.7±8.9 ms (n=3 molds/batch, n+7 batches), and from batch-to-batch was 33.1 ms (n=7 batches). In microtissues formed with hiPSC-CMs that did not undergo lactate purification and maturation, the mean action potential duration was 159.95±33.1 ms. See FIG. 3(C). Power analysis of sample size suggests that n=17 cardiac microtissues must detect 10% of action potential duration changes with 95% confidence, suggesting that single mold testing is enough. The sample size can be further reduced by paired testing (n=8, based on beat-to-beat variation) on the same mold between before and after toxicant perfusion. To screen cardiotoxicity from the same microtissues before and after toxicant perfusion, action potential durations should be stable between two recordings. Typical ion channel blockers act quickly, in less than a minute. E4031 has a binding time constant of 0.8 seconds. See Clay et al., Biophysical Journal, 69(5), 1830-1837 (1995).

The inventors chose a twenty minutes incubation period to ensure that the test compound diffuses inside the cardiac microtissue. The stability of action potential durations in the invention over twenty minutes (see FIG. 3(F)) enables testing several doses of acute toxicant exposure on the same mold to perform paired t-test. Adding 5% human cardiac fibroblast to microtissue cultures improved the formation and excitability of microtissues, while producing a small shortening of action potential duration. See FIG. 3(G,H).

This approach has several advantages: (1) organotypic interspersion of cells, stiffness, architecture, and coupling, (2) ability to manipulate cell ratios and cell phenotypes, (3)

compatibility with acute or chronic dose responses to drugs and/or toxicants, (4) fast optical measurements with the ability to track action potential shape, and (5) generation and functional analysis of a large number of individual but consistent microtissues provides greater throughput and high statistical power in analyses. The 5% primary adult normal human cardiac fibroblast was initially investigated based on the inventors' work that showed improved engineered tissue structure and function. See Rupert et al. (2020b). However, the platform allows for alterations in cell ratios to mimic physiological and pathophysiological conditions. One potential drawback of hiPSC-CMs may be the influence of the presence of nonmyocytes. despite using culturing techniques like metabolic selection to purify the CMs, and evidence that some nonmyocytes promote contractile function. See Tiburcy et al. (2017). Cardiotoxicity risks may also depend on multiple factors such as gender, race, and advanced age. See Zeng et al. (2019). Toxic effects may not be seen in healthy human subjects but only manifest in patients with comorbidities, defined as 'hidden toxicity.' See Ferdinandy et al. (2018). For example, cardiotoxicity associated with excessive fibrosis, cardiomyopathy (Curigliano 2016, Evans 2003, Henning 2017, Tadic 2017), and cardiac arrhythmias (Duan 2018, Alexandre 2018, Drimal 2006, Guglin 2009, Rudzinski 2007, Yang 2010) has become the most frequent adverse effects of cancer treatment.

The invention enables the investigation of cell sources from diverse populations and pathologies. While this EXAMPLE focused on arrhythmogenic risk with acute exposure to known and unknown effectors, further studies can accommodate longer compound exposure times during culture to test chronic environmental exposure of toxicants. The three-dimensional microtissue environment allows for many contact sites between cells due to non-polarized expression of gap junctional proteins in hiPSC-CMs, facilitating electrical coupling between neighboring cells that may dampen action potential duration variability between individual cells/cell clusters within close proximity. In a direct comparison using hESC-CMs, Archer et al., Sci. Rep., 8, 10160 (2018) showed with a receiver operating characteristic (ROC) analysis of drug responses to structural cardiotoxins that a three-dimensional microtissue platform has increased specificity compared with the same measurements made in two-dimensional monolayers of hiPSC-CMs. While the invention can produce large numbers of microtissues, the low variability beat-to-beat, microtissue-to-microtissue, mold-to-mold, and hiPSC-CM differentiation batch-to-batch reduces the need for very large batches and increases throughput.

A limitation of optical measurements is that they only measure changes in transmembrane voltage and not absolute values such as resting membrane potentials. The ratio-metric calibration approach may help to detect changes in resting membrane potentials by toxicants. See, Knisley et al., Physiology, 279(3), H1421-H1433 (September 2000).

The advantages of the invention, which together increase consistency to advance predictability and throughput, have not been demonstrated by other approaches. More widely standardized two-dimensional systems may use voltage- or calcium-sensitive dyes or microelectrode arrays for arrhythmia evaluation, yet often use spontaneous beating activity rather than paced responses (when cardiac action potential metrics are rate-dependent) or slower signal capture rates that limit temporal resolution and an ability to capture nuanced changes in the action potential waveform. Other spheroid/microtissue systems may approach the numbers of three-dimensional tissues/plate of the invention, where the maximum is thirty-five microtissues×12 wells=420 microtissues/plate. Few are used for arrhythmia assessment, preferring to focus on cellular toxicity such as through live/dead, mitochondrial, and ER imaging or contractile amplitude and kinetics from spheroid edge detection.

Model qualification: Action potential duration and arrhythmia test with known high-risk and low-risk potassium channel ($I_{Kr}$) blockers. To validate the capacity of the invention to predict arrhythmia risk, the inventors treated microtissues with the proarrhythmic HERG channel block E4031. Action potential ($AP_{90}$) durations were prolonged by 2 μM E4031. Additional beta-adrenergic stimulation using 50-100 nM isoproterenol triggered early afterdepolarizations (EAD). Isoproterenol alone shortened action potential durations and did not evoke early afterdepolarizations. See FIG. 5(A). E4031 prolonged action potential duration in a dose-dependent manner (260.8±61.2, 381.9±139.6, 497.2±164.1 for 0 μM, 1 μM and 2 μM E4031. See FIG. 4(D). Cumulative distribution plots show a right shift with increasing concentration. See FIG. 4(E). Early afterdepolarization incidences were recorded 44% of microtissues with hiPSC-CMs with 2 μM E4031 and 100 nM isoproterenol treatment. See FIG. 4(F). These results validate the assertion that cardiac microtissue platform can screen proarrhythmic toxicants that block HERG channel. The inventors further tested the calcium channel agonist 300 nM BayK8644 which prolongs action potential durations, and 5 mM caffeine, a sarcoplasmic reticulum calcium release channel ryanodine receptor agonist, did not alter action potential durations as expected. See FIG. 5. These results support the assertion that cardiac microtissue using hiPSC-derived CMs and human cardiac fibroblasts is an excellent platform for screening proarrhythmic toxicants.

Figure 6:
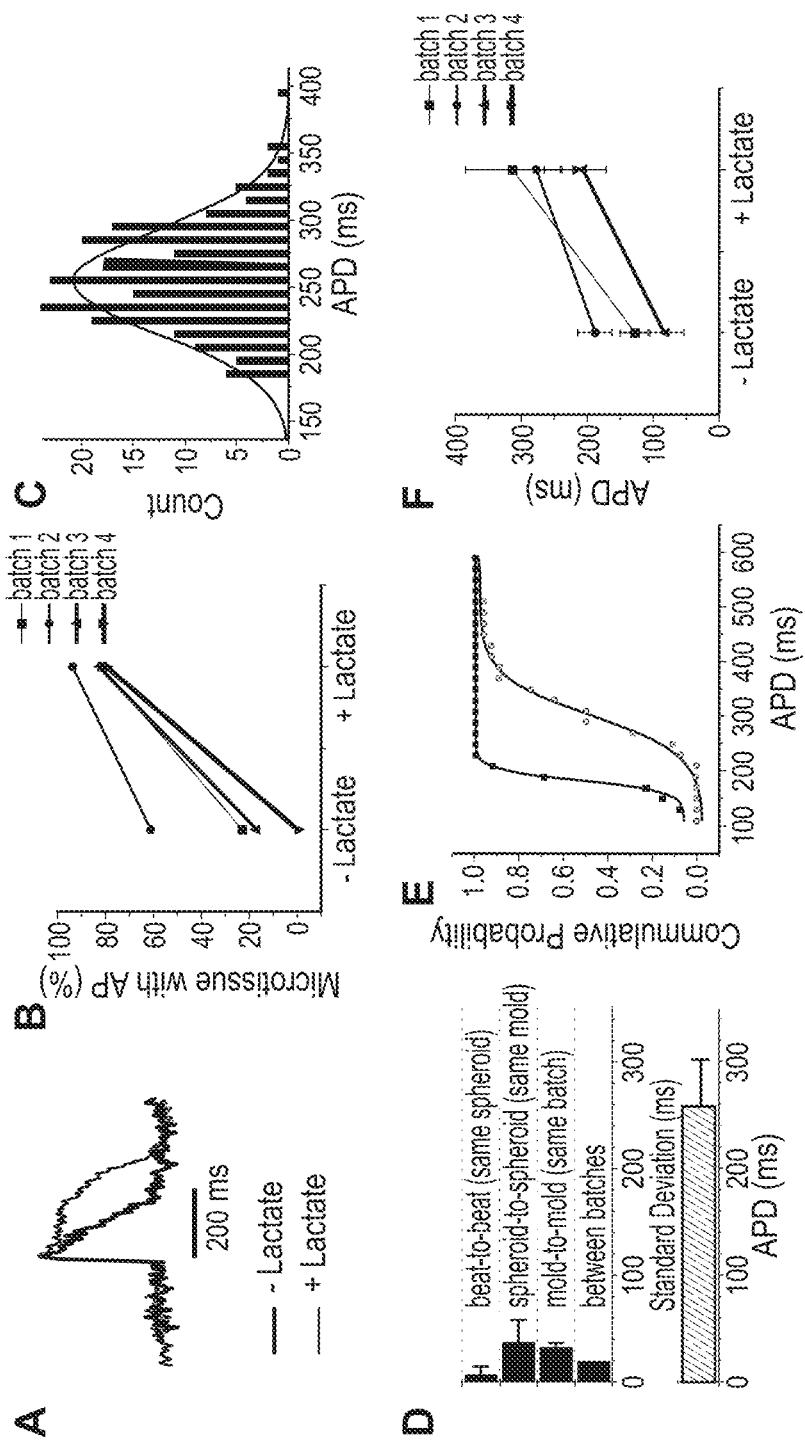
FIG. 6 is a set of figures showing that lactate purification of hiPSC-CMs before microtissue formation improves excitability and lengthens action potential durations.

The invention was predictive of expected arrhythmia risk with E4031, but the action potential duration in these microtissues was under 200 ms, and therefore shorter than action potential duration typically recorded in human patients. To improve the reliability and robustness of the invention, the inventors further purified and matured hiPSC-CMs with lactate (hiPSC-$CM_{LP}$). Lactate purification lengthened action potential duration and improved the excitability of microtissues (25.2±25.8) when directly compared to controls that were not lactate purified (84.4±6.5). See FIGS. 6(A) and 6(B). APD distribution was normally distributed. See FIG. 6(C). Batch-to-batch and mold-to-mold action potential duration variations were markedly improved in lactate purification, providing a better platform to compare electrophysiological responses to toxicants between different molds and batches. See FIG. 6(D). The cumulative distribution of action potential duration shifted right with lactate purification, and action potential duration was doubled from 130.6±54 in controls to 263.1±54.9 ms (p=0.04) with lactate purification (n=3~4 batches, minimum two molds/batch). See FIGS. 6(E) and 6(F).

Figure 8:
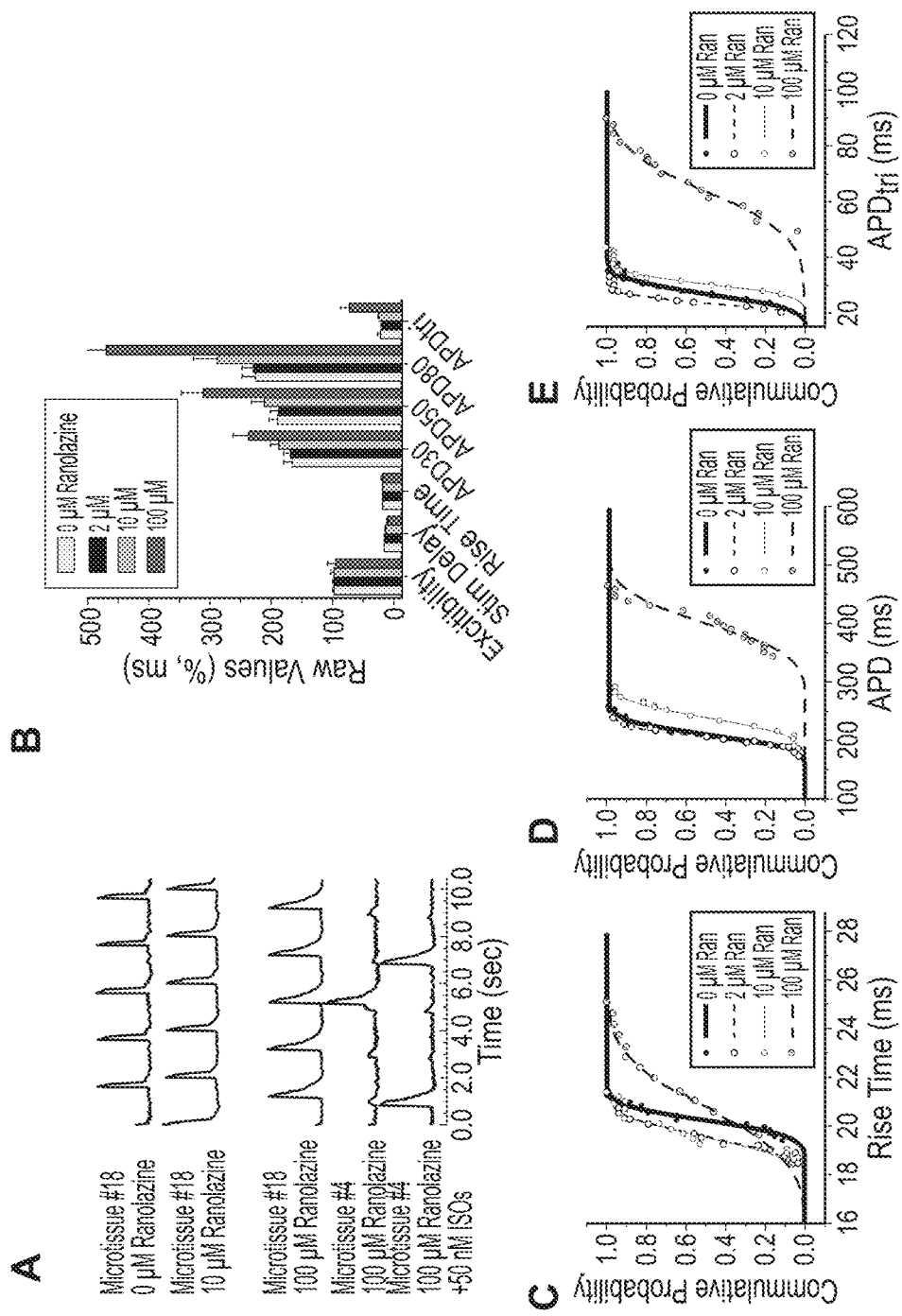
FIG. 8 is a set of figures showing in hiPSC-$CM_{LP}$ microtissues that the dose-response of low-Torsades de Pointes (TdP) risk drug ranolazine has effects at high concentrations (above the therapeutic window).

Action potential duration prolongation under 2 μM E4031 was also reconfirmed in hiPSC-$CM_{LP}$. See FIG. 7(A). With hiPSC-$CM_{LP}$, early afterdepolarizations were present in 54% of microtissues with E4031 exposure absent isoproterenol. See FIG. 7(A). Early afterdepolarizations appeared and contributed to the widely observed increase in action potential duration (653±167 ms in hiPSC-$CM_{LP}$ compared with 275±36 ms in control hiPSC-CM). See FIGS. 7(B) and 7(C). The inventors tested whether cardiac microtissues can identify low-risk compounds despite its adverse effect on hERG channel. The inventors tested whether cardiac microtissues can identify compounds used medically and determined to be low risk for arrhythmia in clinically-validated doses, particularly those compounds with known capacity to block the HERG channel. Ranolazine is a well-known drug that rarely causes Torsades de Pointes (TdP) and is frequently used as an anti-arrhythmic treatment despite HERG channel blockade and QT prolongation. The therapeutic concentration of ranolazine is in the range from 1-10 μM and has little impact on action potential duration. See FIGS. 7(D), 7(E), and 7(F). FIG. 8 shows the response to ranolazine at 0, 2, 10, and 100 UM concentrations. At or below 10 μM ranolazine, action potential duration prolongation is small, but 100 μM ranolazine prolongs action potential durations significantly and changes the shape of the waveform to alter APDtri. See FIGS. 8(B), 8(D), and 8(E). In addition, 100 μM ranolazine reduces excitability as some of pacing beats are missed, associated with increased action potential upstroke rise time. See FIGS. 8(B) and 8(C). Despite prolongation, no early afterdepolarizations were observed even in the presence of isoproterenol, in contrast to highly selective HERG channel blocker, E4031. Thus, ranolazine at therapeutic concentrations (1~10 μM) did not alter action potential parameters. At high concentration (100 μM), action potential duration prolongation is visible, and excitability is also altered (excitability, stimulation time delay), suggesting that ranolazine blocks multiple ion channels such as cardiac $Na^+$, $Ca^{2+}$, and HERG channels. No early afterdepolarizations were observed (1-2 molds/batch, two batches). This result indicates that cardiac microtissues using hiPSC-$CM_{LP}$ can differentiate low-risk compounds compared to HERG assay only.

Screening proarrhythmic toxicity of environmental toxicant exposure. Bisphenol-A (BPA) is an environmental pollutant used in manufacturing polycarbonate plastics. Its potential cardiotoxicity has been suspected and studied in cell culture and animal models. However, its effect on human cardiac action potential remains elusive. The inventors tested whether acute BPA exposure (20 minutes perfusion) alters action potential parameters using the Cardio-Tox TEEM microtissues.

The response of cardiac microtissues to BPA is complex, altering multiple action potential parameters including excitability, upstroke time delay from stimulation pulse, action potential duration, and $APD_{tri}$ in dose-dependent manners. See FIGS. 9(A) and 9(B). Pacing at 0.5 Hz fails to evoke action potentials in the presence of one nM BPA associated with increased time delay between stimulation pulse and action potential upstroke and increased rise time. See FIG. 9(C). This result demonstrates cardiotoxicity of BPA by reducing excitability. The increase of BPA dose from 1 to 10, 100, and 1000 nM causes shortening of action potential durations. See FIG. 9(D). This result indicates that BPA alters multiple ion channels to cause loss of excitability and dose-dependent changes to action potential duration. This result also shows that the cardiac microtissues using hiPSC-$CM_{LP}$ and human cardiac fibroblasts are sensitive enough to predict the outcome from toxicants at very low concentration.

Example 2

The Composition of Large, Macro-Scale Engineered Tissues Containing hiPSC-CMs with Human Cardiac Fibroblasts.

Data produced by the inventors show that 5% human cardiac fibroblasts enhance tissue formation but higher percentages (10%, 15%) distort the action potential signal and elicit spontaneous excitations that could confound an arrhythmia assessment. See Rupert et al. (2020b).

Example 3

Human Cardiac Fibroblasts Uniquely Modulate Electromechanical Function of hiPSC-CMs in Engineered Myocardium This EXAMPLE describes the effects of co-culturing adult human cardiac fibroblasts (hCFs) in three-dimensional engineered tissues to recapitulate healthy and diseased myocardium in vitro. See Rupert et al. (2020b). Inclusion of 5% human cardiac fibroblasts into tissues improves tissue formation and contractile function. Human cardiac fibroblasts undergo increased myofibroblast activation in traditional two-dimensional culture, and after prolonged culture, retain this altered phenotype when incorporated into engineered cardiac tissues. Increasing the percentage of human cardiac fibroblasts to 15% of the CM population results in an increasingly arrhythmogenic phenotype of engineered tissues. Taken together, results of this EXAMPLE demonstrate that human cardiac fibroblasts are a valuable cell source to manipulate engineered cardiac tissue physiological and pathophysiological function.

This EXAMPLE describes (1) that adult human cardiac fibroblasts (hCFs) are pathologically activated in two-dimensional culture with long culture periods; (2) the mechanics of hiPSC-CM engineered tissues improve with human cardiac fibroblast content when at low passages; (3) that high passage human cardiac fibroblasts retain an activated state, abrogating benefits to function; and (4) that the activation state of human cardiac fibroblasts does not alter hiPSC-CM calcium sensitivity.

This EXAMPLE presents a three-dimensional in vitro model of healthy and diseased cardiac tissue using human induced pluripotent stem cell-derived cardiomyocytes and adult human cardiac fibroblasts. This EXAMPLE demonstrates that tissue mechanical and electrical function are sensitive to doping and pre-conditioned activation of cardiac fibroblasts to produce healthy and diseased phenotypes.

This EXAMPLE describes how percentage and pre-conditioning of human cardiac fibroblasts effects the formation and mechanical and electrical function of cardiac tissues engineered from hiPSC-derived cardiomyocytes. Adding 5% resulted in an optimized, highly contractile engineered tissue. The inventors showed that increasing percentages of human cardiac fibroblasts led to higher spontaneous beating rates and increased maximum capture rate, demonstrating their integral role in hiPSC-CM electrical behavior and whole-myocardium function. The inventors showed that the functional benefits imparted by 5% hCFs were lost when human cardiac fibroblasts were further activated through serial passaging, which caused a disease-like activated state. Finally, the inventors report and characterize the appearance of pulsus alternans—the periodic alternation between full-force and partial-force contractions—and their pacing frequency dependence in engineered tissues.

This EXAMPLE demonstrates the usefulness of human cardiac fibroblasts for manipulating hiPSC-CM function to produce physiological and pathophysiological myocardial phenotypes in vitro.

In this EXAMPLE, the inventors demonstrate that adult human cardiac fibroblasts (hCFs) can be modulated to optimize engineered cardiac tissue contractile performance and that altering conditions may produce arrhythmogenic phenotypes, based on percentage and pre-conditioning of the human cardiac fibroblast population. The inventors demonstrate that neonatal human dermal fibroblasts (NHDFs) cannot be leveraged in the same way. The inventors show that low human cardiac fibroblast inclusion increases contractile force by three-fold compared to human induced pluripotent stem cell-cardiomyocyte only control tissues, while higher percentages increase excitability and spontaneous beating rate. And the inventors show that serial passaging and resulting increased myofibroblast activation is at least partially retained by human cardiac fibroblasts in engineered cardiac tissues, negating the benefit to function that early-passage human cardiac fibroblasts provide. These data demonstrate that human cardiac fibroblasts are a valuable cell type for manipulating the pathophysiological phenotype of engineered cardiac tissues and that the invention has the sensitivity to distinguish differences in functional performance in response to heterocellular interactions between hiPSC-CMs and human cardiac fibroblasts.

Introduction. Cardiac tissue engineering using human induced pluripotent stem cell-derived cardiomyocytes has been a promising avenue for cardiovascular regeneration, therapeutic development, and modeling, but it has been limited by functional immaturity inherent in human induced pluripotent stem cell-derived cells. It is well accepted that heterotypic cellular interactions alter the phenotype of cardiomyocytes.

Tissue engineering approaches to cardiac modelling, therapeutic development, and regeneration are promising but have been hindered by the electromechanical immaturity of human pluripotent stem cell (hPSC)-derived, cardiomyocytes. This immaturity has been documented in cardiovascular research from the single-cell level, where electrophysiological patch-clamp recordings have revealed a lack of inward rectifier potassium current ($I_{K1}$), to implantation in animal models, where arrhythmia and insufficient coupling are reported with the injection of cells and engineered tissues, respectively.

The ubiquity of these obstacles necessitates further exploration of how hPSC-cardiomyocyte electromechanical phenotype develops in response to differentiation protocols, culture conditions, and heterocellular interactions, to name only a few. Non-cardiomyocytes have been necessary for achieving optimal mechanical performance of engineered cardiac tissues, which makes the study of heterocellular interactions particularly invaluable to the cardiovascular engineering field. See Tiburcy et al. (2017).

As summarized by Zhou & Pu, Circ. Res., 118(3), 368-370 (2016), the ratio of cardiomyocytes to non-cardiomyocytes in the heart varies widely depending on methodology of measurement. However, studies of the human ventricle come to a consensus that cardiomyocytes contribute to about one third of the tissue by cell number, with endothelial cells and cardiac fibroblasts comprising most non-cardiomyocytes. A variety of human cell types have been used to replace this non-cardiomyocyte population in engineered tissues ranging from mesenchymal stem cells and umbilical vein endothelial cells to brain pericytes to neonatal dermal fibroblasts to simply relying on the non-cardiac population resulting from the differentiation process. These support cell types provide functional benefit to engineered tissues including improved extracellular matrix (ECM) production and contractile force. However, they do not consider native myocardial cellular heterogeneity, which provides a physiological list of potential support cell candidates.

Among these candidates are cardiac fibroblasts, which comprise a significant portion of the heart by cell number. They are critical for providing structural organization and support in homeostasis and are prominent modulators of acute and chronic cardiac injury. In the healthy heart, CFs produce and maintain the ECM, specifically fibronectin, laminin, and collagens I, III, and IV. In a disease state, CFs undergo activation to a myofibroblast phenotype, characterized by increased proliferation, contractility, and extracellular matrix production Myofibroblasts express gap junctions connexin 43 and connexin 45, and at a low concentration, they speed conduction and upstroke velocity in vitro. Recent studies also suggest myofibroblasts electrically couple to cardiomyocytes at the border zone of infarcted murine hearts. Their active participation in myocardial structural maintenance and disease makes human cardiac fibroblasts an excellent candidate for developing engineered cardiac tissues with more mature functionality while incorporating a physiologically relevant toolkit to model cardiac injury, aging, and fibrosis.

Neonatal human dermal fibroblasts cannot improve engineered myocardial function. Neonatal human dermal fibroblasts (NHDFs) are a widely available fibroblast source and have been reported to improve engineered tissue function when doped between 10% and 30%, making them a promising candidate for support cells in engineered cardiac tissues (ECTs). Passage 4 neonatal human dermal fibroblasts were doped into engineered cardiac tissues at 0% (control), 10%, or 20% of hiPSC-CM input and cultured for one week. Neonatal human dermal fibroblasts significantly increased tissue compaction as measured by cross-sectional area (CSA, $P<0.01$, $n≥5$). The addition of 10% NHDFs increased tissue stiffness to 38±9 kPa, above that of healthy human myocardium ($P<0.01$, $n≥5$). Stiffness precipitously dropped with adding 20% NHDFs due to poor tissue formation and cell segregation. Only in cardiomyocyte-only control tissues did most of engineered cardiac tissues form a beating syncytium, determined by tissue-level contractile response to 1 Hz field stimulation and by observation of holes and cell segregation in culture. When compared to hiPSC-CM control tissues of a similar cell purity, NHDF-containing tissues produced significantly less contractile stress ($P<0.01$, $n≥7$).

These data indicate that neonatal human dermal fibroblasts are not the most suitable support cell-type and that fibroblast organ origin may be critical for imparting functional benefit on engineered myocardium.

Human cardiac fibroblasts undergo myofibroblast activation in monolayer culture. Based on the findings that neonatal human dermal fibroblasts (NHDFs) could not improve the function of engineered cardiac tissues (ECTs), the inventors next identified adult human cardiac fibroblasts (hCFs) as a potential physiologically relevant support cell source. The inventors first sought to validate their phenotype in two-dimensional culture. Sensitivity of human cardiac fibroblasts to stiffness-induced myofibroblast activation was determined by plating passage three or four (P3 or P4) human cardiac fibroblasts on polyacrylamide gels or glass coverslips with stiffnesses of approximately 12 kPa and 50 GPa, respectively. After seventy-two hours of culture, human cardiac fibroblasts were fixed and labeled by immunofluorescence for vimentin, an intermediate filament protein in fibroblasts, and alpha smooth muscle actin (αSMA), an actin isoform whose increased expression is associated with myofibroblast activation. Expression of αSMA normalized by vimentin was 0.5-fold less in human cardiac fibroblasts cultured on polyacrylamide gels of a physiological stiffness compared to those cultured on glass ($P<0.01$, $n=5$), demonstrating human cardiac fibroblast sensitivity to stiffness-induced activation in two-dimensional culture.

The inventors next assessed the ability of human cardiac fibroblasts to be further activated via biochemical stimulation by treating passage 4 human cardiac fibroblasts with 10 ng/ml TGF-β1 for forty-eight hours. Cells were fixed and fluorescently labeled for αSMA and vimentin. TGF-β1-treated human cardiac fibroblasts had a 1.2-fold increase in normalized αSMA fluorescence compared to control (P<0.01, n≥10). These data show that besides stiffness-induced myofibroblast activation, biochemical activation of human cardiac fibroblasts occurs in two-dimensional culture.

To further examine human cardiac fibroblast activation in response to prolonged exposure to a stiff substrate, cells were maintained on tissue culture plastic with a stiffness of approximately 100 MPa from passage four (p4) to passage 9 (p9) during eight weeks. Passage 9 human cardiac fibroblasts showed a 1.3-fold increase in αSMA expression over p4 human cardiac fibroblasts (P<0.01, n≥17). Messenger RNA was collected from p4 human cardiac fibroblasts, p9 human cardiac fibroblasts, and p4 neonatal human dermal fibroblasts (NHDFs). q-RT-PCR was run to assess transcript expression levels. Analysis revealed a significant increase in transcript levels of ACTA2, encoding αSMA, by 1.5-fold in p9 human cardiac fibroblasts over p4 human cardiac fibroblasts (P<0.05, n≥3). GJA1, encoding connexin 43 (Cx43), which has been shown to be present in cardiac fibroblasts and upregulated in parallel with αSMA, increased by 4.6-fold in p9 over p4 human cardiac fibroblasts (P<0.01, n≥3).

Immunofluorescence labeling confirmed presence of Cx43 in hCFs. Human cardiac fibroblast percentage modulates engineered tissue mechanics and kinetics. Addition of human cardiac fibroblasts to the 3D ECT platform enabled examination of their effect on hiPSC-CMs in a physiologically relevant environment. In the human heart, cardiomyocytes compose ~20-30% of cells by number. However, hiPSC-CM volume is approximately ⅓ of the adult human cardiomyocyte volume. To recapitulate an appropriate volume ratio of cardiomyocytes to non-cardiomyocytes in engineered cardiac tissues, human cardiac fibroblasts were doped in at a range of 0%-15% of input hiPSC-CMs.

hiPSC-CM/hCF tissues were formed and cultured for one week. Tissues in all groups compacted the collagen matrix and formed a beating syncytium. Human cardiac fibroblasts increased ECT compaction as measured by cross-sectional area in a dose-dependent manner, resulting in a 25% to 63% decrease in cross-sectional area which reached significance with 10% and 15% human cardiac fibroblasts (P<0.01, n≥7). See TABLE 3.

Mechanical properties of engineered cardiac tissues were tested after seven days of culture to determine the effect of ECT cellular composition on functional performance. Tissues were mounted on a custom apparatus and bathed in 37° C. Tyrode's solution with 1.8 mM $CaCl_2$. Tissue stiffness was calculated from the linear portion of the stress-strain curve as engineered cardiac tissues were stretched from relaxed length ($L_0$) to 130% of $L_0$. Stiffness increased with adding human cardiac fibroblasts in a dose-dependent manner by 3.7-fold with 5% human cardiac fibroblasts, 5.2-fold with 10% human cardiac fibroblasts, and significantly by 9.1-fold with 15% human cardiac fibroblasts (P<0.01, n≥3; TABLE 3). Active stress, the contractile force produced during twitch contractions normalized by cross sectional area, was measured at 1 Hz stimulation and increased significantly with including 5% human cardiac fibroblasts. However, 10% and 15% human cardiac fibroblasts did not differ significantly from control (P<0.05, n≥6). characters

TABLE 3 hCF doping experiments 1 Hz mechanics summary

| Measurement | Group | | Mean (n) | SEM |
|---|---|---|---|---|
| Cross-sectional area (mm²) | Control | | 0.335 (7) | 0.030 |
| | 5% | +hCFs | 0.243 (12) | 0.036 |
| | 10% | | 0.170 (7)[1] | 0.032 |
| | 15% | | 0.126 (8)[1] | 0.021 |
| Young's Modulus (kPa) | Control | | 0.67 (6) | 0.11 |
| | 5% | +hCFs | 3.12 (6) | 0.92 |
| | 10% | | 4.16 (4) | 1.45 |
| | 15% | | 6.75 (3)[1] | 0.62 |
| Maximum active stress (mN/mm²) | Control | | 0.046 (7) | 0.008 |
| | 5% | +hCFs | 0.123 (10)[1] | 0.032 |
| | 10% | | 0.097 (7) | 0.021 |
| | 15% | | 0.080 (6) | 0.024 |
| Maximum capture rate (Hz) | Control | | 2.93 (7) | 0.28 |
| | 5% | +hCFs | 3.17 (12) | 0.17 |
| | 10% | | 3.71 (7) | 0.15 |
| | 15% | | 3.86 (7)[1] | 0.14 |

Superscript 1 shows significant changes with p-value <0.05 vs. control

Because proliferation and migration of fibroblasts exist in the post-MI heart, the inventors examined the effect of increasing human cardiac fibroblast percentage on the contractile force and kinetics of engineered cardiac tissues during a frequency ramp protocol of 0.5 Hz increments from 1 Hz up to 4 Hz field stimulation. Because human cardiac fibroblasts do not disrupt electrical propagation in the healthy heart, their inclusion should not hinder electrical activity in engineered cardiac tissues. Maximum capture rate (MCR) was measured at 130% of relaxed tissue length and increased significantly in a dose-dependent manner with human cardiac fibroblast percentage to 3.9 Hz with 15% human cardiac fibroblasts, well beyond that of physiological heart rates (P<0.05, n≥7). See TABLE 3.

The force-frequency relationship in engineered cardiac tissues was determined by measuring contractile force while pacing tissues from 1 Hz to 4 Hz at 0.5 Hz steps. Control engineered cardiac tissues showed reduction in force with increasing pacing frequency, as described in the inventors' previous studies with this macro-scale engineered tissue platform. See Rupert & Coulombe (2017). Increasing human cardiac fibroblast content did not improve the force-frequency performance. Tissues experienced a significant decrease in contractile force at 2-3.5 Hz compared to 1 Hz with 5% hCF, 10% hCF, and 15% hCF (P<0.05, n≥7). Importantly, force amplitude of 5% hCF and 10% hCF tissues was significantly greater than control engineered cardiac tissues by more than six-fold between 1 and 2.5 Hz (P<0.05, n≥7). See TABLE 4. Taken together, these data suggest that although control tissues maintain force amplitude to pacing frequencies higher than human cardiac fibroblast-containing tissues, this comes at the cost of force amplitude.

TABLE 4 hCF doping experiments force-frequency summary

| Msmt | Group | 1 Hz Mean (n) | SEM | 1.5 Hz Mean (n) | SEM | 2 Hz Mean (n) | SEM | 2.5 Hz Mean (n) | SEM |
|---|---|---|---|---|---|---|---|---|---|
| Stress ($\mu$N/mm$^2$) | Control | 27.1 (7) | 5.0 | 21.5 (7) | 4.2 | 16.9 (5) | 3.7 | 7.4 (6) | 1.7 |
| | 5% +hCF | 104.0 (12) | 11.8 | 95.9 (12)[1] | 11.1 | 71.4 (12)*[1] | 9.4 | 52.5 (11)**[1] | 7.5 |
| | 10% | 90.1 (7)[1] | 18.1 | 86.1 (7)[1] | 17.9 | 70.2 (7)[1] | 15.0 | 51.5 (7)[1] | 10.9 |
| | 15% | 75.2 (7)[1] | 15.5 | 77.6 (5)[1] | 21.6 | 52.1 (7) | 12.6 | 38.3 (7) | 19.3 |
| $V_{up}$ ($\mu$N/s) | Control | 63.4 (7) | 21.3 | 53.5 (7) | 20.0 | 45.7 (5) | 15.3 | 19.2 (6) | 8.9 |
| | 5% +hCF | 118.2 (12) | 25.9 | 113.7 (12) | 25.6 | 91.6 (12) | 21.0 | 74.3 (11) | 16.2 |
| | 10% | 97.2 (7) | 28.3 | 96.1 (7) | 27.5 | 85.9 (7) | 24.7 | 68.6 (7) | 19.9 |
| | 15% | 76.9 (7) | 23.0 | 94.5 (5) | 27.1 | 62.9 (7) | 21.3 | 50.8 (7) | 17.0 |
| T50 (ms) | Control | 261.8 (7) | 12.7 | 210.5 (7)** | 4.9 | 173.0 (5)** | 5.8 | 136.6 (6)** | 2.3 |
| | 5% +hCF | 222.3 (12)[1] | 18.2 | 182.2 (12)** | 6.9 | 159.1 (12)** | 5.4 | 137.5 (11)** | 3.2 |
| | 10% | 187.4 (7)[1] | 22.5 | 169.8 (7) | 6.4 | 151.9 (7) | 5.6 | 131.4 (7)** | 2.8 |
| | 15% | 162.5 (7)[2] | 20.6 | 174.3 (5) | 11.3 | 165.4 (7) | 18.1 | 131.3 (7) | 9.8 |
| T90 (ms) | Control | 519.7 (7) | 17.7 | 383.6 (7)** | 14.4 | 311.5 (5)** | 6.2 | 237.6 (6)** | 7.7 |
| | 5% +hCF | 440.7 (12)[1] | 22.6 | 383.9 (12)* | 5.8 | 306.0 (12)** | 8.0 | 253.9 (11)** | 3.3 |
| | 10% | 409.6 (7)[1] | 34.6 | 364.6 (7) | 11.0 | 314.2 (7)** | 8.5 | 254.4 (7)** | 3.7 |
| | 15% | 455.1 (7) | 65.3 | 378.5 (5)* | 30.0 | 306.6 (7)** | 6.7 | 254.8 (7)** | 7.3 |

| Msmt | Group | 3 Hz Mean (n) | SEM | 3.5 Hz Mean (n) | SEM | 4 Hz Mean (n) | SEM |
|---|---|---|---|---|---|---|---|
| Force ($\mu$N/mm$^2$) | Control | 3.2 (2) | 0.9 | 1.7 (3) | 0.9 | 1.0 (1) | N/A |
| | 5% +hCF | 27.6 (8)** | 5.3 | 23.7 (3)** | 1.0 | 1.1 (3)** | 0.9 |
| | 10% | 33.5 (7)** | 6.9 | 24.6 (5)** | 6.8 | 13.1 (4)** | 5.6 |
| | 15% | 33.6 (6) | 7.9 | 23.5 (6) | 5.9* | 16.2 (6)** | 4.4 |
| $V_{up}$ ($\mu$N/s) | Control | 8.6 (2) | 1.5 | 5.1 (3) | 1.7 | 3.4 (1) | N/A |
| | 5% +hCF | 42.0 (8)* | 15.0 | 39.4 (3) | 22.4 | 8.1 (3)* | 3.3 |
| | 10% | 49.8 (7) | 13.8 | 40.4 (5) | 13.8 | 24.4 (4) | 9.8 |
| | 15% | 47.3 (6) | 13.5 | 36.7 (6) | 11.0 | 27.1 (6) | 8.9 |
| T50 (ms) | Control | 119.4 (2)** | 3.0 | 96.5 (3)** | 1.0 | 81.9 (1) | N/A |
| | 5% +hCF | 110.5 (8)** | 6.9 | 96.4 (3)** | 3.0 | 85.1 (3)** | 3.1 |
| | 10% | 108.8 (7)** | 2.4 | 91.9 (5)** | 1.6 | 78.5 (4)** | 1.7 |
| | 15% | 1.18.6 (6)* | 9.2 | 103.0 (6)** | 6.1 | 88.7 (6)** | 5.7 |
| T90 (ms) | Control | 209:2 (2)* | 4.4 | 171.3 (3)** | 9.2 | 157.8 (1) | N/A |
| | 5% +hCF | 200.0 (8)** | 10.1 | 179.8 (3)** | 2.9 | 145.9 (3)** | 3.9 |
| | 10% | 209.9 (7)** | 4.3 | 175.7 (5)** | 2.0 | 149.0 (4)** | 3.6 |
| | 15% | 208.2 (6)*** | 3.3 | 184.4 (6)** | 4.9 | 159.3 (6)** | 2.7 |

Superscript [1] shows significant change with p-value < 0.05 vs. control
Superscript [2] shows significant change with p-value < 0.05 vs. control and vs. +5% hCF
*indicates p-value < 0.05 and **indicates p-value < 0.01 compared to tissues of same experimental group at 1. Hz pacing To determine the frequency dependence of contraction and relaxation kinetics in engineered cardiac tissues, the inventors analyzed the upstroke velocity ($v_{up}$, steepest slope of contractile rise), time to 50% relaxation of peak force (T50) and time to 90% relaxation of peak force (T90). $V_{up}$ did not differ significantly between groups, however, relaxation kinetics changed significantly with adding human cardiac fibroblasts. Faster repolarization kinetics are associated with anti-arrhythmia effects, a desirable characteristic in engineered tissues intended for translation. At 1 Hz, $T_{50}$ was significantly faster in all human cardiac fibroblast tissues. $T_{90}$ was significantly faster in 5% and 10% human cardiac fibroblast tissues (P<0.05, n≥7). Notably, $T_{50}$ increased from 1 Hz to 1.5 Hz in 15% human cardiac fibroblast tissues and did not become significantly shorter than the 1 Hz value until reaching three Hz (P<0.05, n=7). See TABLE 4. This delayed repolarization is clinically considered a risk factor for arrhythmia. indeed, the inventors observed evidence of early afterdepolarizations during in vitro testing.

Force alternans appear in engineered tissues during increased pacing frequency. To further elucidate how increasing human cardiac fibroblast percentage affected engineered cardiac tissue frequency-dependent behavior, the inventors analyzed the appearance and amplitude of contractile alternans, the regular alternation between consecutive contractions. Because increasing human cardiac fibroblast percentage improved maximum capture rate to higher frequencies, alternans should be reduced with adding human cardiac fibroblasts. The fraction of engineered cardiac tissues with alternans present was not significantly different between groups. Still, the pacing frequency necessary to elicit alternans was significantly higher in 10% and 15% human cardiac fibroblast tissues compared to control (P<0.01, n≥3). The inventors then analyzed the frequency-dependence of the amplitude and makeup (systolic or diastolic) of alternans. No difference was present in the alternans makeup. 10% human cardiac fibroblast tissues, at 3 Hz and 4 Hz, and 15% human cardiac fibroblast tissues, at 3.5 Hz and 4 Hz, had a significantly smaller alternans amplitude compared to 5% human cardiac fibroblast tissues (P<0.05, n=3).

Cardiac fibroblast activation negates mechanical benefits of 5% hCF addition. Because 5% human cardiac fibroblasts resulted in tissues with the highest contractile function, the inventors proceeded with studies at this concentration. To determine the sensitivity of the tissues to cardiac fibroblast activation state, the inventors compared the effect of 5% early-passage (p4) human cardiac fibroblasts and 5% serially passaged (p9) human cardiac fibroblasts to control, cardiomyocyte-only tissues. Considering the results of assays in traditional two-dimensional culture, the increased myofibroblast-like activation state of p9 human cardiac fibroblasts should negatively affect the function of engineered cardiac tissues in which they were included, determined by metrics of stiffness, compaction, contractile force, and maximum capture rate (MCR). Tissues were formed and cultured in the same manner described above and underwent mechanical testing after one week of culture. P4 human cardiac fibroblasts increased compaction, tissue stiffness, and contractile force, with no significant difference on MCR, matching the results seen in the doping experiments ($P<0.05$, $n \geq 15$). See, TABLE 5.

TABLE 5

| P4 v P9 hCF experiments mechanics summary at 1 Hz | | | | |
|---|---|---|---|---|
| Measurement | Group | | Mean (n) | SEM |
| Cross-sectional area (mm$^2$) | Control | | 0.213 (18) | 0.028 |
| | P4 | +hCFs | 0.081 (18)[1] | 0.010 |
| | P9 | | 0.203 (20)[2] | 0.012 |
| Young's Modulus (kPa) | Control | | 1.59 (14) | 0.36 |
| | P4 | +hCFs | 7.89 (16)[1] | 1.74 |
| | P9 | | 2.47 (16)[2] | 0.58 |
| Maximum active stress (mN/mm$^2$) | Control | | 0.141 (15) | 0.031 |
| | P4 | +hCFs | 0.227 (18)[1] | 0.033 |
| | P9 | | 0.087 (20)[2] | 0.015 |
| Maximum capture rate (Hz) | Control | | 4.13 (16) | 0.11 |
| | P4 | +hCFs | 4.00 (18) | 0.07 |
| | P9 | | 3.87 (19) | 0.10 |

Superscript 1 shows significant change with p-value <0.05 vs. control and vs. P9 hCF.
Superscript 2 shows significant change with p-value <0.05 vs. P4 hCF Activated cardiac fibroblasts modulate contraction and relaxation kinetics. The frequency dependence of force production, contraction velocity, and relaxation times was measured with adding 5% p4 hCFs or p9 hCFs. As previously e, p4 hCF tissues produced more force by 1.6-fold over control tissues from 1 Hz to 2.5 Hz. Adding p9 hCFs, however, resulted in a signification decrease in force compared to control (1 Hz and 1.5 Hz) and to p4 human cardiac fibroblast tissues (1 Hz to 3 Hz) ($P<0.05$, $n \geq 16$). See TABLE 5. While control and p4 human cardiac fibroblast tissues retained a non-negative force-frequency relationship from 1 Hz to 2 Hz, p9 human cardiac fibroblast tissues maintained this relationship to 3 Hz at the cost of force production.

Upstroke velocity was significantly faster in control tissues at 1 Hz and 1.5 Hz and decreased more quickly with decreasing force than p4 hCF and p9 hCF tissues ($P<0.05$, $n \geq 16$). Relaxation times were not significantly different between groups, however, p9 hCF tissues had a significantly larger slope for the linear regression calculated for T50 and T90 versus contractile stress ($P<0.01$, $n \geq 16$). In other words, for an increase in contractile stress, p9 tissues displayed a larger increase in relaxation time, reminiscent of increased relaxation times in cardiac infarct scar tissue.

TABLE 6

| p4 v p9 hCF experiments force-frequency summary | | | | | | | | |
|---|---|---|---|---|---|---|---|---|
| | Frequency | | 1 Hz | | 1.5 Hz | | 2 Hz | |
| Measure | Group | | Mean (n) | SEM | Mean (n) | SEM | Mean (n) | SEM |
| Stress (µN/mm$^2$) | Control | | 123.4 (16) | 19.1 | 120.4 (16) | 18.7 | 102.2 (16) | 15.2 |
| | P4 | +hCFs | 193.0 (18)[2] | 25.5 | 176.4 (18)[2] | 21.7 | 154.4 (18)[2] | 18.3 |
| | P9 | | 76.3 (20)[3] | 7.7 | 74.1 (20)[3] | 7.4 | 65.6 (20)[5] | 6.7 |
| Vup (µN/s) | Control | | 156.5 (16) | 35.2 | 152.9 (16) | 34.2 | 138.0 (16) | 30.5 |
| | P4 | +hCFs | 99.1 (18)[1] | 12.5 | 91.5 (18)[1] | 10.3 | 86.1 (18) | 9.6 |
| | P9 | | 96.7 (20)[1] | 12.4 | 95.7 (20)[1] | 12.1 | 90.8 (20) | 11.1 |
| T50 (ms) | Control | | 154.4 (16) | 11.3 | 148.3 (16) | 7.0 | 148.0 (16) | 5.5 |
| | P4 | +hCFs | 138.8 (18) | 5.5 | 137.1 (18) | 4.5 | 137.6 (18) | 3.8 |
| | P9 | | 136.5 (20)[1] | 8.0 | 137.9 (20) | 7.7 | 136.9 (20) | 6.8 |
| T90 (ms) | Control | | 303.1 (16) | 26.0 | 316.5 (16) | 12.5 | 296.6 (16) | 5.4 |
| | P4 | +hCFs | 291.6 (18) | 16.2 | 311.2 (18) | 10.4 | 292.0 (18) | 3.8 |
| | P9 | | 278.2 (20) | 14.5 | 293.3 (20) | 14.8 | 276.9 (20) | 9.1 |
| | Frequency | | 2.5 Hz | | 3 Hz | | | |
| Measure | Group | | Mean (n) | SEM | Mean (n) | SEM | | |
| Stress (µN/mm$^2$) | Control | | 75.1 (16)* | 10.5 | 52.5 (16)** | 7.1 | | |
| | P4 | +hCFs | 120.2 (18)**[2] | 13.9 | 87.6 (18)**[4] | 10.1 | | |
| | P9 | | 50.9 (20)[5] | 5.7 | 36.2 (20)[5] | 4.6 | | |
| Vup (µN/s) | Control | | 110.1 (16) | 22.9 | 85.1 (16)* | 16.9 | | |
| | P4 | +hCFs | 74.8 (18) | 8.5 | 61.1 (18) | 7.1 | | |
| | P9 | | 77.3 (20) | 9.4 | 58.3 (20) | 7.7 | | |
| T50 (ms) | Control | | 133.4 (16)* | 5.5 | 113.6 (16)** | 2.2 | | |
| | P4 | +hCFs | 125.7 (18) | 2.9 | 109.9 (18)** | 1.9 | | |
| | P9 | | 123.1 (20) | 4.8 | 110.1 (20)** | 3.3 | | |
| T90 (ms) | Control | | 251.2 (16)** | 1.9 | 206.7 (16)** | 2.7 | | |
| | P4 | +hCFs | 244.6 (18)** | 3.0 | 206.9 (18)** | 1.7 | | |
| | P9 | | 242.6 (20)* | 4.2 | 211.5 (20)** | 3.6 | | |

TABLE 6-continued p4 v p9 hCF experiments force-frequency summary

| Measure | Frequency<br>Group | 3.5 Hz<br>Mean (n) | SEM | 4 Hz<br>Mean (n) | SEM |
|---|---|---|---|---|---|
| Stress ($\mu N/mm^2$) | Control | 37.0 (16)** | 4.8 | 16.3 (13)** | 1.9 |
| | P4 +hCFs | 63.2 (18)** | 7.2 | 42.6 (16)** | 5.5 |
| | P9 | 28.3 (17)* | 4.0 | 19.3 (15)** | 2.3 |
| Vup ($\mu N/s$) | Control | 65.5 (16)** | 13.1 | 32.2 (13)** | 5.6 |
| | P4 +hCFs | 48.0 (18) | 6.0 | 33.9 (16)* | 4.4 |
| | P9 | 51.2 (17) | 6.7 | 42.4 (15) | 5.4 |
| T50 (ms) | Control | 95.6 (16)** | 1.6 | 76.3 (13)** | 5.8 |
| | P4 +hCFs | 94.4 (18)** | 1.1 | 80.5 (16)** | 1.2 |
| | P9 | 94.8 (17)** | 2.2 | 82.2 (15)** | 1.9 |
| T90 (ms) | Control | 177.5 (16)** | 2.3 | 142.8 (13)** | 10.7 |
| | P4 +hCFs | 177.5 (18)** | 1.0 | 156.5 (16)** | 1.7 |
| | P9 | 177.3 (17)** | 1.8 | 155.8 (15)** | 15 |

Superscript [1] shows significant change with p-value < 0.05 vs. control
Superscript [2] shows significant change with p-value < 0.05 vs. control and P9 hCF
Superscript [3] shows significant change with p-value < 0.05 vs. control and P4 hCF
Superscript [4] shows significant change with p-value < 0.05 vs. P9 hCF
Superscript [5] shows significant change with p-value < 0.05 vs. P4 hCF
*P < 0.05 and **P < 0.01 compared to tissues of same experimental group at 1 Hz pacing Amplitude of contractile alternans reflects force-frequency response. To determine how cardiac fibroblast activation state affected alternans behavior in engineered cardiac tissues, the inventors analyzed the fraction, onset, and amplitude of alternans during pacing from 1 Hz to 4 Hz. See Rupert et al. (2020b). The fraction of tissues exhibiting alternans and the frequency at which they appeared did not differ significantly between groups (n≥15). Onset of alternans occurred at 3.4 Hz pacing in all groups, well above the average adult's maximum heart rate. Control and p4 human cardiac fibroblast tissues had a significant increase in alternans amplitude at 4 Hz (P<0.01, n≥5). However, the amplitude of alternans increased with overall contractile force and was not significantly different among the groups, suggesting that the changes in alternans reflected each group's force-frequency response. To confirm the presence of alternans, the inventors performed simultaneous force and $Ca^{2+}$ measurements using Rhod-2 $Ca^{2+}$-sensitive dye and video recording of the fluorescence signal. Alternans in contraction amplitude were paralleled in $Ca^{2+}$ transience amplitude in all groups and trended toward increasing amplitude with increasing stimulation frequency, reaching significance in control tissues (P<0.05, n=3). Taken together, these data demonstrate that engineered cardiac tissues of all groups exhibit alternans who's amplitude is dependent on overall contractile force and thus the force-frequency response of tissues.

Human cardiac fibroblasts do not alter hiPSC-CM engineered tissue response to external bathing calcium concentration. HCFs did not significantly affect the appearance and onset of alternans or the force-alternans relationship in engineered cardiac tissues. Additionally, they did not alter $Ca^{2+}$ alternans. Thus, human cardiac fibroblasts should not alter hiPSC-CM calcium handling. To test this, the inventors performed a force-$Ca^{2+}$ protocol by increasing the bathing $[Ca^{2+}]$ from 0.1 mM to 4 mM under 1 Hz stimulation for measurement of twitch contraction mechanics.

Force-$Ca^{2+}$ data were fit with a nonlinear regression with R2 values >0.92. EC50 and Hill's slope were calculated for each engineered tissue and did not differ significantly between groups (n.s., n≥3). Taken together, these data suggest that addition of 5% human cardiac fibroblasts did not affect hiPSC-cardiomyocyte myofilament sensitivity to calcium.

Discussion. Electromechanical immaturity of stem cell-derived cardiomyocytes is a significant limitation in the advancement of cardiac tissue engineering toward translation applications, and novel support cell types provide an exciting tool to overcome this limitation. This EXAMPLE describes the functional effects of human cardiac fibroblasts (hCFs) on hiPSC-CM engineered tissue contractility. The inventors demonstrate that doping and serial passaging of human cardiac fibroblasts are effective approaches to engineer physiological and pathophysiological models of human myocardium in vitro. Findings from this EXAMPLE include (1) evidence of primary adult human cardiac fibroblast activation in two-dimensional culture through mechanical, biochemical, and serial passaging methods, (2) identification of 5% human cardiac fibroblast content in engineered cardiac tissues for optimal functional performance, (3) demonstration that higher human cardiac fibroblast content significantly increases spontaneous beating frequency and leads to a smaller fraction of engineered tissues capable of following physiological pacing, (4) evidence that functional benefits imparted by early-passage human cardiac fibroblasts are compromised when late-passage human cardiac fibroblasts are used, and (5) the report of contractile and calcium alternans in human engineered cardiac tissues.

Because primary human cardiac fibroblasts have only recently been adopted as support cells for human cardiac tissues, it is necessary to evaluate their fibroblast behavior in traditional, two-dimensional culture. To do this, the inventors used previously reported techniques to induce myofibroblast-like activation and deactivation. Transition from a soft, polyacrylamide gel to stiff, tissue-culture plastic has been shown to promote stiffness-induced myofibroblast differentiation in human lung fibroblasts, a reversible process. The inventors replicated with human cardiac fibroblasts. The inventors next demonstrated the biochemical activation of human cardiac fibroblasts to a myofibroblast-like state using TGF-ß1.

Finally, the inventors sought to validate increased myofibroblast activation with serial passaging, a phenomena which has been reported in rodent cardiac fibroblasts. Through long-term culture human cardiac fibroblasts, the inventors were able to achieve a significant increase in αSMA expression.

Cardiomyocytes make up approximately 70 to 80% of the volumetric fraction of the heart. the inventors have previously shown that the volume of newly differentiated cardiomyocytes is roughly one third that of neonatal cardiomyocytes. To maintain the physiological volume ratio in the engineered tissues, the inventors doped in human cardiac fibroblasts at a range of 5-15% of hiPSC-CM number. Tissues with 5% human cardiac fibroblasts produced significantly higher contractile forces than any other group. The inventors used this ratio for subsequent cardiac tissue engineering assays. Though 10% human cardiac fibroblasts and 15% human cardiac fibroblasts increased tissue compaction, stiffness, and maximum capture rate more significantly than 5% human cardiac fibroblasts, the prolongation of their relaxation time and increasing frequencies and appearance of early afterdepolarizations, made these higher percentages less desirable. The fraction of beats captured at 1 Hz stimulation was significantly decreased in 10% and 15% tissues compared to control, which suggest this higher percentage of fibroblasts disrupts the electromechanical behavior of the tissues. Notably, the inventors found that neonatal human dermal fibroblasts (NHDFs) in the same concentration range disrupted ECT formation and function, demonstrating that fibroblast origin uniquely determines fibroblast behavior.

This finding agrees with previous reports that fibroblasts originating from different organs possess unique transcription profiles which can be distinctly mapped to their respective organs of origin.

Engineered cardiac tissues were sensitive to inclusion of human cardiac fibroblasts at different concentrations across multiple metrics, indicating the importance of heterotypic interactions between hiPSC-CMs and human cardiac fibroblasts. Tissue compaction, stiffness, and maximum capture rate (MCR) responded to increasing human cardiac fibroblast concentration in a dose-dependent manner. Increased compaction and stiffness were expected, as cardiac fibroblasts are a remodeling and ECM-producing cell type, however, the increased MCR was surprising, given the previous reports that cardiac fibroblasts are insulating cells which decrease beating rate with increasing percentage. A possible explanation is that the higher fibroblast content disrupts tissue-level electromechanical function, resulting in increased spontaneous activity of engineered cardiac tissues with 10% hCFs and 15% hCFs.

To determine the sensitivity of the engineered cardiac tissues to the activation state of human cardiac fibroblasts, the inventors compared their performance with 5% early-passage (p4) human cardiac fibroblasts to those with 5% late-passage (p9) human cardiac fibroblasts. P9 human cardiac fibroblasts abrogated the benefits p4 human cardiac fibroblasts provided in ECT compaction, stiffness, and force production after one week of culture, indicating that serial passaging leading to increased myofibroblast activation was at least partially retained during that time in three-dimensional culture. Myofibroblast deactivation, in the form of decreased αSMA expression, occurs within twenty-four hours to forty-eight hours when fibroblasts are transferred from stiff, two-dimensional substrates to three-dimensional culture platforms.

The results presented in this EXAMPLE suggest that activation of p9 human cardiac fibroblasts two-dimensional culture affects hiPSC-CM function in three-dimensional engineered tissues out to one week. This provides an exciting avenue for engineering human myocardium of different pathophysiologies based solely on the pre-conditioning of human cardiac fibroblasts.

The inventors developed engineered cardiac tissues that model healthy myocardium and a more disease-like state with activated human cardiac fibroblasts. The inventors characterized further their electromechanical behavior. Upon careful analysis, the inventors discovered that most of the engineered cardiac tissues displayed contractile alternans whose amplitude increased with increasing frequency. The inventors showed that human cardiac fibroblasts did not have a significant effect on the presence of alternans, but that 5% P4 human cardiac fibroblasts appeared to be protective and increase the minimum force threshold at which alternans appeared. Cardiac alternans have been well documented clinically. They are considered an indicator of arrhythmogenic risk. Lack of proper electromechanical integration of hiPSC-CMs in animal models has been attributed to their electrical immaturity.

The ubiquity of alternans in engineered tissues in this EXAMPLE suggests that this in vitro platform provides a robust model and pre-transplantation venue to study and reduce arrhythmogenicity of engineered myocardium. The early-passage cardiac fibroblasts may be a prime candidate for that purpose. Further, this EXAMPLE suggests that this in vitro model provides a robust model for arrhythmogenic cardiotoxicity evaluation.

Example 4

Executive Summary

The Cardio-Tox TEEM invention provides cardiomyocytes derived from human induced pluripotent stem cells (hiPSC-CMs) and human cardiac fibroblasts (hCFs) in three-dimensional engineered tissues, which can be used as predictive preclinical models of human drug-induced proarrhythmic risk. This technology can be a replacement for current methods and standards for assessing cardiotoxicity. Two uses of the technology have been suggested: a replacement for animal testing to assess cardiotoxicity, and drug screening.

The overall objective of this invention is to (1) develop more highly predictive preclinical models of human drug-induced cardiotoxicity using hiPSC-CMs and human cardiac fibroblasts (hCFs) in three-dimensional engineered tissues and (2) use high resolution imaging to extract quantitative metrics via unbiased, automated analysis algorithms to increase chemical compound safety evaluation throughput.

The goal is to validate human cardiotoxicity models of (i) three-dimensional engineered self-assembled microtissues for high-throughput testing of multiple arrhythmia triggers such as QT prolongation and early afterdepolarizations; and (ii) larger three-dimensional engineered tissues for testing arrhythmia substrates such as slow conduction and reentry formation as a secondary screening platform.

The data show that three-dimensional microtissue engineered from human iPSC-derived cardiomyocytes and commercially available human adult ventricular CFs show human action potentials (APs) with a characteristic prominent plateau phase and are vulnerable to early afterdepolarizations formation when treated with a known $I_{Kr}$ blocker under β-adrenergic stimulation. These data show that human induced pluripotent stem cell-derived cardiac tissues that incorporate both major cardiac cell types provide an excellent platform to test cardiotoxicity on both myocytes and fibroblasts.

Example 5

Regulatory Path

Evaluation of compounds with known mechanisms of action and/or human safety data can provide in vitro experimental data for comparing the current risk stratification (no/low, moderate, and high arrhythmic risk) and currently recommended patient dosing regimens to quantitative, dose-dependent parameters from the Cardio-Tox TEEM platform. Known mechanisms of actions and drug labels of these compounds are used to assess the assay's sensitivity and specificity for predicting affected ion channels/currents and risk of clinical arrhythmia (e.g., Torsades de Pointes arrhythmia). The following outlines a project plan that prioritizes compounds that differentiate this model from other hiPSC-CM assays and test compounds across risk levels.

Platform 1. The inventors develop and validate a platform for drug-induced arrhythmic risk predictions for a diverse human population using assay data from three-dimensional human cardiac microtissues. The inventors quantify electrophysiology of three-dimensional microtissues containing hiPSC-$CM_{LP}$ and hCFs by optical mapping.

Platform 2. The inventors develop and validate larger human engineered cardiac tissue to predict drug-induced reentry formation, structural changes, and assess the impact of ischemia. The inventors develop a mesh-patterned large engineered tissue that allows reentry formation under slow conduction and myocyte/fibroblast injuries with iterative testing. The inventors validate this engineered tissue as an arrhythmia-substrate platform using optical mapping.

Quality control and throughput. Because there is slight variation in action potential waveform from batch to batch of hiPSC-$CM_{LP}$, the inventors select three compounds to be run on each batch of cardiac microtissues as internal quality control (QC) for every assay. The inventors evaluate the use of flecainide (which targets $I_{Na}$), verapamil (which targets $I_{CaL}$), and E4031 (which targets hERG/$I_{Kr}$) for assessing quality. The inventors increase the throughput and automation of the technology through (i) motorized solution injection to test multiple drug concentrations quickly and accurately, (ii) reduced user input by auto-focusing and increasing the well-plate format and footprint of the heating pad, (iii) response assessment every five minutes to evaluate methods to reduce screening duration, and (iv) automation of tabular data output for results reporting, visualization, and interpretation to reduce the need for specific expertise in arrhythmia assessment.

Na/Ca channel compounds. Five compounds from the CiPA twenty-eight list are tested over at least four orders of magnitude (×10,000) dose range and are distributed across mechanisms of action and risk stratification. Low risk: diltiazem ($Ca^{2+}$) and mexiletine ($Na^+$). Intermediate risk: ondansetron ($Na^+$). High risk: bepridil ($Ca^{2+}$) and quinidine ($Na^+$, $K^+$). These compounds focus on $Na^+$ and $Ca^{2+}$ ion channel blocking to further differentiate the invention from those of competitors. The inventors focus on reporting excitation parameters and the late sodium and calcium currents that drive the plateau phase of the action potential ($APD_{TRI}$) and contribute to total action potential duration that has been shown to be important clinically in determining QTc from patient ECGs.

HERG/K channel compounds. Seven compounds from the CiPA list that predominantly target HERG channel ($I_{Kr}$ current) and other K+ currents be tested over at least a 10,000× dose range. Low risk: loratadine. Intermediate risk: terfenadine, chlorpromazine, and cisapride. High risk: dofetilide, d,l-sotalol, and azimilide. The sensitivity of this model to HERG channel blockade is validated by these compounds that show both high and low arrhythmic risk in the clinical population to improve predictions of the integrated multi-channel effects on repolarization and arrhythmia risk. This significantly increases) commercialization value.

Guidelines S7B and E14 from the International Conference on Harmonisation of Technical Requirements for Registration of Pharmaceuticals for Human Use (ICH) currently govern the cardiac safety landscape for new drugs and focus on ventricular repolarization via $I_{Kr}$ (hERG channel) and clinical QTc prolongation, respectively.

The FDA CiPA initiative is a collaboration between the Center for Drug Evaluation and Research (CDER) and the Center for Devices and Radiological Health (CDRH). These two centers and the Center for Biologics Evaluation and Research (CBER), that formulated Guideline S7B with CDER, are likely the groups to regulate this invention.

Because patient ECG data must be collected in Phase I clinical trials and novel ECG metrics for assessing arrhythmogenicity are already being defined and evaluated by CiPA, the screening data can readily be compared to these clinical data sets to assess predictive power of the Cardio-Tox TEEM platform.

The EPA's ToxCast and Tox21 programs and the National Toxicology Program (NTP) do not routinely screen for cardiotoxicity despite NTP research programs striving to do cardiotoxicity testing with 2D assays and despite the global need for cardiac safety from environmental toxicants. Regulatory-facing bodies such as the Health and Environmental Sciences Institute (HESI) and collaborations such as the Interagency Coordinating Committee on the Validation of Alternative Methods (ICCVAM) are encouraging adoption of predictive models, and this invention is appropriate for these applications for testing chemicals, e.g., industrial, agricultural, and environmental compounds and toxicants.

LIST OF EMBODIMENTS

Specific compositions and methods of a human in vitro cardiotoxicity model have been described. The detailed description in this specification is illustrative and not restrictive or exhaustive. The detailed description is not intended to limit the disclosure to the precise form disclosed. Other equivalents and modifications besides those already described are possible without departing from the inventive concepts described in this specification, as those skilled in the art will recognize. When the specification or claims recite method steps or functions in an order, alternative embodiments may perform the functions in a different order or substantially concurrently. The inventive subject matter, therefore, is not to be restricted except in the spirit of the disclosure.

When interpreting the disclosure, all terms should be interpreted in the broadest possible manner consistent with the context. Unless otherwise defined, all technical and scientific terms used in this specification have the same meaning as commonly understood by one of ordinary skill in the art to which this invention belongs. This invention is not limited to the particular methodology, protocols, reagents, and the like described in this specification and, as such, can vary in practice. The terminology used in this specification is not intended to limit the scope of the invention, which is defined solely by the claims.

All patents and publications cited throughout this specification are expressly incorporated by reference to disclose and describe the materials and methods that might be used with the technologies described in this specification. The publications discussed are provided solely for their disclosure before the filing date. They should not be construed as an admission that the inventors may not antedate such disclosure under prior invention or for any other reason. If there is an apparent discrepancy between a previous patent or publication and the description provided in this specification, the present specification (including any definitions) and claims shall control. All statements as to the date or representation as to the contents of these documents are based on the information available to the applicants and constitute no admission as to the correctness of the dates or contents of these documents. The dates of publication provided in this specification may differ from the actual publication dates. If there is an apparent discrepancy between a publication date provided in this specification and the actual publication date supplied by the publisher, the actual publication date shall control.

The terms "comprises" and "comprising" should be interpreted as referring to elements, components, or steps in a non-exclusive manner, indicating that the referenced elements, components, or steps may be present, used, or combined with other elements, components, or steps. The singular terms "a," "an," and "the" include plural referents unless context indicates otherwise. Similarly, the word "or" should cover "and" unless the context indicates otherwise. The abbreviation "e.g." is used to indicate a non-limiting example and is synonymous with the term "for example." The abbreviation "i.e." is used as an explanatory example and is synonymous with the term "that is."

Some embodiments of the technology described can be defined according to the following numbered paragraphs:

1. An in vitro model for cardiotoxicity, comprising:
   (a) human pluripotent stem cell-derived cardiomyocytes; and
   (b) human cardiac fibroblasts,
   in three-dimensional self-assembled microtissues. Cardiomyocytes are purified by lactate-based metabolic selection (to obtain greater than about 60% cardiomyocyte purity) and cardiac fibroblasts are included for increasing the consistency, quality, and reproducibility of the model and of the data collected from the model. Round-: bottom recesses or micro-wells are non-adherent, and cells suspended in culture medium are introduced to the micro-wells in defined concentrations to determine microtissue size and settle into the micro-well recesses to cluster together. Tissues are formed by cells creating adhesions and junctions with other cells and extracellular matrix proteins. Electrical activity (e.g., the action potential), calcium transients, and contraction are dynamic processes quantified by high resolution, high speed imaging to obtain multiple metrics from the waveforms by unbiased, automated analysis to assess cardiotoxicity. Consistent tissue formation, imaging, and analysis are high due to the defined model parameters and these enable widespread use and adoption.
2. The in vitro model of embodiment 1, wherein the model consists essentially of about 100% hPSC-CM or hPSC-$CM_{LP}$.
3. The in vitro model of embodiment 1, wherein the model consists essentially of about 5% human cardiac fibroblasts.
4. The in vitro model of embodiment 1, wherein the model consists essentially of 5% human cardiac fibroblasts.
5. The in vitro model of embodiment 1, wherein the model consists essentially of about 95% hPSC-CM or hPSC-$CM_{LP}$ and about 5% human cardiac fibroblasts.
6. The in vitro model of embodiment 1, wherein the model consists essentially of about 10% human cardiac fibroblasts.
7. The in vitro model of embodiment 1, wherein the model consists essentially of about 90% hPSC-CM or hPSC-$CM_{LP}$ and about 10% human cardiac fibroblasts.
8. The in vitro model of embodiment 1, wherein the model consists essentially of about 15% human cardiac fibroblasts.
9. The in vitro model of embodiment 1, wherein the model consists essentially of about 95% hPSC-CM or hPSC-$CM_{LP}$ and about 15% human cardiac fibroblasts.
10. A method of making the in vitro model of embodiment 1, comprising the steps of:
    (1) obtaining separate samples of cell-cultured human pluripotent stem cell-derived cardiomyocytes of sufficient purity (≥60%) and cell-cultured human cardiac fibroblasts;
    (2) mixing the cell-cultured human pluripotent stem cell-derived cardiomyocytes and the cell-cultured human cardiac fibroblasts in defined ratios;
    (3) pipetting the mixed cells into molds for forming microtissues;
    (4) allowing the mixed cells to settle into microtissue recesses in the molds;
    (5) culturing the mixed cells overnight to allow microtissues to form, wherein the cells of the microtissues are connected through adhesion junctions and functional junctions; and
    (6) culturing the microtissues with electrical stimulation for 1 week and up to several weeks, sometimes in the presence of a chemical compound at a range of concentrations, until the time of use for cardiotoxicity assessment.
11. A method of collecting visual data via imaging of voltage, calcium, and contraction signals, comprising the steps of:
    (1) loading a voltage- or calcium-sensitive dye into the microtissues in culture;
    (2) sequentially exposing the microtissues to vehicle (either DMSO or ethanol) or chemicals for short time (5-30 minutes) assessing acute responses or maintaining exposure to chemicals used during the culture period for chronic exposure assessment; and
    (3) collecting fluorescent (e.g., voltage or calcium) and/or bright field (e.g., contraction) images with high speed, high resolution cameras.
12. A method for automatically analyzing fluorescent imaging data to reduce bias and increase throughput, comprising the steps of:
    (1) identifying the regions of each tissue in the field of view based on the fluorescence intensity;
    (2) using a fast Fourier transform to evaluate responsive and non-responsive tissues, used to calculate excitability;
    (3) masking to eliminate non-excitable tissues, thus reducing computer computational time to speed analysis and improving reliability of data analysis;
    (4) thresholding based on the baseline fluorescent intensity;
    (5) calculating the averaged time-series trace per tissue across the area of the tissue;

(6) eliminating background drift of the trace from water vibration or mechanical noise by $3^{rd}$ to $5^{th}$ order asymmetric least square fitting;

(7) plotting the average fluorescence intensity changes with time;

(8) taking the first and second derivatives to extract peaks, slopes, and accelerations/decelerations after application of bilateral filter and automatically extracting and calculating all other metrics of the voltage signal (action potential) or calcium transient including takeoff time, peak time, activation time, recovery time (30, 50, 80%);

(9) automatically detecting arrhythmias (e.g., EADs, DADs) by applying multiple moving average and subtraction to increase fidelity and identifying extra upstrokes during the plateau of action potential; and

(10) outputting data.

13. A method of using the in vitro model of embodiment 1 to screen compounds for arrhythmogenic cardiotoxicity.

14. The method of screening, wherein the test compounds are in development, testing, or use as pharmaceuticals.

15. The method of screening, wherein the test compounds are for use in industrial chemistries and processes, including agriculture, plastics production, and fire retardants.

16. The method of screening, wherein the test compounds are present in the environment and may be classified as environmental toxicants.

We claim:

1. A method for screening a chemical or biological agent for causing an arrhythmogenic cardiotoxicity risk in a human heart, the method comprising the steps of:

(1) obtaining an in vitro model for cardiac assessment comprising purified human induced pluripotent stem cell-derived cardiomyocytes (hiPSC-CMs) and human cardiac fibroblasts (hCFs) that are grown together in one or more non-adherent, scaffold-free wells with non-adherent bottoms whereby the hiPSC-CMs and hCFs adhere together while interspersed to grow into three-dimensional (3D), scaffold-free self-assembled microtissues comprising a fluorescence indicator operative to fluoresce in a response to an intracellular calcium ($Ca^{2+}$) concentration change and/or a response to a change in a voltage, and the in vitro model including a camera operative to capture fluorescence images to provide a fluorescence and/or a voltage signal, and the camera is in a communication with a computer with software;

(2) obtaining an action potential trace comprising a voltage signal, and/or a calcium transient, from the in vitro model by acquiring fluorescent images of the microtissues using the camera, computer, and software and using the software to calculate an average of the fluorescence images operative to detect a change in voltage and/or in calcium in the microtissues and if the microtissues have a response to an electrical stimulus followed by a stimulation delay time or stim delay, and configured to detect (a) a variability in action potential duration and/or a calcium transient, to detect (b) a change in voltage and/or in calcium in the microtissues by counting one or more early afterdepolarizations (EADs) each defined by additional slow depolarization before full repolarization or delayed afterdepolarizations (DADs), to identify (c) an initial takeoff of an action potential upstroke, to identify (d) a rapid rise phase of action potential upstroke by using a maximum peak of the first derivative and 90% recovery, to identify (e) a peak of the action potential corresponding to the end of the upstroke, to (f) compare the timing of the action potential upstrokes to the timing of a stimulation pulse to determine the stimulation time delay between the stimulation pulse and the action potential upstroke, to (g) identify an ectopic activity irrelevant to the stimulation pulse and therefore proarrhythmic, extra beats or pre-ventricular contractions, to (h) calculate an APD(X), wherein X is 30%, 50%, 80%, 90% or maximal by identifying an action potential duration (APD) to X % repolarization, or to (i) calculate an APDtri metric; wherein a moving average subtraction is utilized for detecting a frequency response and for (i) detecting one or more arrhythmias, EADs, and/or DADs by applying multiple moving average and subtraction and identifying extra upstrokes during a plateau of the action potential; and outputting data from (a), (b), (c), (d), (e), (f), (g), (h), (i), and (j);

(3) contacting the 3D self-assembled microtissues with the chemical or biological agent and then re-obtaining the action potential trace and/or calcium transient and the outputting data in step (2) and comparing the action potential trace and/or calcium transient and outputting data without the agent to the action potential trace and/or calcium transient and outputting data with the agent;

wherein if any one of the (a), (b), (c), (d), (e), (f), (g), (h), (i) or (j) after contacting is changed, then the chemical or biological agent is determined to cause an arrhythmogenic cardiotoxicity risk in a human heart.

2. The method of claim 1, wherein the one or more non-adherent, scaffold-free wells with non-adherent bottoms comprise agarose.

3. The method of claim 2, wherein the microtissues comprise 5% human cardiac fibroblasts.

4. The method of claim 2, wherein the microtissues comprise 10% human cardiac fibroblasts.

5. The method of claim 2, wherein the microtissues comprise 15% human cardiac fibroblasts.

6. The method of claim 1, wherein the microtissues are obtained by a process including the steps of:

(1) obtaining separate samples of cell-cultured human pluripotent stem cell-derived cardiomyocytes and cell-cultured human cardiac fibroblasts;

(2) mixing the cell-cultured human pluripotent stem cell-derived cardiomyocytes and the cell-cultured human cardiac fibroblasts in defined ratios;

(3) pipetting the mixed cells from step (2) into one or more non-adherent, scaffold-free wells with non-adherent bottoms for forming microtissues;

(4) allowing the mixed cells to settle into microtissue recesses in the one or more non-adherent, scaffold-free wells with non-adherent bottoms;

(5) culturing the mixed cells overnight to allow microtissues to form, wherein the cells of the microtissues are connected through adhesion junctions and functional junctions; and (6) culturing the microtissues with electrical stimulation for 1 week and up to several weeks, and/or exposing the microtissues to one or more chemicals during a culture of a defined duration, until the step of sequentially exposing the microtissues to chemicals for a short time.

* * * * *